(12) United States Patent
Zhang et al.

(10) Patent No.: US 11,842,031 B2
(45) Date of Patent: Dec. 12, 2023

(54) METHOD FOR DISPLAYING APPLICATION ICON AND ELECTRONIC DEVICE

(71) Applicant: HUAWEI TECHNOLOGIES CO., LTD., Guangdong (CN)

(72) Inventors: Ziyue Zhang, Shenzhen (CN); Long Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/638,357

(22) PCT Filed: Aug. 27, 2020

(86) PCT No.: PCT/CN2020/111783
§ 371 (c)(1),
(2) Date: Feb. 25, 2022

(87) PCT Pub. No.: WO2021/037149
PCT Pub. Date: Mar. 4, 2021

(65) Prior Publication Data
US 2022/0291811 A1    Sep. 15, 2022

(30) Foreign Application Priority Data

Aug. 31, 2019    (CN) .......................... 201910819990.4

(51) Int. Cl.
*G06F 3/048*    (2013.01)
*G06F 3/04817*    (2022.01)
(Continued)

(52) U.S. Cl.
CPC ........ *G06F 3/04817* (2013.01); *G06F 1/1652* (2013.01); *G06F 3/04845* (2013.01)

(58) Field of Classification Search
CPC . G06F 3/04817; G06F 3/04845; G06F 1/1652
See application file for complete search history.

(56) References Cited

U.S. PATENT DOCUMENTS 9,798,443 B1 * 10/2017 Gray ..................... G06F 3/0488
10,114,418 B2 * 10/2018 Shin ...................... G06F 1/1647
(Continued)

FOREIGN PATENT DOCUMENTS

| CN | 105630225 A | 6/2016 |
| CN | 107562473 A | 1/2018 |

(Continued)

OTHER PUBLICATIONS

European Extended Search Report for Application No. 20856762.8 dated Sep. 9, 2022, 8 pages.
(Continued)

*Primary Examiner* — Linh K Pham

(57) ABSTRACT

This disclosure provides a method for displaying application icons. The method may be applied to an electronic device having an expansible screen. When the expansible screen is in a first state, a first group of application icons are displayed in a shortcut window region of the screen, and if the expansible screen changes from the first state to a second state, a second group of application icons are displayed in the shortcut window region of the screen. A quantity of the second group of application icons is greater than a quantity of the first group of application icons. The first state indicates a state in which the expansible screen is not expanded. The second state indicates a state in which the expansible screen is expanded. Corresponding electronic device and storage media are also described.

20 Claims, 42 Drawing Sheets

(51) Int. Cl.
  *G06F 1/16* (2006.01)
  *G06F 3/04845* (2022.01)

(56) References Cited

U.S. PATENT DOCUMENTS

| | | | | |
|---|---|---|---|---|
| 10,203,866 | B2* | 2/2019 | Karunamuni | G06F 3/04842 |
| 10,365,814 | B2* | 7/2019 | Missig | G06F 3/04847 |
| 10,379,720 | B2* | 8/2019 | Ryu | G06F 3/04845 |
| 10,551,995 | B1* | 2/2020 | Ho | G06F 3/0486 |
| 11,010,020 | B2* | 5/2021 | Li | G06F 3/04817 |
| 2012/0159380 | A1* | 6/2012 | Kocienda | G06F 3/04883 715/783 |
| 2013/0321264 | A1* | 12/2013 | Park | G06F 3/041 345/156 |
| 2014/0137041 | A1* | 5/2014 | Jeon | H04M 1/0268 715/815 |
| 2014/0245202 | A1* | 8/2014 | Yoon | G06F 3/0482 715/765 |
| 2015/0130738 | A1* | 5/2015 | Park | G06F 3/1423 345/173 |
| 2015/0378503 | A1* | 12/2015 | Seo | G06F 3/04842 345/173 |
| 2016/0026381 | A1* | 1/2016 | Kim | G06F 3/04817 715/761 |
| 2016/0085319 | A1* | 3/2016 | Kim | H04M 1/0268 345/156 |
| 2017/0147189 | A1* | 5/2017 | Ryu | G06F 3/04886 |
| 2018/0081398 | A1* | 3/2018 | Shin | G09G 5/005 |
| 2018/0335921 | A1* | 11/2018 | Karunamuni | G06F 3/04842 |
| 2018/0359350 | A1* | 12/2018 | Kim | H04M 1/72403 |
| 2018/0364827 | A1* | 12/2018 | Chung | G06F 1/1677 |
| 2019/0179500 | A1* | 6/2019 | Kim | G06F 3/048 |
| 2022/0350463 | A1* | 11/2022 | Walkin | G06F 3/04883 |

FOREIGN PATENT DOCUMENTS

| | | |
|---|---|---|
| CN | 107846501 A | 3/2018 |
| CN | 109691073 A | 4/2019 |
| CN | 110109601 A | 8/2019 |
| CN | 110168483 A | 8/2019 |
| CN | 110531903 A | 12/2019 |
| WO | 2017131283 A1 | 8/2017 |

OTHER PUBLICATIONS

Office Action issued in CN201910819990.4, dated Oct. 20, 2021, 8 pages.

International Search Report and Written Opinion issued in PCT/CN2020/111783, dated Nov. 27, 2020, 9 pages.

Chinese Office Action Action for Application No. 202211596742.6 dated Jun. 8, 2023, 7 pages.

* cited by examiner

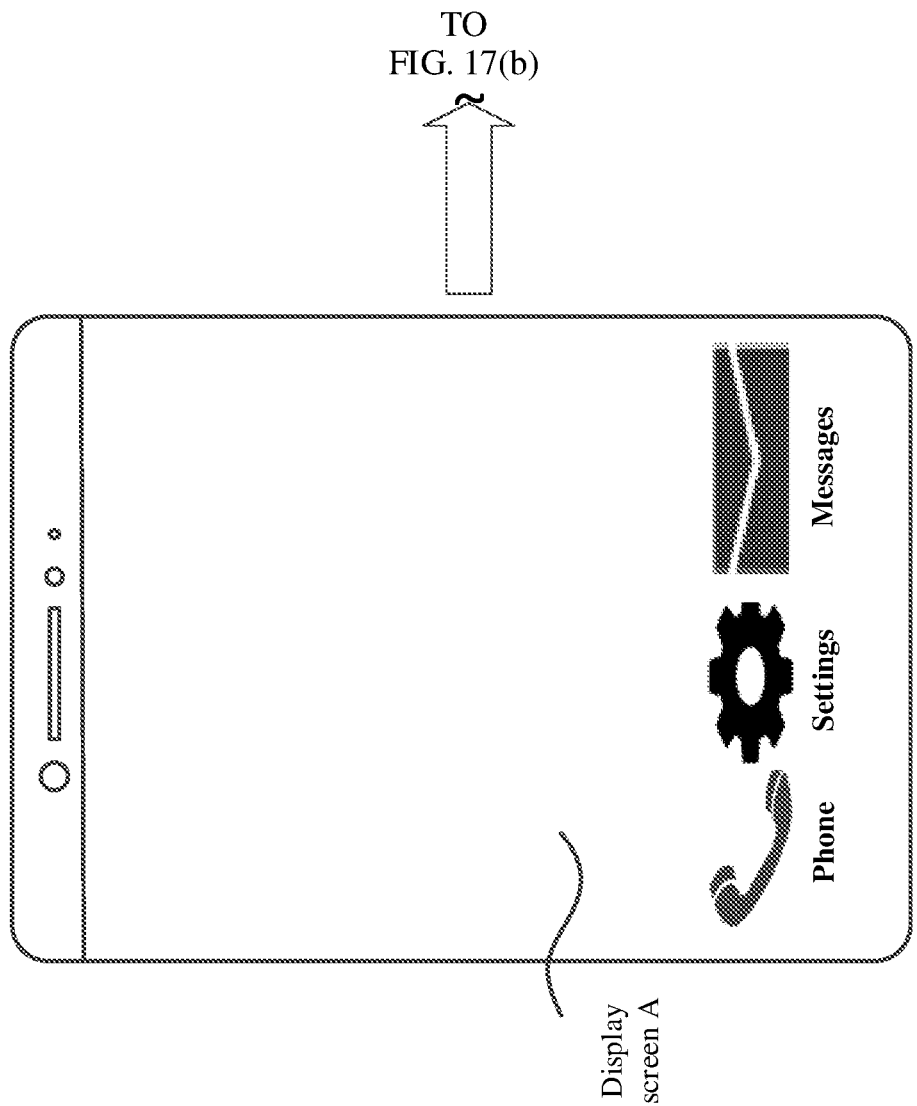

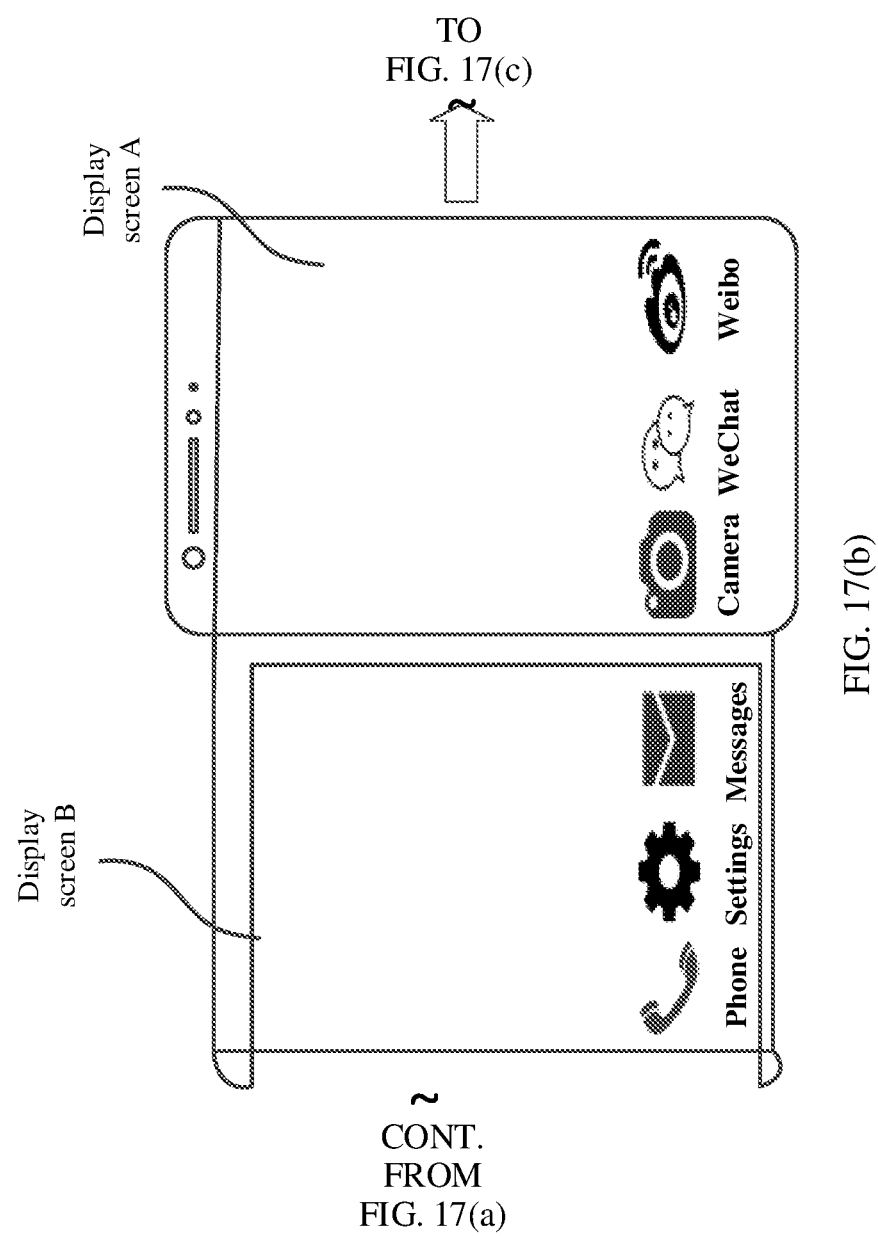

METHOD FOR DISPLAYING APPLICATION ICON AND ELECTRONIC DEVICE

CROSS-REFERENCE TO RELATED APPLICATIONS

This application is a national stage of International Application No. PCT/CN2020/111783, filed on Aug. 27, 2020, which claims priority to Chinese Patent Application No. 201910819990.4, filed on Aug. 31, 2019. Both of the aforementioned applications are hereby incorporated by reference in their entireties.

TECHNICAL FIELD

This application relates to the field of terminal technologies, and in particular, to a method for displaying application icons and an electronic device.

BACKGROUND

With development of intelligent technologies, a foldable screen used in a terminal device has become a development trend.

Currently, each screen of a mobile phone having a foldable screen includes a DOCK (a shortcut window) region that is always located at the bottom of the screen. For the DOCK region, when the mobile phone having the foldable screen is in a folded state, three commonly used application icons are usually displayed in the DOCK region. After the mobile phone having the foldable screen is unfolded from the folded state, four commonly used application icons are displayed in the DOCK region. From the folded state to an unfolded state, the application icons in the DOCK region of the mobile phone are always fixed application icons. If a user cannot find a required application icon in the DOCK region, the user searches for the required application icon through switching the screen of the mobile phone or by using a multi-application interface. This operation is not convenient, which affects user experience.

SUMMARY

This application provides a method for displaying application icons and an electronic device, to resolve a problem in the conventional technologies of poor user experience because a DOCK region always includes fixed application icons.

According to a first aspect, this application provides a method for displaying application icons. The method may be applied to an electronic device having an expansible screen. The method includes: when the expansible screen is in a first state, displaying a first group of application icons in a shortcut window region of the screen; and if the expansible screen changes from the first state to a second state, displaying a second group of application icons in the shortcut window region of the screen. A quantity of the second group of application icons is greater than a quantity of the first group of application icons. The first state indicates a state in which the expansible screen is not expanded. The second state indicates a state in which the expansible screen is expanded. The second group of application icons include some icons in the first group of application icons, or include all icons in the first group of application icons, or do not include icons in the first group of application icons.

In the foregoing technical solution, when the screen is not expanded, the first group of application icons are displayed in the shortcut window (DOCK) region of the screen; and after the screen is expanded, the second group of application icons may be displayed in the DOCK region of the screen. In addition, the quantity of the second group of application icons is greater than the quantity of the first group of application icons. In this way, before and after the screen is expanded, the electronic device having the expansible screen may be enabled to adjust the application icons in the DOCK region based on an expansion status of the screen. After the screen is expanded, more application icons may be displayed in the DOCK, to facilitate a user in searching for an application icon and improve user experience.

In a possible implementation, when the second group of application icons include some icons in the first group of application icons, an icon other than the first group of application icons in the second group of application icons is used as a third group of application icons.

The displaying a second group of application icons in the shortcut window region of the screen includes:

in the shortcut window region, replacing some application icons in the first group of application icons with some icons in the third group of application icons for display, and displaying some other application icons in the third group of application icons.

It should be noted that in the method for displaying application icons provided in this application, after the screen of the electronic device is expanded, more application icons may be displayed. If there is a relatively large quantity of application icons, some displayed application icons may be replaced. In other words, the application icon in the DOCK region may be updated in real time as a quantity of application icons increases, to facilitate a user operation and improve user experience.

In a possible implementation, when the second group of application icons include all the icons in the first group of application icons, the displaying a second group of application icons in the shortcut window region of the screen includes:

displaying the first group of application icons in a first region in the shortcut window region of the screen, and displaying an application icon in the second group of application icons except the first group of application icons in a second region.

It should be noted that in the method for displaying application icons provided in this application, after the screen is expanded, the application icon in the DOCK region may further include the application icon before the screen is expanded. In other words, another application icon may be newly displayed in the DOCK region based on the original application icon. In this way, the user can search for an application icon before the screen is expanded. In addition, the application icon may be newly added, to improve screen utilization after the screen is expanded.

In a possible implementation, when the second group of application icons do not include the icons in the first group of application icons, the displaying a second group of application icons in the shortcut window region of the screen includes:

replacing all the icons in the first group of application icons with the second group of application icons in the shortcut window region of the screen for display.

It should be noted that in the method for displaying application icons provided in this application, after the screen is expanded, if there is a relatively large quantity of application icons displayed in the DOCK region, the application icons displayed before the screen is expanded may be all replaced. In this way, after the screen is expanded, more application icons may be displayed in the DOCK region, to facilitate the user in searching for the application icon and improve user experience.

In a possible implementation, before the displaying a second group of application icons in the shortcut window region of the screen, the method further includes:

recording use status information of at least one application used by a user within specified duration; and determining at least one target application in the at least one application based on the recorded use status information of the at least one application, where the second group of application icons include an application icon corresponding to the target application.

In the foregoing technical solution, the electronic device may record use status information of a plurality of APPs used by the user within the specified duration, and then select, based on the use status information of the APPs used by the user, the application icon included in the DOCK region after the screen is expanded. In this way, the application icon displayed in the DOCK region may be associated with a use status of the user, and the application icon in the DOCK region may be dynamically adjusted based on the use status of the user, to facilitate the user in searching for a required APP.

In a possible implementation, the use status information of the at least one application used by the user within the specified duration may be recorded in the following manner:

In a first manner, when the expansible screen is in the first state, the use status information of the at least one application used by the user within the specified duration is recorded.

In a second manner, when the expansible screen is in the second state, the use status information of the at least one application used by the user within the specified duration is recorded.

In a third manner, when the expansible screen is in the first state or the second state, the use status information of the at least one application used by the user within the specified duration is separately recorded.

It should be noted that, before and after the screen is expanded, the user may correspond to different use status information. Therefore, in the method for displaying application icons provided in this application, the electronic device may record the use status information of the user when the screen is not expanded, or may record the use status information of the user after the screen is expanded, or may combine a use status of the user when the screen is not expanded and a use status of the user after the screen is expanded. In the three manners, the application icon displayed in the DOCK region may be more consistent with the use status of the user, to improve user experience.

In a possible implementation, the use status information includes at least one of the following parameters: a use sequence, a use quantity, use duration, a use time, or a use location.

It should be noted that, in the method for displaying application icons provided in this application, a use sequence in which the user uses APPs may be recorded, to obtain an application recently used by the user. Alternatively, a quantity of times that the user uses an APP may be recorded, and then at least one APP that is used by the user for a relatively large quantity of times is selected. Alternatively, duration, a time, a location, and the like of using an APP by the user may be recorded, and at least one of the foregoing information may be recorded, so that the application icon displayed in the DOCK region can be adjusted according to a use habit of the user, to better meet the use habit of the user and improve user experience.

In a possible implementation, the expansible screen includes a foldable screen, a scroll screen, or a scalable screen.

It should be noted that the method for displaying application icons provided in this application may be applied to an electronic device having a foldable screen, or may be applied to an electronic device having a scroll screen, or may be applied to an electronic device having a scalable screen.

In a possible implementation, the shortcut window region is displayed in a home screen of the electronic device.

The method further includes:

when an application interface is displayed in the home screen, displaying the shortcut window region at an upper layer of the application interface in response to an instruction that is invoked by the user to display the shortcut window region.

It should be noted that in the method for displaying application icons provided in this application, the DOCK region is displayed in the home screen of the electronic device. When the user uses an application, an application interface may be displayed in the home screen. In this case, the user may invoke the instruction for displaying the DOCK to display the DOCK region at the upper layer of the application interface. In this way, when the user uses the application interface, another application may be opened by using the DOCK region. Therefore, the user does not need to return from the application interface to the home screen, to facilitate a user operation and improve user experience.

According to a second aspect, this application further provides an electronic device. The electronic device includes an expansible screen, one or more processors, a memory, a plurality of applications, and one or more computer programs. The one or more computer programs are stored in the one or more memories. The one or more computer programs include instructions. When the instructions are executed by the one or more processors, the electronic device is enabled to implement the technical solutions in the first aspect or any possible implementation of the first aspect.

According to a third aspect, this application further provides an electronic device. The electronic device includes modules/units that are configured to perform the method in the first aspect or any possible implementation of the first aspect. The modules/units may be implemented by hardware, or may be implemented by hardware by executing corresponding software.

According to a fourth aspect, an embodiment of this application further provides a chip. The chip is coupled to a memory in an electronic device, and is configured to implement the technical solutions in the first aspect and any possible implementation of the first aspect in embodiments of this application. In this embodiment of this application, "coupling" means a direct combination or an indirect combination of two components.

According to a fifth aspect, an embodiment of this application provides a computer readable storage medium. The computer readable storage medium includes a computer program. When the computer program is run on an electronic device, the electronic device is enabled to implement the technical solutions in the first aspect or any possible implementation of the first aspect in embodiments of this application.

According to a sixth aspect, an embodiment of this application provides a computer program product. When the computer program product is run on an electronic device, the electronic device is enabled to implement the technical solutions in the first aspect or any possible implementation of the first aspect in embodiments of this application.

According to a seventh aspect, a graphical user interface (GUI) is further provided. The graphical user interface is stored in an electronic device. The electronic device includes an expansible screen, a memory, and one or more processors. The one or more processor are configured to execute one or more computer programs stored in the memory. The graphical user interface includes: when the expansible screen is in a first state, displaying a first group of application icons in a shortcut window region of the screen; and if the expansible screen changes from the first state to a second state, displaying a second group of application icons in the shortcut window region of the screen. A quantity of the second group of application icons is greater than a quantity of the first group of application icons. The first state indicates a state in which the expansible screen is not expanded. The second state indicates a state in which the expansible screen is expanded. The second group of application icons include some icons in the first group of application icons, or include all icons in the first group of application icons, or do not include icons in the first group of application icons.

BRIEF DESCRIPTION OF DRAWINGS

FIG. 17(a), FIG. 17(b), and FIG. 17(c) are a schematic diagram of a group of graphical user interfaces according to an embodiment of this application;

DESCRIPTION OF EMBODIMENTS

A method for displaying application icons provided in embodiments of this application may be applied to any electronic device such as a mobile phone, a tablet computer, a wearable device (for example, a watch, a band, or a smart helmet), an in-vehicle device, a smart household, an augmented reality (AR) device/a virtual reality (VR) device, a notebook computer, an ultra-mobile personal computer (UMPC), a netbook, or a personal digital assistant (PDA).

The following explains and describes some terms in embodiments of this application to facilitate understanding of a person skilled in the art.

An application (app for short) in embodiments of this application is referred to as an app and is a software program that can implement one or more specific functions. Generally, a plurality of applications may be installed on a terminal device, for example, a camera application, an SMS application, a mailbox application, WeChat (WeChat), WhatsApp Messenger, Line (Line), Instagram (instagram), Kakao Talk, and DingTalk. The application mentioned below may be an application installed when the terminal device is delivered from a factory, or may be an application downloaded from a network or obtained from another terminal device in a process in which a user uses the terminal device.

Figure 1A:
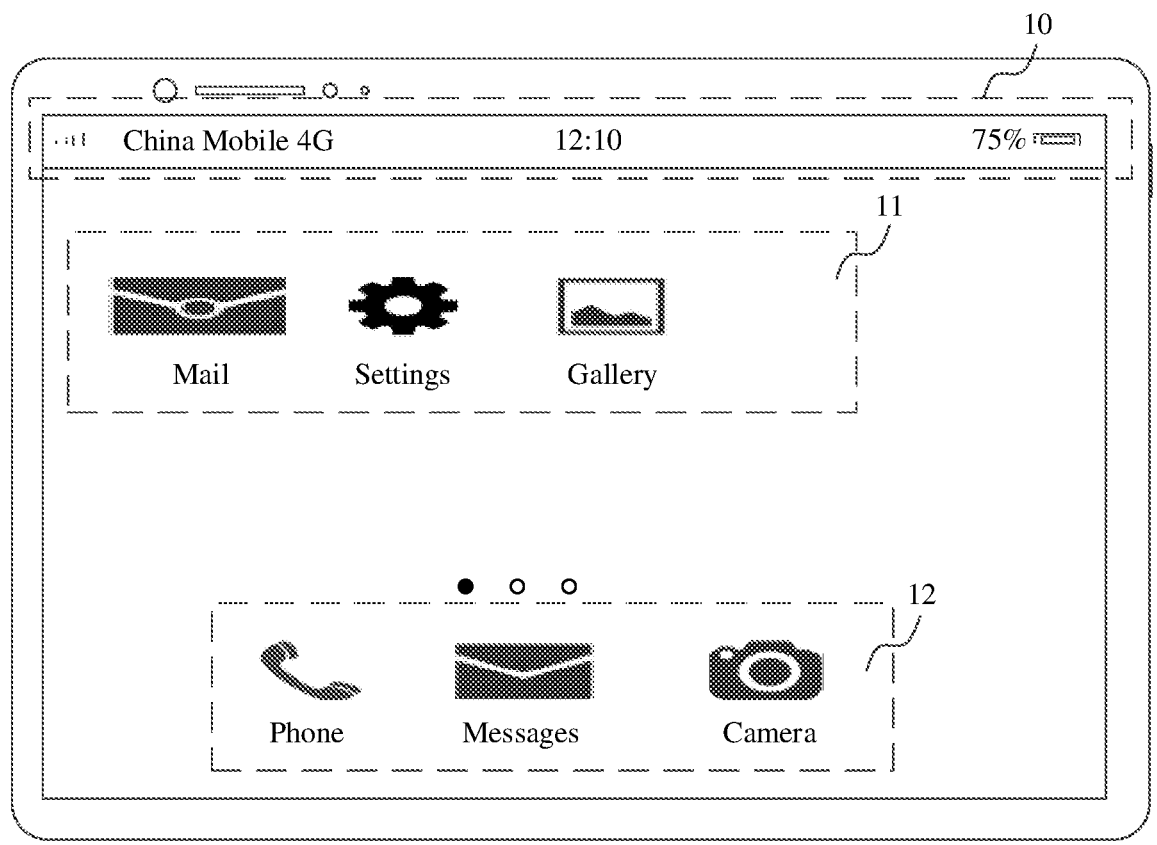
FIG. 1(a) and FIG. 1(b) are a schematic diagram of a DOCK in an interface of a mobile phone according to an embodiment of this application.
Figure 1B:
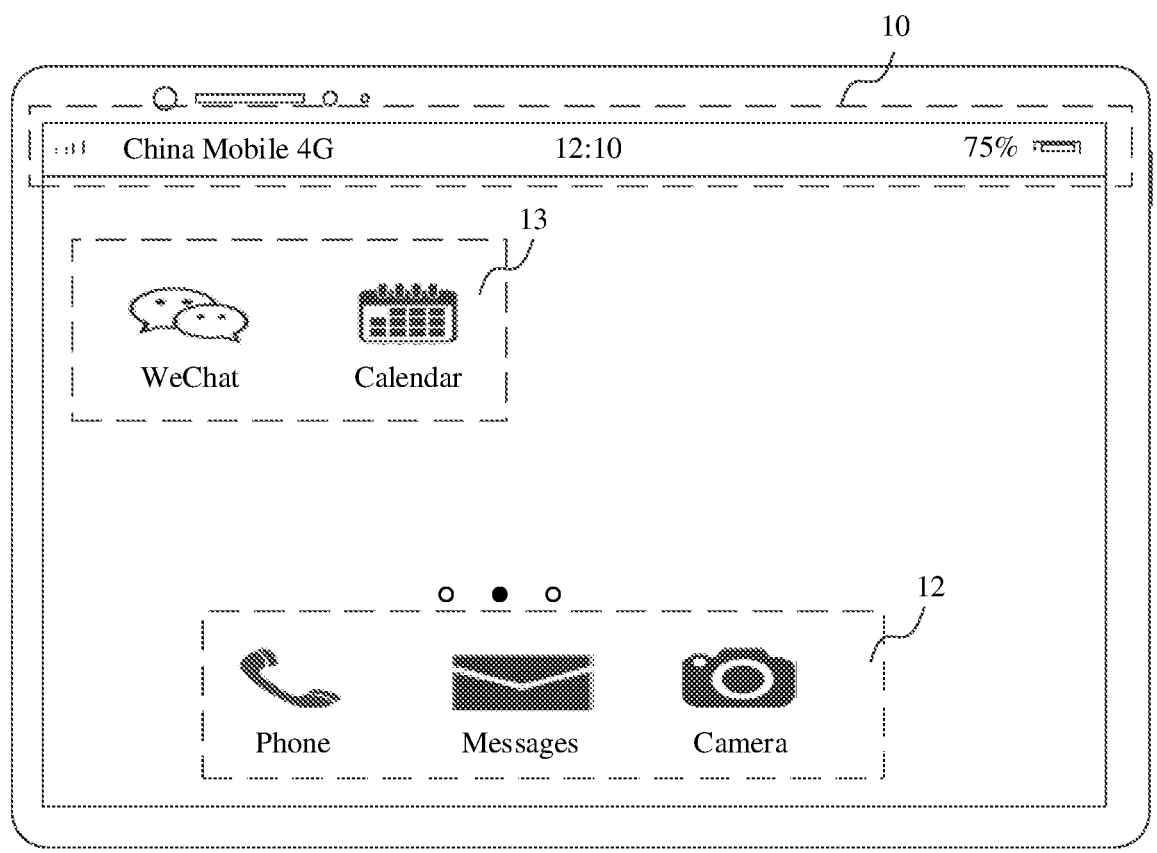

A DOCK region in the embodiments of this application is a shortcut window used for task display and task switching on a display screen of a terminal device. Displayed content in the window does not change with window switching. In other words, the DOCK region is a fixed window on the display screen. It may be understood that the DOCK region is a region that may be hidden. FIG. 1(a) and FIG. 1(b) are a schematic diagram of a DOCK region in an interface of a mobile phone according to an embodiment of this application.

An interface shown in FIG. 1(a) includes a status bar 10, an application icon 11 on a first screen, and a DOCK region 12. The DOCK region 12 is used to store a commonly used application icon. During screen switching, the DOCK region does not change. The application icon is an entry of an application. Application icons of all installed applications (except an application whose icon is configured to be hidden) are displayed on the screen. The application icon 11 on the first screen forms the first screen. When a user performs a leftward or rightward sliding operation, as shown in FIG. 1(b), the application icon 11 on the first screen in FIG. 1(a) and FIG. 1(b) is switched to an application icon 13 on a second screen, and the DOCK region does not change.

It should be noted that the method for displaying application icons provided in embodiments of this application may be applied to any electronic device having a display screen, for example, a mobile phone, an iPad, a television, or a notebook computer; or may be applied to a wearable device having a display screen. The electronic device may also be a foldable electronic device, for example, a foldable mobile phone or a foldable iPad. In the following, the foldable mobile phone is used as an example.

Figure 2A:
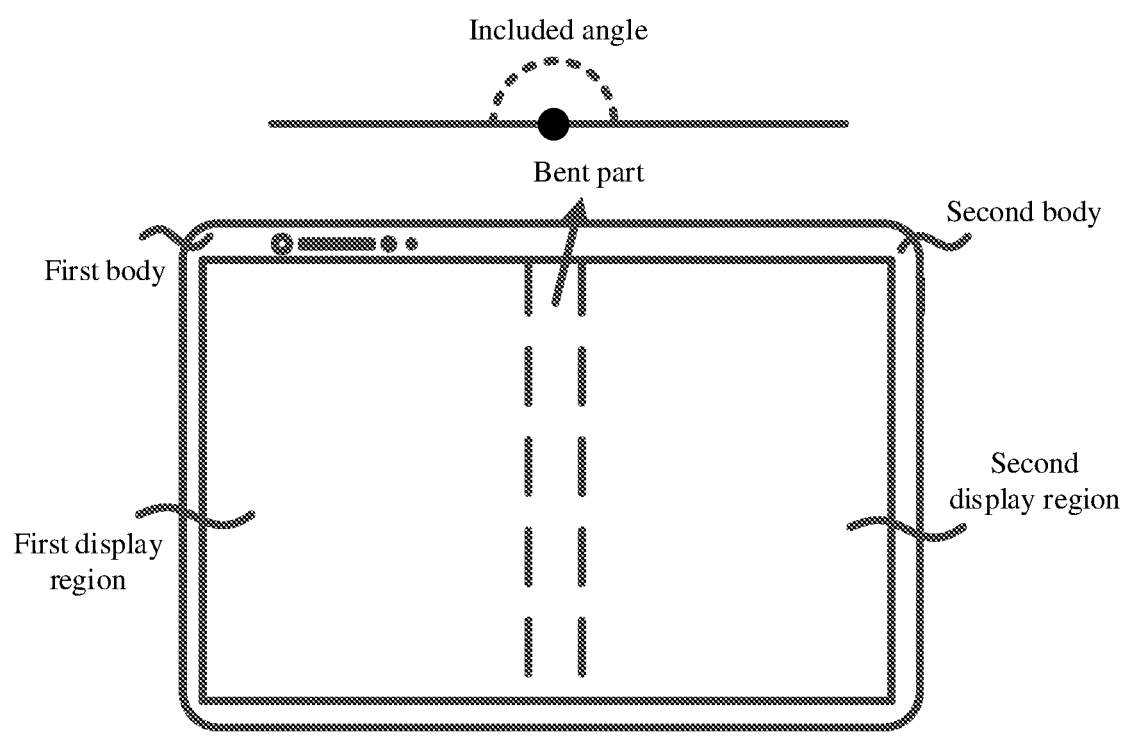
FIG. 2A(a) and FIG. 2A(b) are a schematic diagram of a mobile phone having a foldable screen according to an embodiment of this application.
Figure 2A:
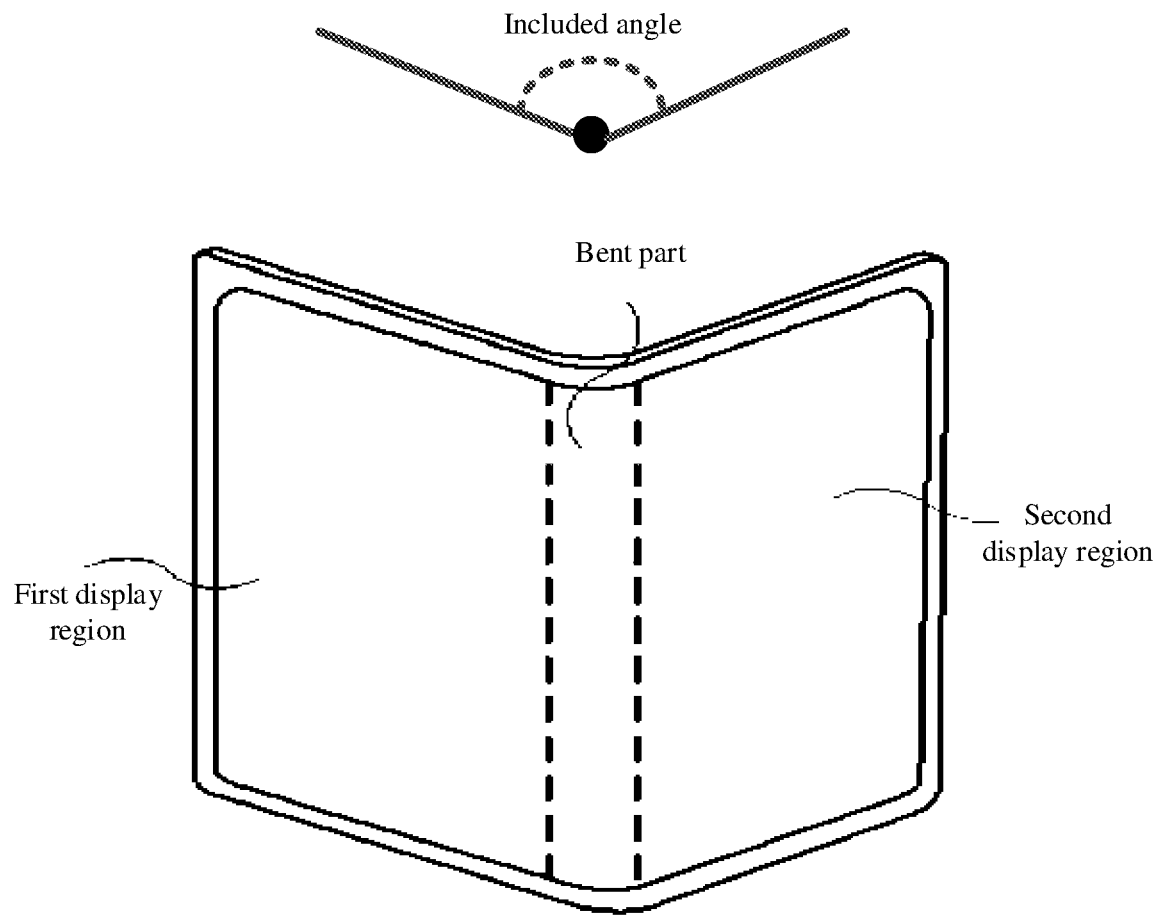

FIG. 2A(a) and FIG. 2A(b) are a schematic diagram of a foldable mobile phone to which an embodiment of this application may be applied. As shown in FIG. 2A(a), the foldable mobile phone includes a first body and a second body. An included angle between the first body and the second body may change, so that the foldable mobile phone is unfolded or folded. It should be understood that an entire screen may cover the first body and the second body. The screen may be a foldable screen. With reference to FIG. 2A(b), when the included angle between the first body and the second body changes, an included angle between a first display region corresponding to the first body and a second display region corresponding to the second body also changes.

An unfolding angle in this embodiment of this application is the included angle between the first body and the second body of the foldable electronic device. When the unfolding angle is 0 degrees, a first rear face of the first display region corresponding to the first body overlaps a second rear face of the second display region corresponding to the second body. When the unfolding angle is 180 degrees, the first display region and the second display region are located on the same horizontal plane. When the unfolding angle is 360 degrees, the first display region overlaps the second display region.

Figure 2B:
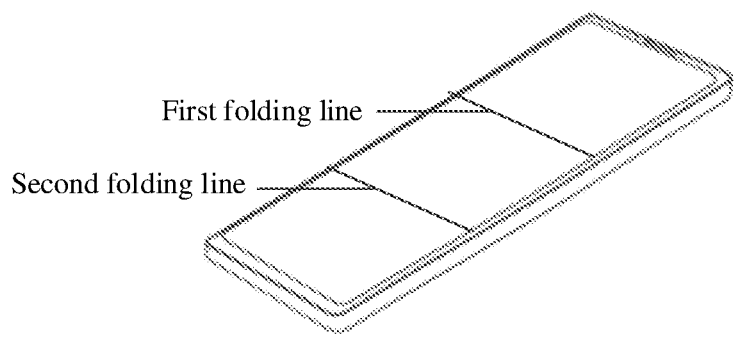
FIG. 2B(a) and FIG. 2B(b) are a schematic diagram of a mobile phone having three parts of screens according to an embodiment of this application.
Figure 2B:
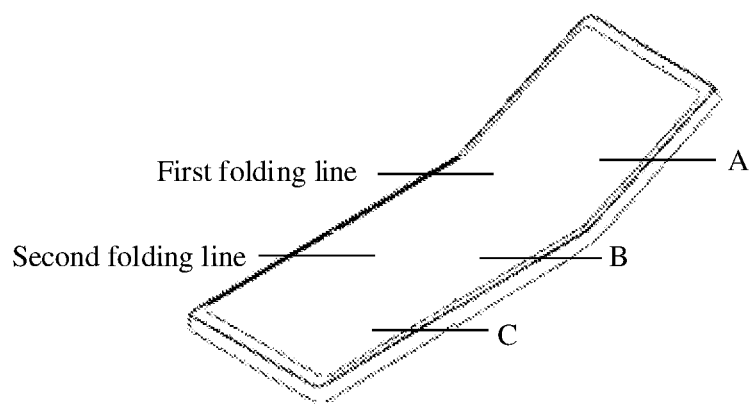

FIG. 2B(a) and FIG. 2B(b) are a schematic diagram of a mobile phone having three parts of screens according to an embodiment of this application. When the mobile phone 100 is in an unfolding state, with reference to FIG. 2B(a), the mobile phone 100 may include a first folding line and a second folding line. After the mobile phone 100 is folded along the first folding line in a longitudinal direction, a sub-screen A, a sub-screen B, and a sub-screen C shown in FIG. 2B(a) and FIG. 2B(b) may be formed.

In this application, the foldable screen may include an unfolded state, a folded state, and a half-folded state. The unfolded state indicates that the foldable screen is fully unfolded, that is, an included angle between two adjacent sub-screens in the foldable screen is 180 degrees. The folded state indicates that the foldable screen is fully folded, that is, an included angle between two adjacent sub-screens in the foldable screen is 0 degrees. The half-folded state is a state between the unfolded state and the folded state, that is, an included angle between two adjacent sub-screens in the foldable screen is between 0 degrees and 180 degrees. For example, the schematic diagram shown in FIG. 2B(b) shows the foldable screen in the half-folded state.

It should be noted that the method for displaying application icons provided in embodiments of this application is applicable to the unfolded state, the folded state, and the half-folded state.

Figure 3:
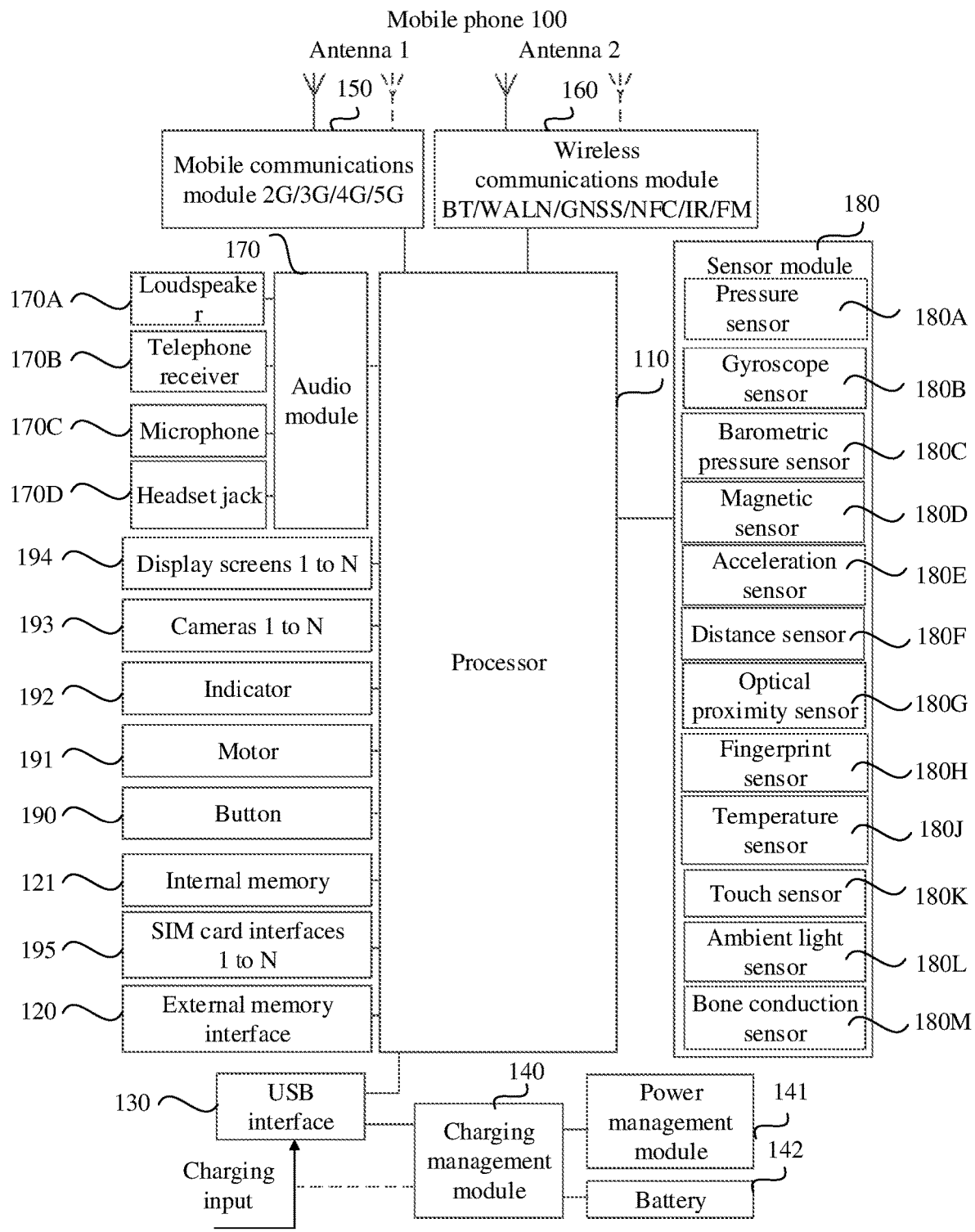
FIG. 3 is a schematic diagram of a structure of a mobile phone according to an embodiment of this application.

As shown in FIG. 3, a mobile phone 100 to which an embodiment of the present invention may be applied may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate components, or may be integrated into one or more processors.

The controller may be a nerve center and a command center of the mobile phone 100. The controller may generate an operation control signal based on instruction operation code and a time sequence signal, to complete control of instruction reading and instruction execution.

The memory may be further disposed in the processor 110, to store an instruction and data. In some embodiments, the memory in the processor 110 is a cache. The memory may store an instruction or data that is used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

The processor 100 may run software code of the display method provided in embodiments of this application, to implement a corresponding display effect.

The USB interface 130 is an interface that meets a USB standard specification, and may be specifically a mini USB interface, a micro USB interface, a USB Type-C interface, or the like. The USB interface 130 may be configured to connect to a charger to charge the mobile phone 100, or may be configured to transmit data between the mobile phone 100 and a peripheral device.

The charging management module 140 is configured to receive charging input from the charger. The power management module 141 is configured to connect to the battery 142, the charging management module 140, and the processor 110. The power management module 141 receives input of the battery 142 and/or the charging management module 140, to supply power to the processor 110, the internal memory 121, the external memory, the display screen 194, the camera 193, the wireless communications module 160, and the like.

A wireless communication function of the mobile phone 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communication frequency bands. Different antennas may be multiplexed to improve utilization of the antennas. For example, the antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the mobile phone 100. The mobile communications module 150 may include at least one filter, a switch, a power amplifier, a low noise amplifier (LNA), and the like. The mobile communications module 150 may receive an electromagnetic wave over the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert the signal into an electromagnetic wave for radiation over the antenna 1. In some embodiments, at least some function modules of the mobile communications module 150 may be disposed in the processor 110. In some embodiments, at least some function modules of the mobile communications module 150 and at least some modules of the processor 110 may be disposed in the same component.

The wireless communications module 160 may provide a solution to wireless communication applied to the mobile phone 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communications module 160 may be one or more components into which at least one communication processing module is integrated. The wireless communications module 160 receives an electromagnetic wave over the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation over the antenna 2.

In some embodiments, the antenna 1 and the mobile communications module 150 of the mobile phone 100 are coupled, and the antenna 2 and the wireless communications module 160 of the mobile phone 100 are coupled, so that the mobile phone 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The mobile phone 100 may implement an audio function such as music playing or recording over the audio module 170, the loudspeaker 170A, the telephone receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed in the display screen 194.

The gyroscope sensor 180B may be configured to determine a motion posture of the mobile phone 100. In some embodiments, the gyroscope sensor 180B may be used to determine angular velocities of the mobile phone 100 around three axes (namely, x, y, and z axes). The gyroscope sensor 180B may be configured to implement stabilization during photographing.

The barometric pressure sensor 180C is configured to measure atmospheric pressure. In some embodiments, the mobile phone 100 calculates an altitude based on a value of the atmospheric pressure measured by the barometric pressure sensor 180C, to assist positioning and navigation.

The magnetic sensor 180D includes a Hall effect sensor. The mobile phone 100 may detect opening and closing of a flip leather cover by using the magnetic sensor 180D. In some embodiments, when the mobile phone 100 is a clamshell phone, the mobile phone 100 may detect opening and closing of a clamshell by using the magnetic sensor 180D. Further, a feature such as automatic unlocking of the clamshell is set based on a detected open/closed state of the leather cover or a detected open/closed state of the clamshell.

The acceleration sensor 180E may detect a magnitude of acceleration of the mobile phone 100 in various directions (usually on three axes). When the mobile phone 100 is static, a value and a direction of gravity may be detected. The mobile phone 100 may be further configured to recognize a posture of the electronic device, and applied to applications such as landscape/portrait orientation switching and a pedometer.

The distance sensor 180F is configured to measure a distance. The mobile phone 100 may measure a distance through infrared or laser. In some embodiments, in a photographing scenario, the mobile phone 100 may measure a distance by using the distance sensor 180F, to implement quick focusing.

The optical proximity sensor 180G may include, for example, a light emitting diode (LED) and an optical detector such as a photodiode. The light emitting diode may be an infrared light emitting diode. The mobile phone 100 may emit infrared light by using the light emitting diode. The mobile phone 100 detects reflected infrared light of a nearby object by using the photodiode. When sufficient reflected light is detected, it may be determined that there is an object near the mobile phone 100. When insufficient reflected light is detected, the mobile phone 100 may determine that there is no object near the mobile phone 100. The mobile phone 100 may detect, by using the optical proximity sensor 180G, that the user puts the mobile phone 100 close to an ear for conversation, so that automatic screen-off is implemented to save power. The optical proximity sensor 180G may be further configured to automatically unlock and lock the screen in a leather cover mode and a pocket mode.

The ambient light sensor 180L is configured to sense luminance of ambient light. The mobile phone 100 may adaptively adjust luminance of the display screen 194 based on the sensed luminance of the ambient light. The ambient light sensor 180L may be further configured to automatically adjust white balance during photographing. The ambient light sensor 180L may further cooperate with the optical proximity sensor 180G to detect whether the mobile phone 100 is in a pocket, thereby preventing an accidental touch.

The fingerprint sensor 180H is configured to collect a fingerprint. The mobile phone 100 may implement fingerprint unlock, application lock access, fingerprint photographing, fingerprint-based call answering, and the like by using a feature of the collected fingerprint.

The temperature sensor 180J is configured to detect a temperature. In some embodiments, the mobile phone 100 executes a temperature processing policy by using the temperature detected by the temperature sensor 180J. For example, when the temperature reported by the temperature sensor 180J exceeds a threshold, the mobile phone 100 reduces performance of a processor near the temperature sensor 180J, to reduce power consumption and implement heat protection. In some other embodiments, when the temperature is lower than another threshold, the mobile phone 100 heats the battery 142, to avoid an abnormal shutdown of the mobile phone 100 caused by the low temperature. In some other embodiments, when the temperature is lower than still another threshold, the mobile phone 100 boosts an output voltage of the battery 142, to avoid an abnormal shutdown caused by the low temperature.

The touch sensor 180K is also referred to as a "touch panel". The touch sensor 180K may be disposed in the display screen 194, and the touch sensor 180K and the display screen 194 constitute a touchscreen that is also referred to as a "touch control screen". The touch sensor 180K is configured to detect a touch operation performed on or near the touch sensor 180K. The touch sensor may transmit the detected touch operation to the application processor, to determine a touch event type. The touch sensor 180K may provide, over the display screen 194, visual output related to the touch operation. In some other embodiments, the touch sensor 180K may be alternatively disposed on a surface of the mobile phone 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may contact a human pulse, and receive a blood pressure beating signal.

The display screen 194 is configured to display a display interface of an application, and the like. The display screen 194 includes a display panel. The display panel may use a liquid crystal display (LCD), an organic light-emitting diode (OLED), an active-matrix organic light emitting diode (AMOLED), a flexible light-emitting diode (FLED), a Mini-Led, a MicroLed, a Micro-oLed, a quantum dot light emitting diode (QLED), and the like. The display screen 194 may be a foldable display screen. In some embodiments, the mobile phone 100 may include one or N display screens 194. Herein, N is a positive integer greater than 1.

In this embodiment of this application, the display screen 194 of the mobile phone 100 may be folded to form a plurality of screens. Each screen may include a gyroscope sensor 180B configured to measure an orientation (that is, a direction vector of the orientation) of the corresponding screen. The mobile phone 100 may determine an included angle between adjacent screens based on an angle change that is of the orientation of each screen and that is obtained through measurement.

It should be noted that in this embodiment of this application, the foldable screen (for example, the display screen 194) of the mobile phone 100 may be folded to form a plurality of screens. Each screen may include a gyroscope sensor (for example, the gyroscope sensor 180B) configured to measure an orientation (that is, a direction vector of the orientation) of the corresponding screen. For example, the display screen 194 of the mobile phone 100 may be folded to form a screen A and a screen B. In this case, the screen A and the screen B both include gyroscope sensors 180B that are respectively configured to measure an orientation of the screen A and an orientation of the screen B. The mobile phone 100 may determine an included angle between adjacent screens based on an angle change that is of the orientation of each screen and that is obtained through measurement.

Figure 4A:
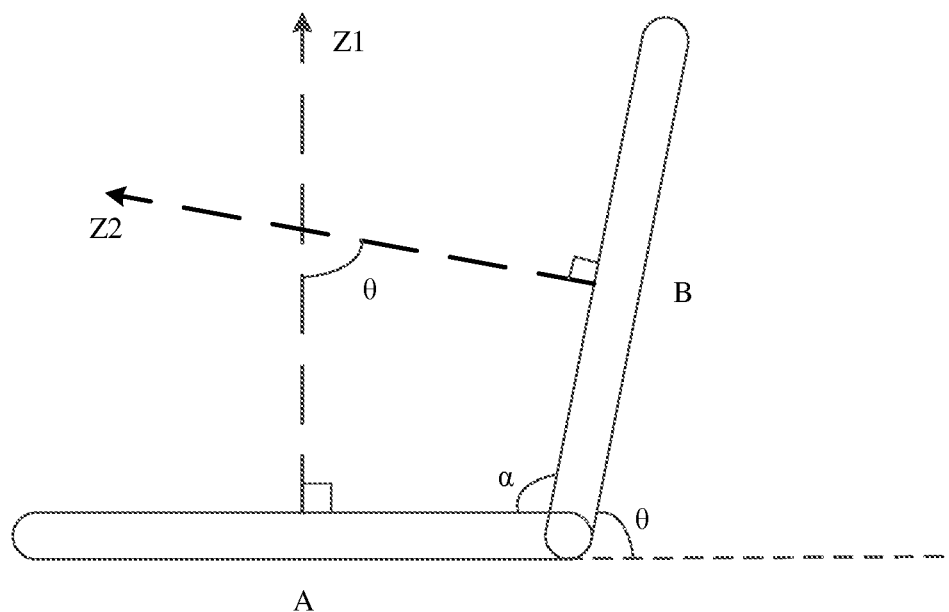
FIG. 4A is a schematic diagram of a principle of calculating an included angle α between a screen A and a screen B according to an embodiment of this application.

For example, the foldable screen of the mobile phone 100 may be folded to form a screen A and a screen B shown in FIG. 4A. A gyroscope sensor A is disposed on the screen A, and a gyroscope sensor B is disposed on the screen B. Herein, this embodiment of this application describes a principle by using which the gyroscope sensor A measures an orientation (that is, a direction vector of the orientation) of the screen A, a principle by using which the gyroscope sensor B measures an orientation (that is, a direction vector of the orientation) of the screen B, and a principle by using which the electronic device 100 calculates an included angle α between the screen A and the screen B based on the orientation of the screen A and the orientation of the screen B.

Figure 4B:
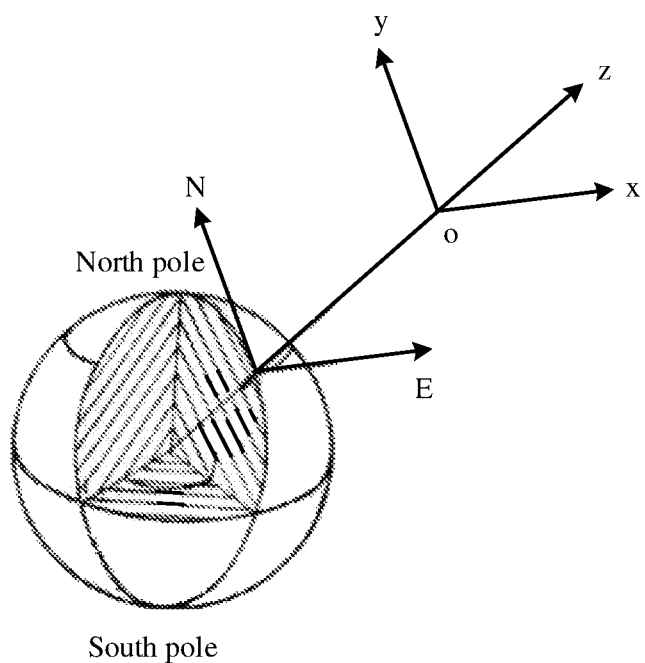
FIG. 4B is a schematic diagram of an instance of a geographic coordinate system according to an embodiment of this application.

A coordinate system of the gyroscope sensor is a geographic coordinate system. As shown in FIG. 4B, an origin O of a geographic coordinate system is located at a point at which a carrier (that is, a device including a gyroscope sensor, such as the electronic device 100) is located. Herein, an x axis points at the east (E) along a local latitude line, a y axis points at the north (N) along a local meridian line, and a z axis points upward along a local geographical perpendicular line. The z axis, the x axis, and they axis form a right-hand rectangular coordinate system. A plane formed by the x axis and the y axis is a local horizontal plane, and a plane formed by the y axis and the z axis is a local meridian plane. Therefore, it may be understood that a coordinate system of the gyroscope sensor is as follows: using the gyroscope sensor as the origin O, using a direction pointing to the east along the local latitude line as the x axis, using a direction pointing to the north along the local meridian line as the y axis, and using a direction pointing upward along the local geographical perpendicular line (that is, in a reverse direction of the geographical perpendicular line) as the z axis.

The mobile phone may obtain, through measurement by using the gyroscope sensor disposed in each screen, the direction vector of the orientation of each screen in the coordinate system of the gyroscope sensor disposed in the screen. For example, with reference to a side view of the mobile phone shown in FIG. 4A, the direction vector that is of the orientation of the screen A in the coordinate system of the gyroscope sensor A and that is obtained through measurement by the mobile phone is a vector z1, and the direction vector that is of the orientation of the screen B in the coordinate system of the gyroscope sensor B and that is obtained through measurement by the mobile phone is a vector z2. The electronic device may calculate the included angle θ between the vector z1 and the vector z2 by using Formula (1): θ=arc cos($\vec{z1}\cdot\vec{z2}/|\vec{z1}|\times|\vec{z2}|$). It may be further learned from FIG. 4A that, because the vector z1 is perpendicular to the screen A and the vector z2 is perpendicular to the screen B, the included angle α=180°−θ between the screen A and the screen B may be obtained. In other words, the mobile phone may determine the included angle α a between the screen A and the screen B based on the direction vector (that is, the vector z1) that is of the orientation of the screen A in the coordinate system of the gyroscope sensor A and that is obtained through measurement and the direction vector (that is, the vector z2) that is of the orientation of the screen B in the coordinate system of the gyroscope sensor B and that is obtained through measurement.

It should be noted that, although positions of the gyroscope sensors disposed in the screen A and the screen B do not overlap, that is, origins of the coordinate systems of the gyroscope sensors disposed in the screen A and the screen B do not overlap. However, the two coordinate systems have the parallel x axes, the parallel y axes, and the parallel z axes. Therefore, it may be considered that the coordinate systems of the gyroscope sensors disposed in the screen A and the screen B are parallel. In this way, although the vector z1 and the vector z2 are not in the same coordinate system, the included angle θ between the vector z1 and the vector z2 based on Formula (1) because the two coordinate systems have parallel axes.

In some embodiments, the included angle α between the screen A and the screen B may also be measured through cooperation of one or more other sensors. For example, one acceleration sensor may be disposed in each screen of the foldable screen. The mobile phone 100 (for example, the processor 110) may measure, by using an acceleration sensor, motion acceleration when each screen is rotated; and then, calculate a rotation angle of one screen relative to another screen, that is, the included angle α between the screen A and the screen B based on the measured motion acceleration.

In some other embodiments, the gyroscope sensor may be a virtual gyroscope sensor formed by a plurality of other sensors. The virtual gyroscope sensor may be configured to calculate the included angle α between the adjacent screens of the foldable screen, that is, the included angle α between the screen A and the screen B.

The camera 193 is configured to capture a static image or a video. The camera 193 may include a front-facing camera and a rear-facing camera.

The internal memory 121 may be configured to store computer executable program code. The executable program code includes instructions. Through running the instructions stored in the internal memory 121, the processor 110 executes various function applications and data processing of the mobile phone 100. The internal memory 121 may include a program storage region and a data storage region. The program storage region may store an operating system, software code of at least one application (for example, the iQIYI application or the WeChat application), and the like. The data storage region may store data (for example, an image and a video) and the like generated when the mobile phone 100 is used. In addition, the internal memory 121 may include a high-speed random access memory, or may include a non-volatile memory such as at least one magnetic disk memory, a flash memory, or a universal flash storage (UFS).

The internal memory 121 may further store the software code of the display method provided in embodiments of this application. When the processor 110 runs the software code, a procedure step of the display method is executed, to implement a corresponding display effect.

The external memory interface 120 may be configured to connect to an external storage card such as a micro SD card, to extend a storage capability of the mobile phone 100. The external storage card communicates with the processor 110 by using the external memory interface 120, to implement a data storage function. For example, a file such as an image file or a video file is stored in the external storage card.

The external memory may further store the software code of the display method provided in embodiments of this application. When the processor 110 runs the software code by using the external memory interface 120, a procedure step of the display method is executed, to implement a corresponding display effect.

The button 190 includes a power-on button, a volume button, and the like. The button 190 may be a mechanical button, or may be a touch key. The mobile phone 100 may receive button input, and generate button signal input related to user setting and function control of the mobile phone 100. The motor 191 may generate a vibration prompt. The motor 191 may be configured to provide a vibration prompt for an incoming call, and may be further configured to provide a touch vibration feedback. For example, touch operations performed on different applications (for example, photographing and audio playing) may correspond to different vibration feedback effects. The indicator 192 may be an indicator light, may be configured to indicate a charging state and a battery change, and may be further configured to indicate a message, a missed call, a notification, and the like. The SIM card interface 195 is configured to connect to a SIM card. The SIM card may be inserted into the SIM card interface 195 or detached from the SIM card interface 195, to implement contact with and detaching from the mobile phone 100.

It may be understood that the components shown in FIG. 3 constitutes no limitation on the mobile phone 100. The mobile phone 100 may alternatively include more or fewer components than those shown in the figure; or some components may be combined; or some components may be split; or different component arrangements may be used.

The following describes an implementation process of the method for displaying application icons provided in embodiments of this application. The following is described by using the mobile phone 100 (a foldable mobile phone) as an example. The solutions in embodiments of this application may be applied to any device with a relatively large screen, but may also be applied to a device with a small screen. This is not limited in this application.

Terms used in the following embodiments are merely intended for the purpose of describing specific embodiments, but not intended to limit this application. The terms "one", "a", "the", "the foregoing", "this", and "the one" of singular forms used in this specification and the appended claims of this application are also intended to include plural forms such as "one or more", unless otherwise specified in the context clearly. It should be further understood that, in embodiments of this application, "one or more" indicates one, two, or more than two, and "and/or" describes only an association relationship for describing associated objects and indicates that three relationships may exist. For example, A and/or B may indicate the following three cases: Only A exists, both A and B exist, and only B exists. Herein, A or B may be singular or plural. The character "/" generally indicates an "or" relationship between the associated objects.

Reference to "an embodiment", "some embodiments", or the like described in this specification indicates that one or more embodiments of this application include specific features, structures, or features described with reference to embodiments. Therefore, statements: "in one embodiment", "in some embodiments", "in some other embodiments", "in other embodiments", and the like appearing in different parts of this specification do not necessarily refer to the same embodiment but indicate "one or more but not all embodiments", unless otherwise specifically stated. The terms "include", "contain", "have", and their variations all indicate "include but not be limited to", unless otherwise specifically stated.

It should be noted that the DOCK region may also be referred to as a shortcut window region. In the following description, the DOCK and the shortcut window may be interchangeably used. However, the DOCK and the shortcut window are concepts for describing the same function region and may be used equally.

Figure 5A:
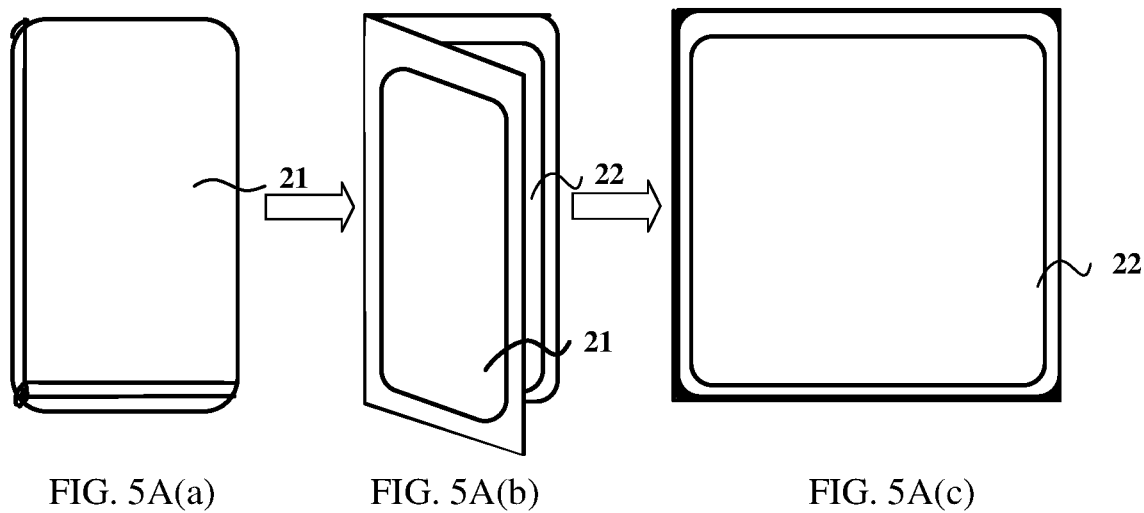
FIG. 5A(a), FIG. 5A(b), and FIG. 5A(c) are a schematic diagram of a physical state of an inward-folding mobile phone according to an embodiment of this application.

FIG. 5A(a), FIG. 5A(b), and FIG. 5A(c) are a schematic diagram of a physical state of an inward-folding mobile phone according to an embodiment of this application. The electronic device includes a first display screen 21 and a second display screen 22. The first display screen 21 is a screen that cannot be folded, and the second display screen 22 is a screen that can be folded. As shown in FIG. 5A(a), FIG. 5A(b), and FIG. 5A(c), the first display screen 21 may be referred to as an external screen, or a secondary screen, or the like; and the second display screen 22 may be referred to as an internal screen, or a primary screen, or the like. It should be noted that an included angle between the first display screen 21 and the second display screen 22 shown in FIG. 5A(a) is 0 degrees. When the included angle between the first display screen 21 and the second display screen 22 is 30 degrees, for example, this is shown in FIG. 5A(b). When the included angle between the first display screen 21 and the second display screen 22 is 180 degrees, as shown in FIG. 5A(c), the second display screen 22 is in an unfolded state. It should be noted that in an inward-folding physical state, the first display screen 21 and the second display screen 22 are two mutually independent display screens.

Figure 5B:
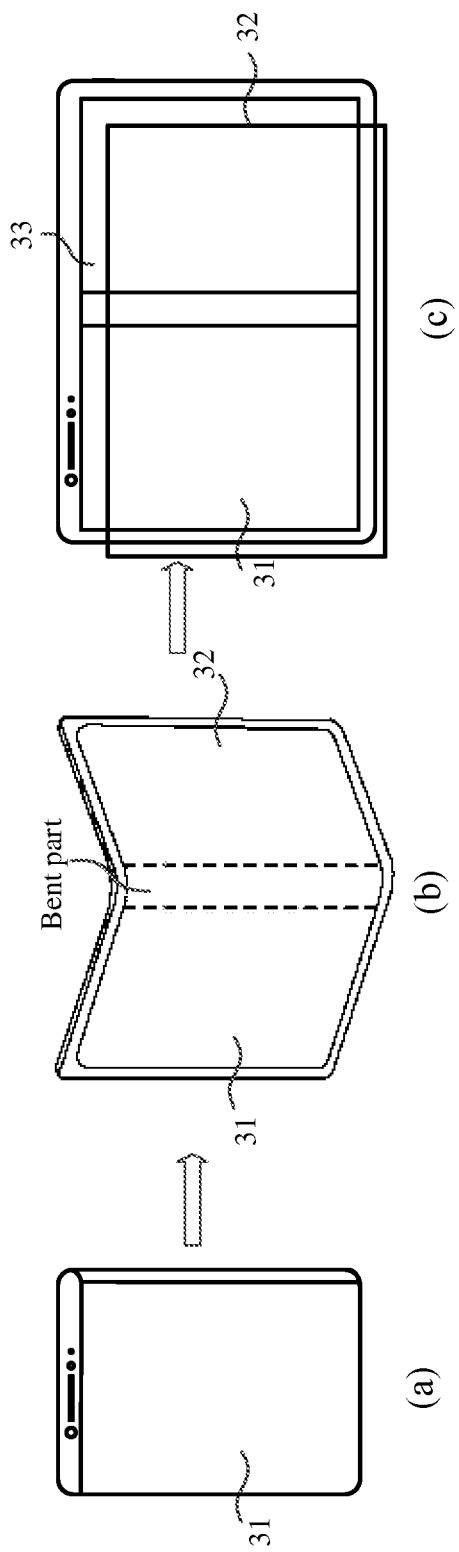
FIG. 5B is a schematic diagram of a physical state of an outward-folding mobile phone according to an embodiment of this application.

FIG. 5B is a schematic diagram of a physical state of an outward-folding mobile phone according to an embodiment of this application. The electronic device 100 includes a first display screen 31 and a second display screen 32. As shown in FIG. 5B(a), FIG. 5B(b), and FIG. 5B(c), the first display screen 31 may be referred to as an external screen, or a secondary screen, or the like; and the second display screen 32 may be referred to as an internal screen, or a primary screen, or the like. It should be noted that an included angle between the first display screen 31 and the second display screen 32 shown in FIG. 5B(a) is 0 degrees. When the included angle between the first display screen 31 and the second display screen 32 is 90 degrees, for example, this is shown in FIG. 5B(b). When the included angle between the first display screen 31 and the second display screen 32 is 180 degrees, as shown in FIG. 5B(c), a display screen 33 is a display screen formed when the second display screen 32 and the first display screen 31 are in the same plane. It should be noted that in an outward-folding physical state, when the electronic device 100 is in a folded state, the display screen is the first display screen 31; and when the electronic device 100 is in an unfolded state, the display screen 33 includes the first display screen 31 and the second display screen 32.

In this embodiment of this application, the method for displaying application icons is applicable to an inward-folding electronic device, also applicable to an outward-folding electronic device, and further applicable to a foldable electronic device having three or more parts of screens and an electronic device having a scroll screen. In this application, the following describes the method in this application by mainly using the inward-folding mobile phone as an example.

It should be noted that, regardless of the inward-folding electronic device or the outward-folding electronic device, when the electronic device is in the folded state, a display range of the display screen is relatively small; and when the electronic device is in the unfolded state, the display range of the display screen increases. When the display screen is a small screen, due to limited screen space, the display screen is more applicable to urgent quick task processing, for example, an application use scenario such as calling, paying, and song skipping. When the display screen is a large screen, larger screen use space and a larger scree use stage are provided for a user. A scenario such as a video, a movie, image editing, and creation becomes highly frequent. A multi-task operation also becomes possible. The user needs to quickly open a plurality of applications, and efficiently switch between the applications or use the plurality of applications in combination.

In some embodiments, the processor 110 in the mobile phone 100 may first detect the included angle between the first display screen 21 and the second display screen 22. When the included angle between the first display screen 21 and the second display screen 22 is 0 degrees, that is, the mobile phone 100 is in the folded state, the display screen of the mobile phone 100 is the first display screen 21. When the included angle between the first display screen 21 and the second display screen 22 is 180 degrees, that is, the mobile phone 100 is in the unfolded state, the display screen of the mobile phone 100 is the second display screen 22.

As shown in FIG. 6(*a*) and FIG. 6(*b*), when the mobile phone 100 is in the folded state, reference may be made to a schematic diagram of a user interface shown in FIG. 6(*a*). A DOCK region in the user interface 600 may include a fixed application icon 601, for example, a "Phone" application icon, a "Messages" application icon, a "Camera" application icon, and a "Settings" application icon. When the included angle between the first display screen 21 and the second display screen 22 is 180 degrees, with reference to a schematic diagram of a user interface shown in FIG. 6(*b*), the DOCK region in the user interface 610 may include a fixed application icon 601 and a newly added application icon 611. The fixed application icon 601 is four application icons included in the DOCK region on the first display screen 21. The newly added application icon 611 includes a "WeChat" application icon and a "Weibo" application icon. It should be noted that a quantity of fixed application icons in the DOCK region in this application is not limited. For example, there may be three application icons. In addition, a quantity of newly added application icons is also not limited. For example, there may be five newly added icons.

For ease of description, in this application, the fixed application icon in the DOCK region is denoted as X, and the newly added application icon is denoted as Y. The following mainly describes the newly added application icon Y in detail.

In a scenario 1, the mobile phone 100 may add, in the DOCK region, an icon of an application recently used by the user.

In some embodiments, the mobile phone 100 may display the icon of the recently used application in a newly added application icon part based on a use habit of the user.

Therefore, the user directly taps the icon in the DOCK region, and does not need to frequently switch interfaces or search for the application icon from a multi-application interface, to improve user experience.

In a possible implementation, the mobile phone 100 may allocate a queue with a preset length to the newly added application. A "first in first out" rule is applied to the queue. The queue records an ID of the application (APP) recently used by the user. The electronic device may invoke the queue to display, in a position of the newly added application icon based on the APP ID recorded in the queue, the APP recently used by the user. For example, it is assumed that the length of the queue is 4, that is, the mobile phone 100 may record, in the queue, ID information of four applications recently used by the user; and then invoke the queue to add and display application icons corresponding to IDs of the four applications in the queue in the DOCK region.

It should be understood that the application stored in the queue in this application of this application may include the fixed application in the DOCK region, or may not include the fixed application in the DOCK region.

EXAMPLE 1

FIG. 6(*a*) and FIG. 6(*b*) are used as an example. A time period from 7:00 to 12:00 in the morning is used as an example. It is assumed that a sequence in which the user opens APPs in this time period is WeChat and Weibo. For example, when time at which the user taps the "WeChat" application icon is 7:00 in the morning, and time at which the user taps the "Weibo" application icon is 7:15 in the morning, the mobile phone 100 may sequentially store IDs of the application icons in the preset queue according to a time sequence in which the user taps the application icons. For example, the queue stores ID information of WeChat and Weibo. In this case, the mobile phone 100 may invoke the preset queue, and add and display the APP icons corresponding to the APP IDs stored in the queue in the DOCK region. For example, in the schematic diagram shown in FIG. 6(*b*), in addition to the fixed application icon 501, the "WeChat" application icon and the "Weibo" application icon are newly added in the DOCK region.

EXAMPLE 2

Figure 7A:
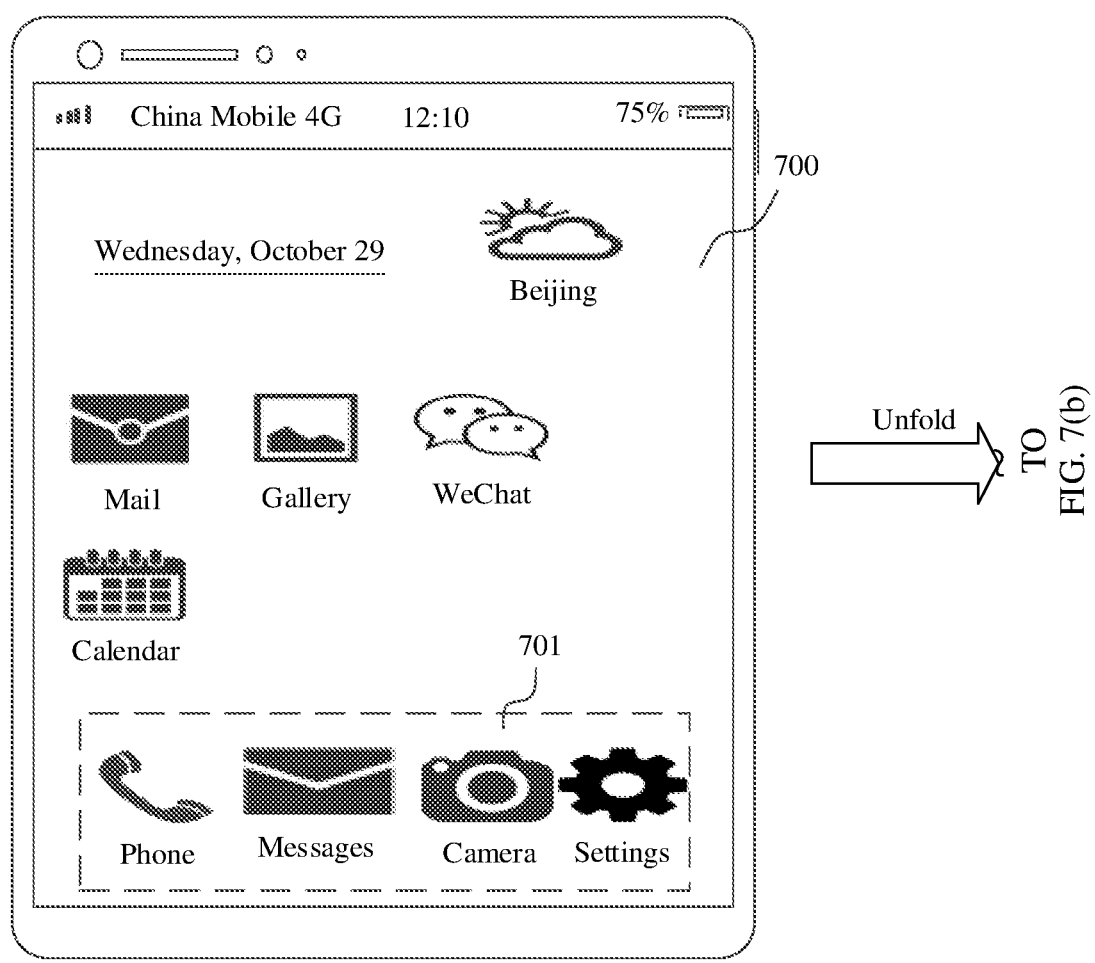
FIG. 7(a) and FIG. 7(b) are a schematic diagram of a group of graphical user interfaces according to an embodiment of this application.
Figure 7B:
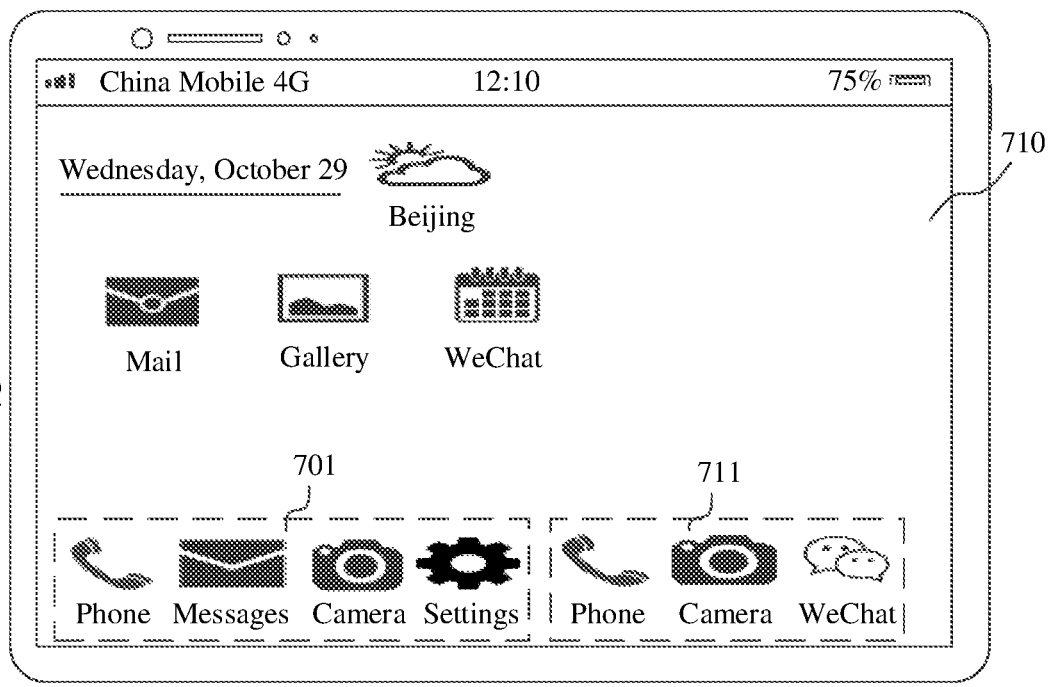

With reference to FIG. 7(*a*) and FIG. 7(*b*), it is assumed that a user interface of the mobile phone 100 in the folded state is shown in FIG. 7(*a*), and a user interface 600 includes a fixed application icon 701 in a DOCK region. When the application opened by the user is the fixed application in the DOCK region, it is assumed that a time sequence in which the user taps APPs from the morning to the evening is Phone, Camera, and WeChat, and a sequence in which the queue stores the APP IDs is Phone, Camera, and WeChat. A user interface of the mobile phone 100 in the unfolded state is shown in FIG. 7(*b*). In this case, when the mobile phone 100 invokes the queue, an application icon of Phone, an application icon of Camera, and an application icon of WeChat may be sequentially added in the DOCK region, for example, a newly added DOCK region 711 in FIG. 7(*b*). It may be understood that when there is a relatively large quantity of application icons in the DOCK region, to display more applications recently used by the user, a fixed application icon may not be repeatedly displayed in a newly added application icon position, to improve screen utilization.

It should be noted that, in this application, if the APP IDs stored in the queue include the fixed application ID, the mobile phone 100 may automatically filter out the fixed application icon when invoking the queue, and then sequentially add and display another application icon in the DOCK region.

EXAMPLE 3

The queue records the sequence in which the user uses APPs in the screen folded state. In this case, when the mobile phone 100 is in the unfolded state, the mobile phone 100 may add and display the APPs in the DOCK region in the sequence in which the user uses APPs in the folded state. It is assumed that in the screen folded state, a sequence in which the user taps APPs is WeChat, Gallery, and Calendar. When the screen is unfolded, application icons of WeChat, Gallery, and Calendar may be added to the application icon in the DOCK region and displayed in the DOCK region.

It may be understood that a quantity of application icons stored in the queue may alternatively be greater than or equal to a quantity of APPs used by the user in the screen folded state.

EXAMPLE 4

The queue records the sequence in which the user uses APPs in the screen unfolded state. In this case, when the mobile phone 100 detects that an included angle between two display screens is 180 degrees, that is, the display screen is in the unfolded state, the mobile phone 100 may store icons of the APP IDs in the queue in the sequence in which the user taps the APPs in the screen unfolded state. Then, the mobile phone 100 may invoke the queue, and add and display the icons of the APPs corresponding to the APP IDs stored in the queue in the DOCK region.

As shown in FIG. 8(*a*), it is assumed that an initial user interface of the mobile phone 100 in the unfolded state is a user interface 800. The user interface 800 includes a fixed application icon 801 in a DOCK region, a Gallery application icon 802, a WeChat application icon 803, and a Calendar application icon 804. It is assumed that a sequence in which the user taps APPs on the user interface 800 is sequentially the WeChat application icon 803, the Calendar application icon 804, and the Gallery application icon 802. In this case, an APP sequence stored in the queue is the same as the sequence in which the user taps the APPs. When the mobile phone 100 invokes the queue, the WeChat application icon 803, the Calendar application icon 804, and the Gallery application icon 802 may be sequentially added and displayed in the DOCK region. For example, as shown in FIG. 8(*b*), application icons in the DOCK region in a user interface 810 from left to right are sequentially the fixed application icon 801, the WeChat application icon 803, the Calendar application icon 804, and the Gallery application icon 802.

It should be noted that in this embodiment of this application, a preset time may be set between tapping an APP by the user and displaying the APP in the DOCK region. For example, after the user taps the APP, the APP tapped by the user may be added and displayed in the DOCK region after a time greater than or equal to 5 s.

It should be understood that the initial user interface of the mobile phone 100 in the unfolded state may be understood as a user interface when the user has not used any APP when the mobile phone 100 is in the unfolded state.

EXAMPLE 5

When the queue records the sequence in which the user uses APPs in the screen folded state and the sequence in which the user uses APPs in the screen unfolded state, the mobile phone 100 may separately record, based on a folding status of the screen, the sequence in which the user taps the APPs in the folded state and the sequence in which the user taps the APPs in the unfolded state; and then record the sequence of tapping the APP IDs in a queue. When detecting that the screen is in the unfolded state, the mobile phone 100 adds and displays the icons of the corresponding APPs in the DOCK region in the sequence that is of the APP IDs and that is stored in the queue. In addition, in this embodiment of this application, the application icon in the DOCK region may be updated in real time according to the sequence in which the user uses the APPs.

Figure 9A:
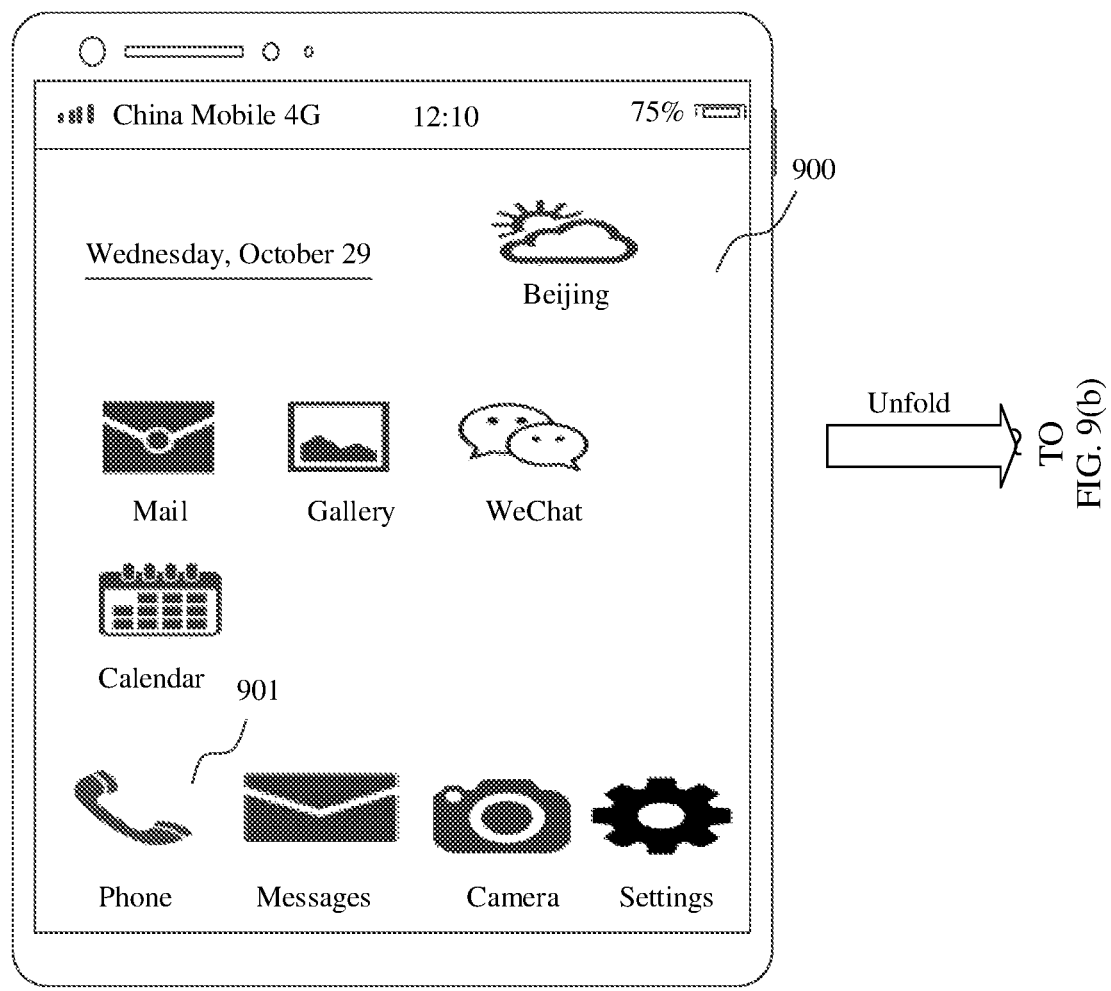
FIG. 9(a), FIG. 9(b), FIG. 9(c), and FIG. 9(d) are a schematic diagram of a group of graphical user interfaces according to an embodiment of this application.
Figure 9B:
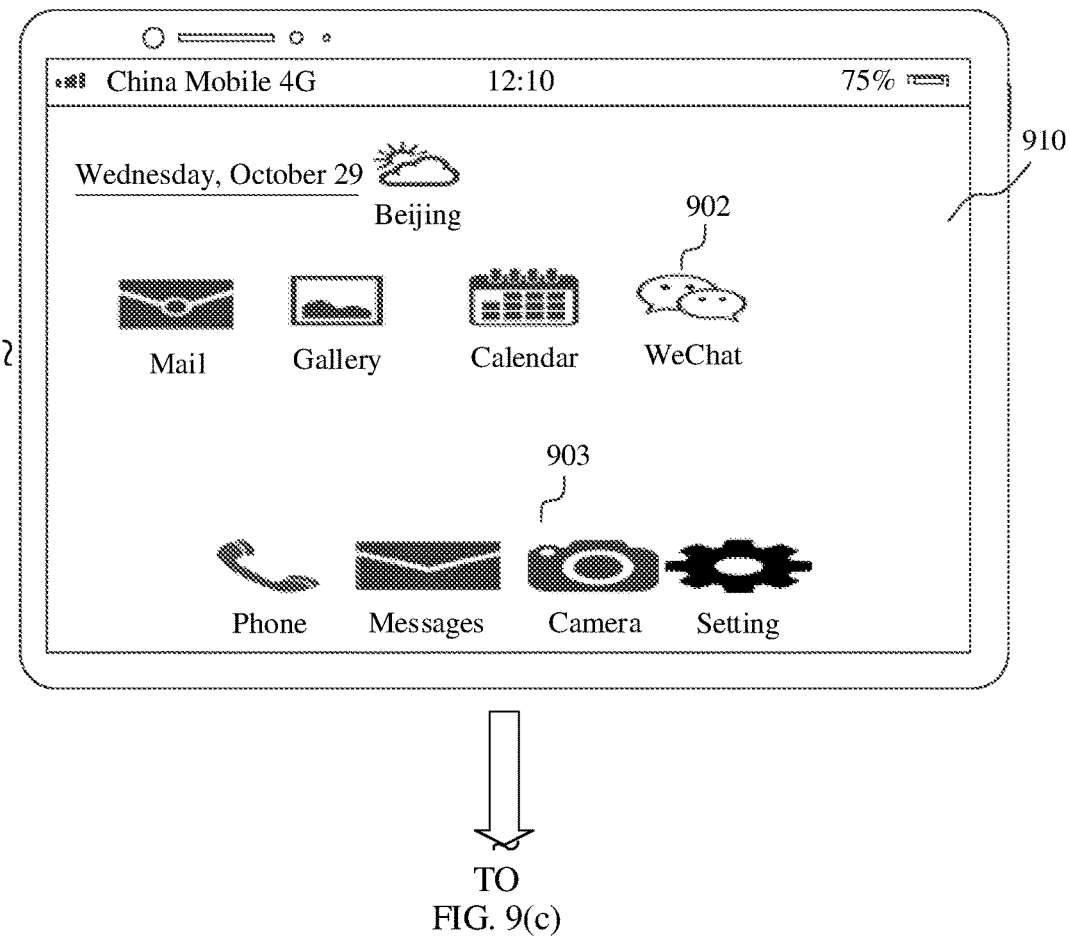

As shown in FIG. 9(a), FIG. 9(b), FIG. 9(c), and FIG. 9(d), it is assumed that when the mobile phone 100 is in the folded state, reference may be made to FIG. 9(a) for a user interface. It is assumed that an APP tapped by the user in a user interface 900 is a Phone application 901. When the mobile phone 100 detects that the screen is in the unfolded state, APPs tapped by the user in the unfolded state (with reference to a user interface 910 shown in FIG. 9(b)) are sequentially a WeChat application 902 and a Camera application 903. A sequence that is of APP IDs and that is stored in the queue is Phone, WeChat, and Camera. The mobile phone 100 invokes the queue to add and display the three application icons in the DOCK region, that is, Phone, WeChat, and Camera, for example, as shown in a user interface 920 in FIG. 9(c).

It should be noted that when the user taps a relatively large quantity of APPs, an icon of a former tapped APP may be replaced with an icon of a later tapped APP. For example, in FIG. 9(a), FIG. 9(b), FIG. 9(c), and FIG. 9(d), it is assumed that a sequence that is of APP IDs and that is stored in the queue is Phone 901, WeChat 902, Camera 903, Calendar 904, and Settings 905. The application icons newly displayed in the DOCK region may also be application icons of Camera, Calendar, and Settings, for example, as shown in a user interface 930 in FIG. 9(d). In other words, the mobile phone 100 may update the application icon in the DOCK region based on a current use status of the user.

Figure 9C:
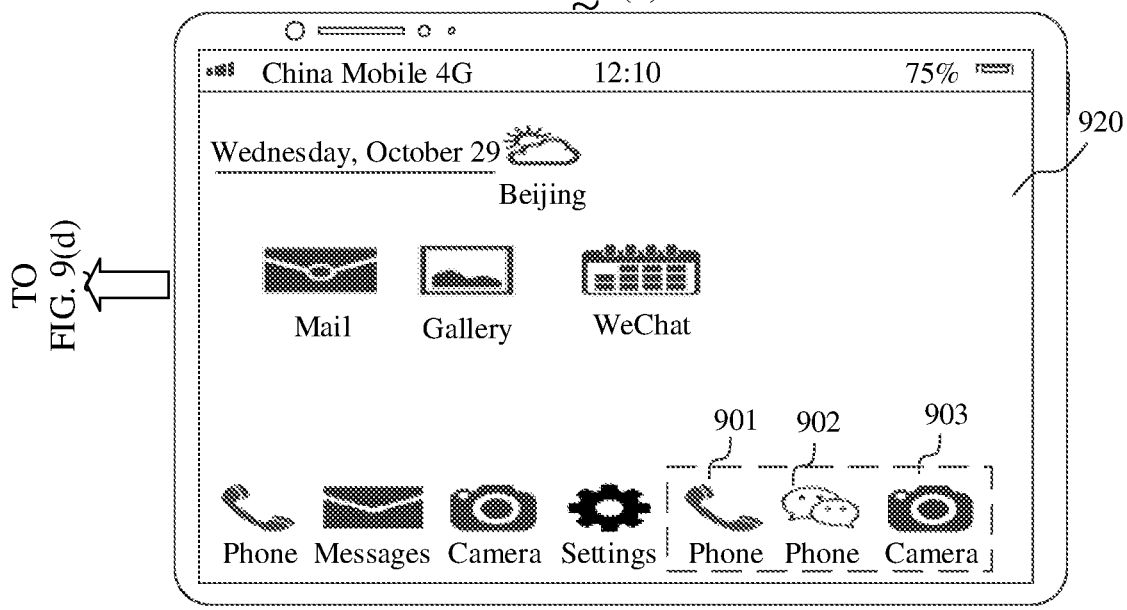
Figure 9D:
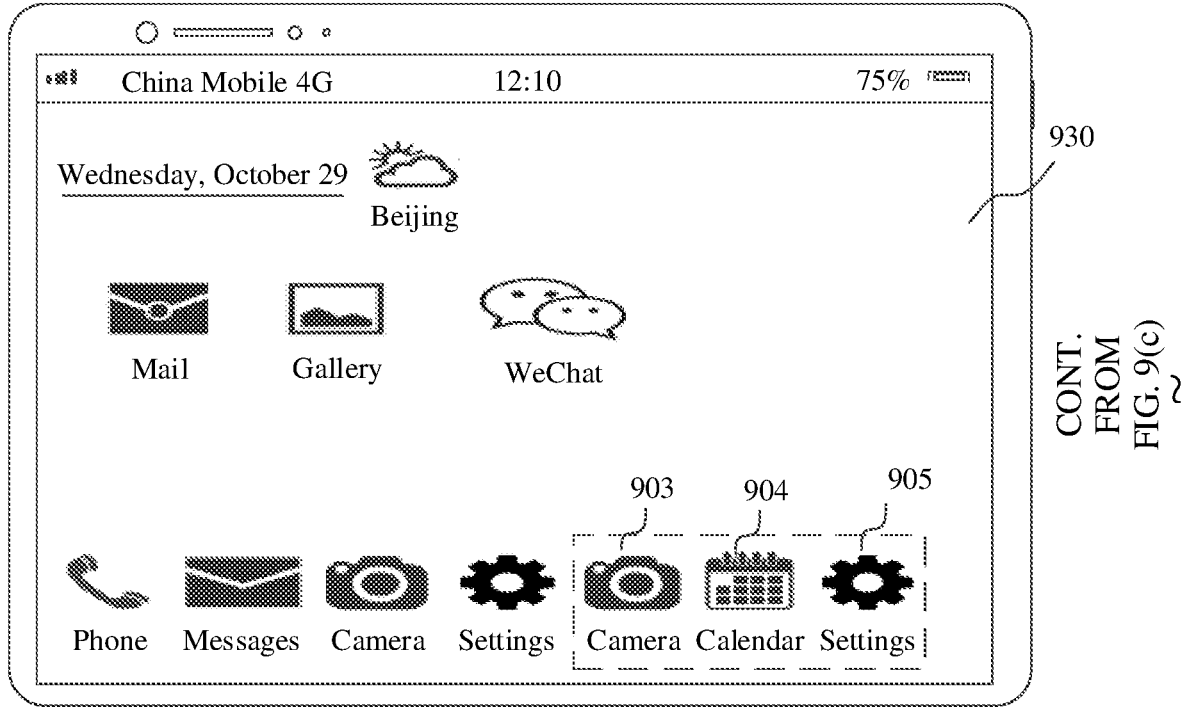

In this embodiment of this application, when the mobile phone 100 implements interaction in the unfolded state and the folded state, a previous use record of the user may be reserved for the application icon in the DOCK region. For example, it is assumed that the interface shown in FIG. 9(c) is adjusted to the folded state, and then the screen is adjusted to the unfolded state. In this case, the user interface may be further displayed based on the interface shown in FIG. 9(c).

Figure 10A:
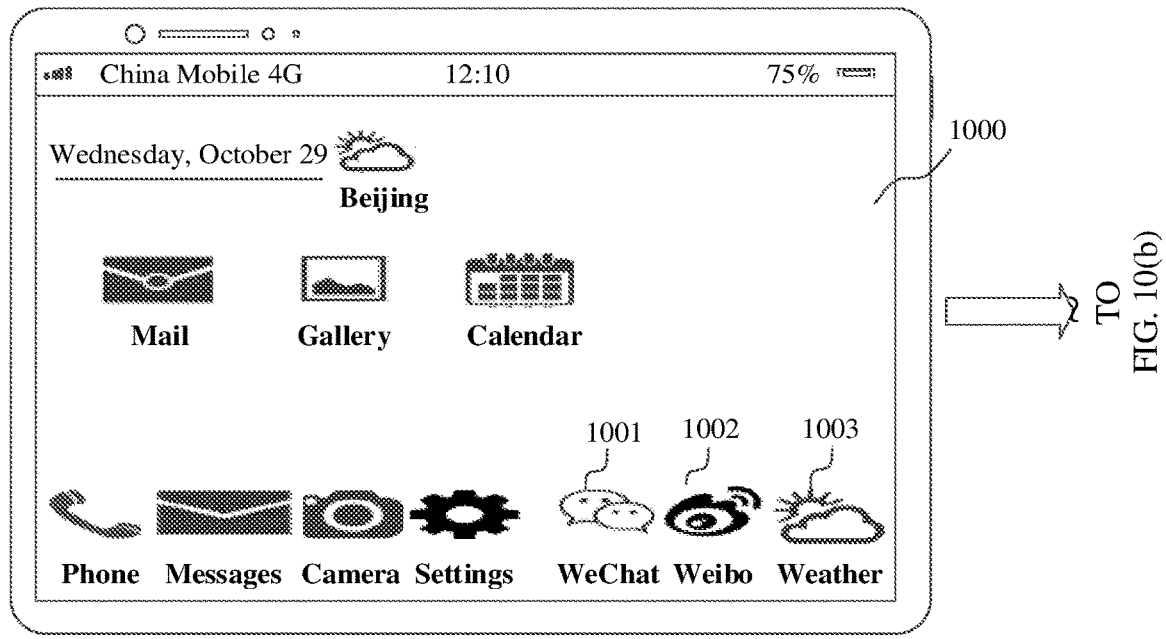
FIG. 10(a), FIG. 10(b), and FIG. 10(c) are a schematic diagram of a group of graphical user interfaces according to an embodiment of this application.
Figure 10B:
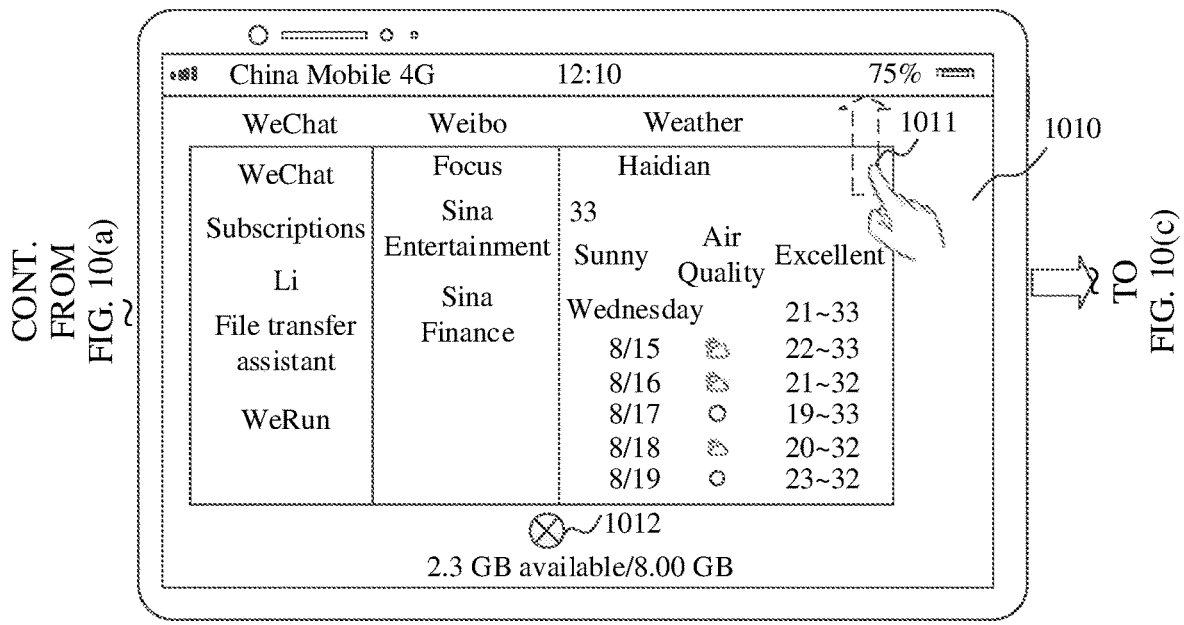
Figure 10C:
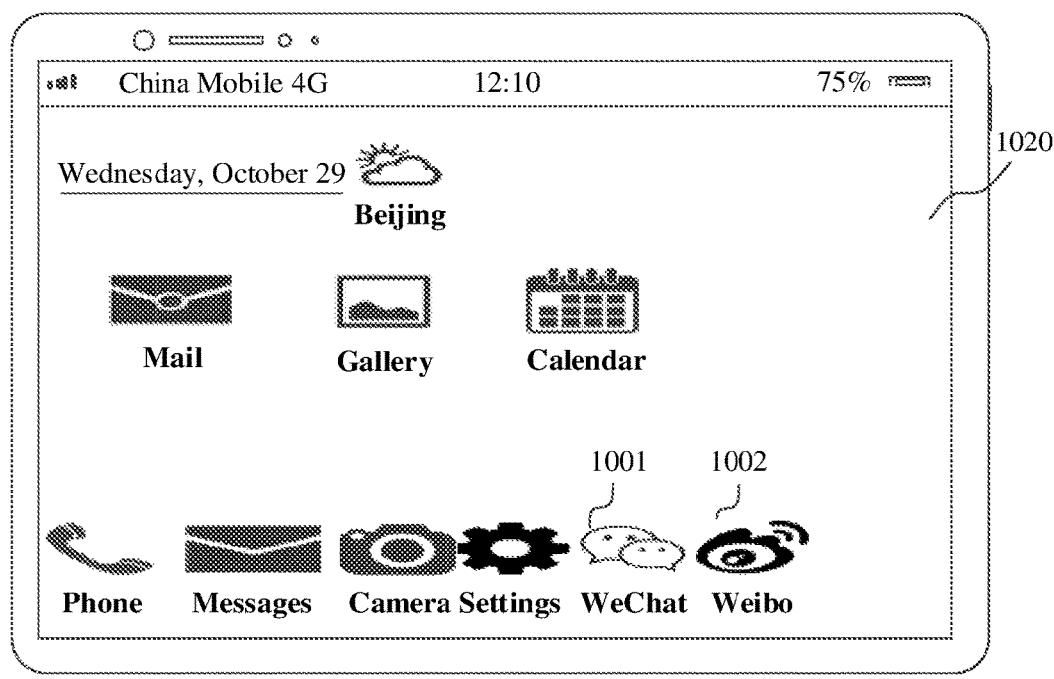

In some other embodiments, a recently used application icon newly added in the DOCK region of the mobile phone 100 may be consistent with an application running in the background. When the mobile phone 100 detects a first operation of the user, and the first operation may be manually closing a corresponding application by the user in a multi-application process, the mobile phone 100 may delete the corresponding application icon newly added in the DOCK region at the same time. For example, with reference to FIG. 10(a), FIG. 10(b), and FIG. 10(c), it is assumed that application icons newly added in the DOCK of the mobile phone 100 include WeChat 1001, Weibo 1002, and Weather 1003. For example, as shown in FIG. 10(a), when the mobile phone 100 detects a process of closing the application "Weather" by the user in a background process or a multi-application process, for example, as shown in FIG. 10(b), the mobile phone 100 may delete an application icon of "Weather" in the DOCK region. For example, reference is made to FIG. 10(c).

It should be noted that in a multi-application process shown in FIG. 10(b), the user may end the process in a manner of sliding the "Weather" process 1011 upward. The user may also end all application processes through tapping an icon 1012.

In still another embodiment, when the mobile phone 100 detects a first operation of the user. The first operation may be that the user manually closes a corresponding application in a multi-application process. The mobile phone 100 may not delete the corresponding application newly added in the DOCK region. For example, it is assumed that application icons newly added in the DOCK of the mobile phone 100 include WeChat, Weibo, and Weather. When the mobile phone 100 detects that the user closes a process of the application "Weather" in a background process or in a multi-application process, an application icon of "Weather" may be kept in the DOCK region unchanged. When the user actively moves the icon of "Weather" from the DOCK region, the application icon of "Weather" is not displayed in the DOCK region.

It should be noted that the queue with the preset length in this embodiment of this application may dynamically change. A larger unfolded area of the screen indicates the longer length of the queue and more application icons that can be displayed in the DOCK region. For example, it is assumed that the preset length of the queue is 6. When the mobile phone 100 is switched from the folded state to the unfolded state, the preset length of the queue may change from 6 to 10, and a quantity of application icons newly added in the DOCK region may be 10 or may be 6.

Further, in this embodiment of this application, when the screen of the mobile phone 100 is in the folded state, the application icon in the DOCK region is a fixed application icon. When the screen of the mobile phone 100 is in the unfolded state, the application icon in the DOCK region is an icon of an application recently used by the user. In other words, when the screen is in the unfolded state, the mobile phone 100 does not display the fixed application icon.

Figure 11A:
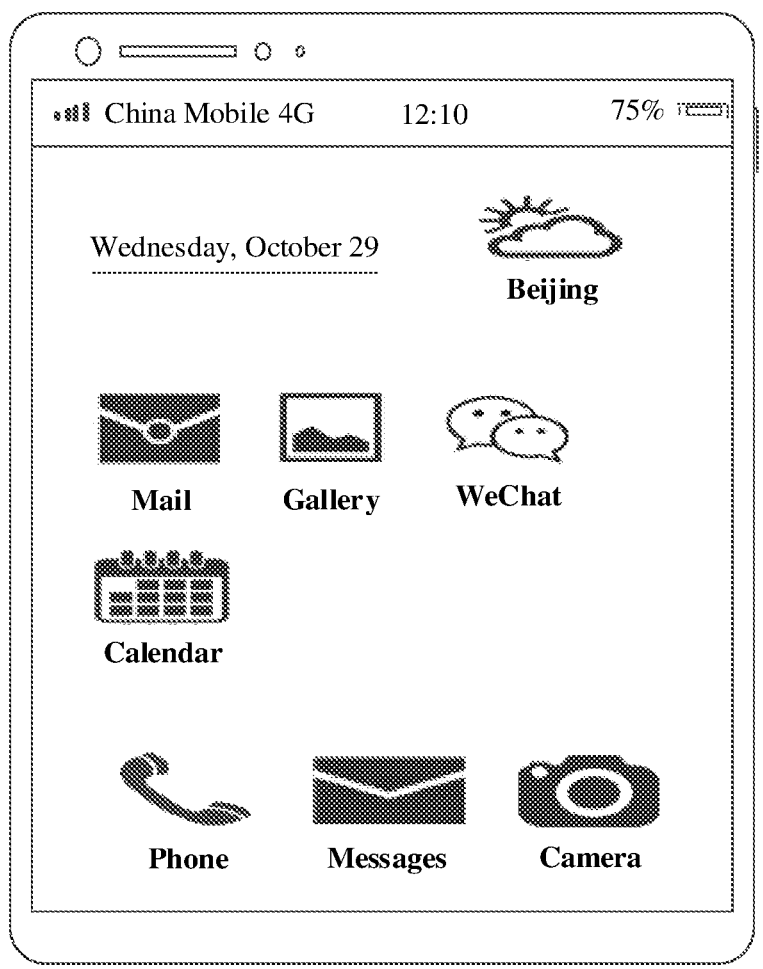
FIG. 11(a) and FIG. 11(b) are a schematic diagram of a group of graphical user interfaces according to an embodiment of this application.

For example, when the mobile phone 100 is in the folded state, the application icon in the DOCK region may be shown in FIG. 11(a). For example, the application icon in the DOCK region may include Phone, Messages, and Camera. When the mobile phone 100 is in the unfolded state, it is assumed that APPs recently used by the user are WeChat, Weibo, Settings, and Gallery. In this case, reference may be made to FIG. 11(b) for the application icon in the DOCK region when the mobile phone 100 is in the unfolded state.

Figure 11A:
Figure 11B:
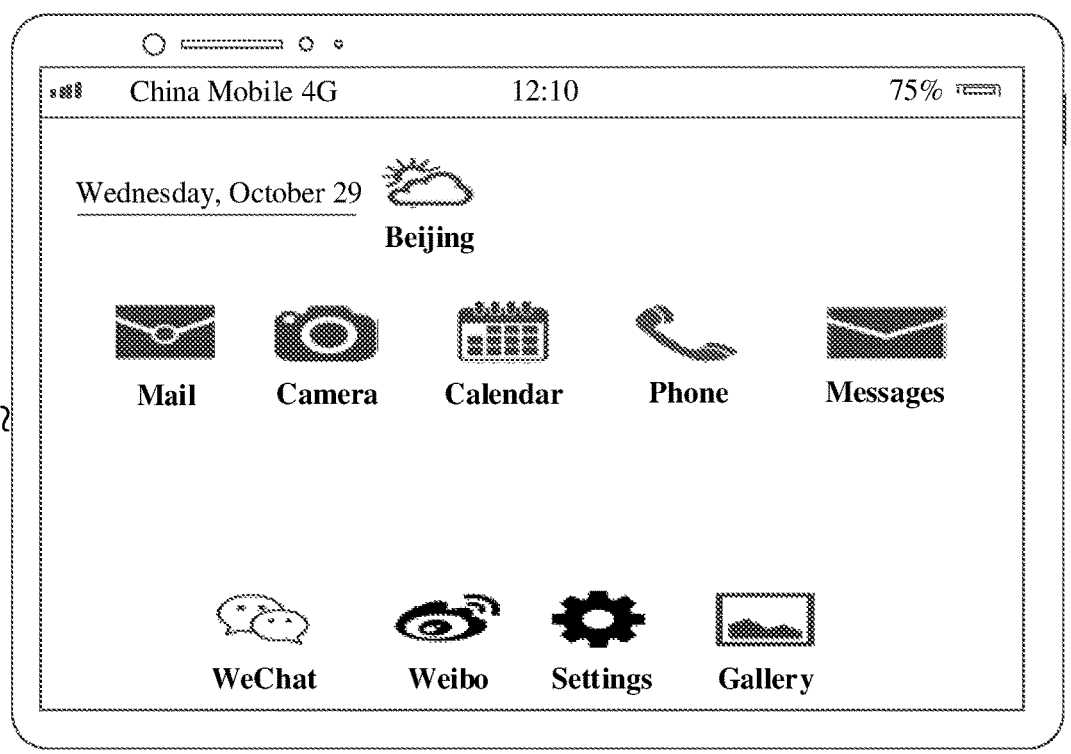

It should be noted that in the embodiment shown in FIG. 11(a) and FIG. 11(b), the application recently used by the user may be an application recently used by the user when the screen is in the folded state, or may be an application recently used by the user when the screen is in the unfolded state, or may be applications recently used by the user when the screen is in the folded state and when the screen is in the unfolded state.

Further, in this embodiment of this application, the fixed application icon may not be set in the DOCK region. In other words, all the application icons in the DOCK region are all applications frequently used by the user. Specifically, the following cases are included:

In a first case, the application icon in the DOCK region when the mobile phone 100 is in the folded state is an icon of an application recently used by the user in the folded state.

When the display screen of the mobile phone 100 is in the unfolded state, the application icon in the DOCK region may be the icon of the application recently used by the user in the folded state. It may be understood that in this case, the user does not use another APP when the screen is in the unfolded state.

Figure 12A:
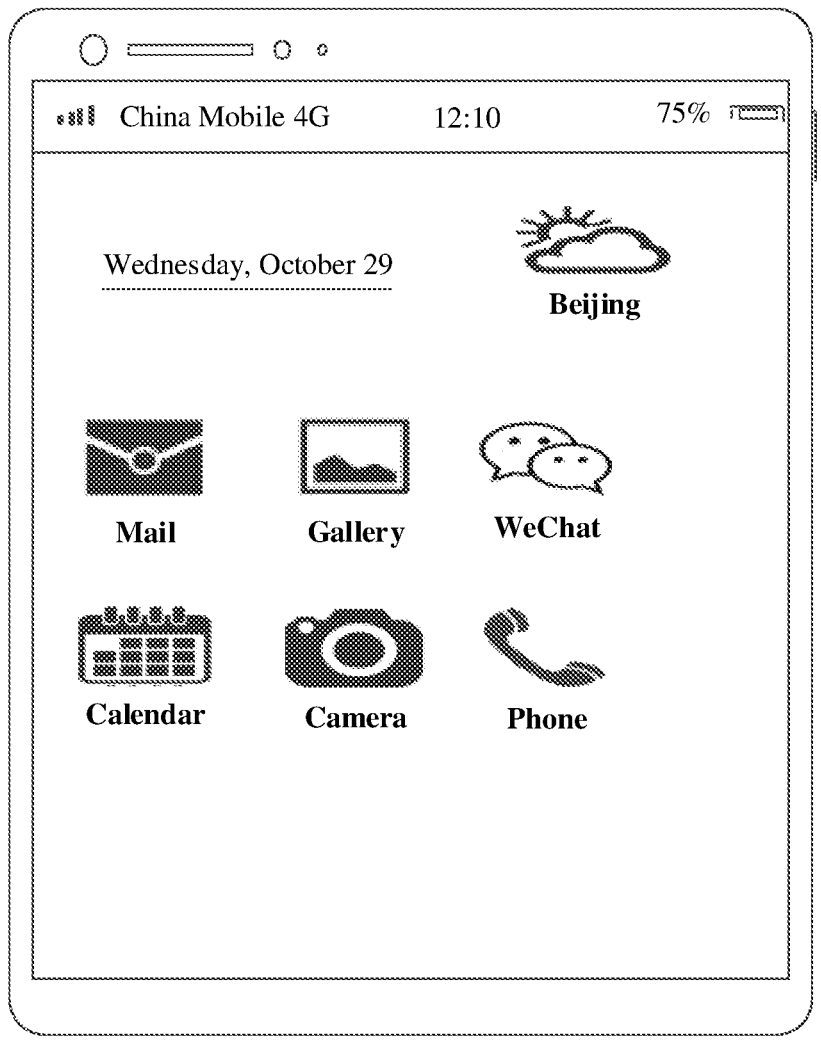
FIG. 12A(a) and FIG. 12A(b) are a schematic diagram of a group of graphical user interfaces according to an embodiment of this application.
Figure 12A:
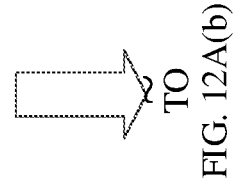
Figure 12A:
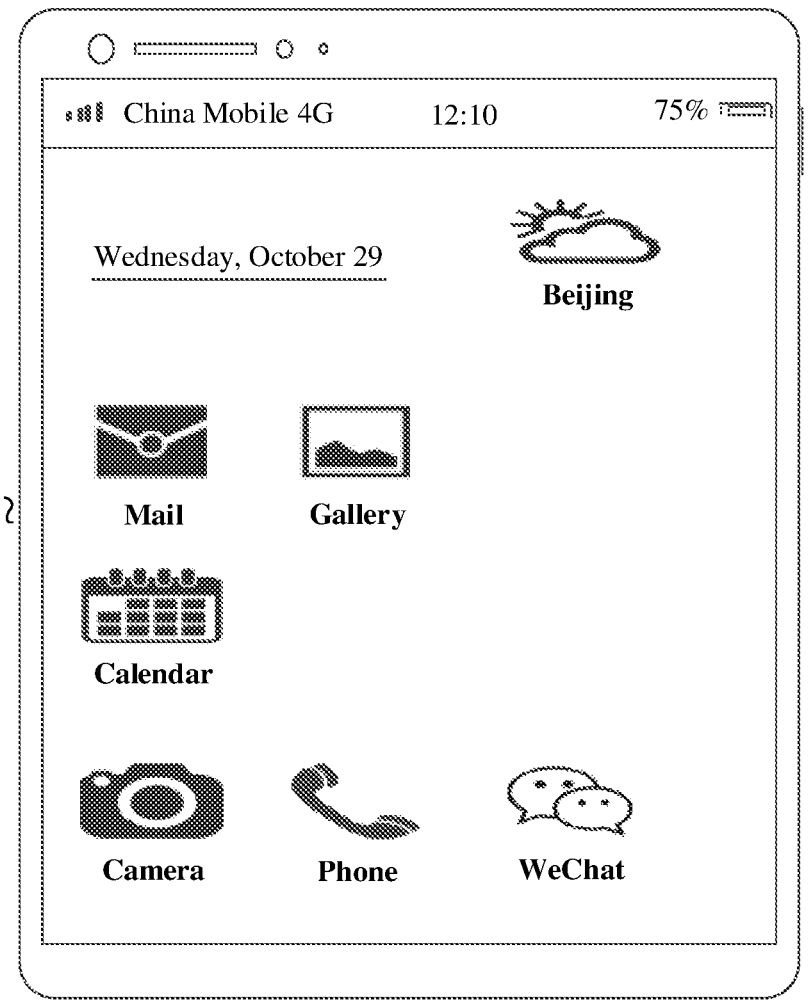

As shown in FIG. 12A(a) and FIG. 12A(b), a schematic diagram of an interface of the mobile phone 100 in the folded state may be shown in FIG. 12A(a). It is assumed that the applications recently used by the user in the folded state include Camera, Phone, and WeChat, and a sequence in which the user uses APPs and that is recorded in a queue is Camera, Phone, and WeChat. Therefore, the application icon in the DOCK region of the mobile phone 100 in the folded state may be shown in FIG. 12A(b).

Figure 12B:
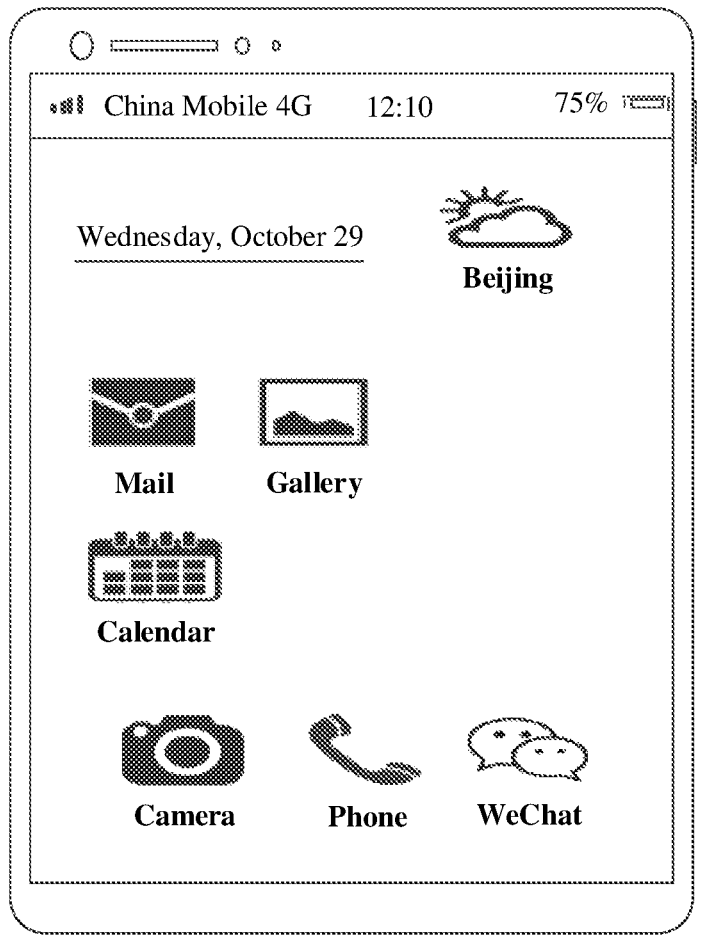
FIG. 12B(a), FIG. 12B(b), and FIG. 12B(c) are a schematic diagram of a group of graphical user interfaces according to an embodiment of this application.
Figure 12B:
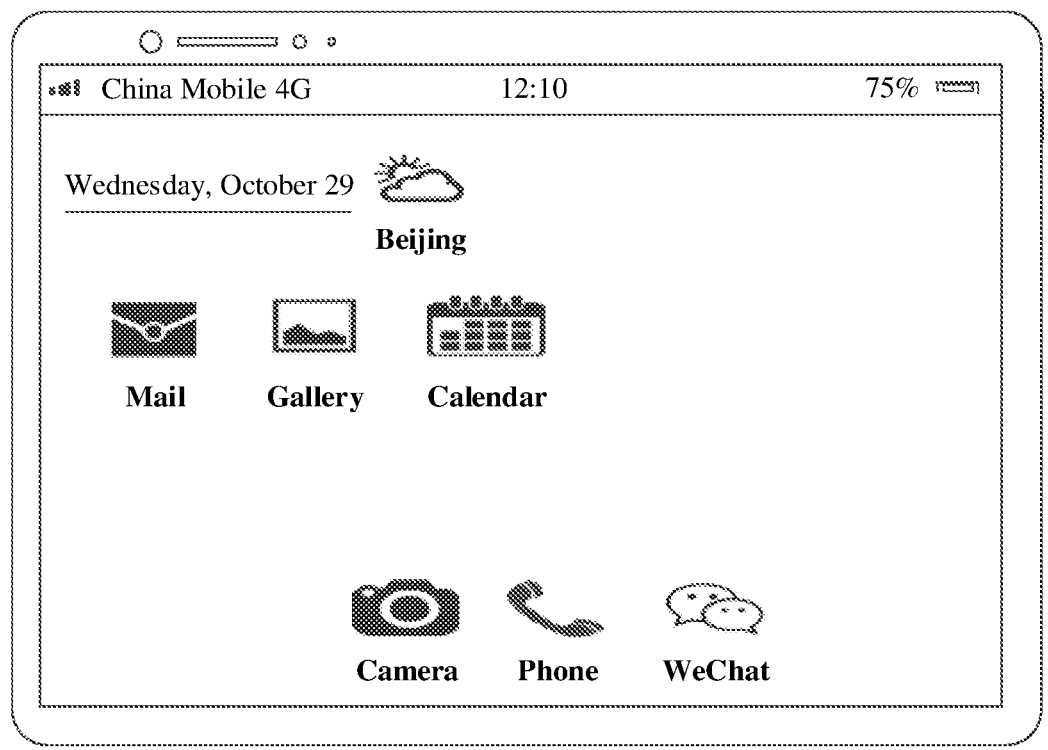
Figure 12B:
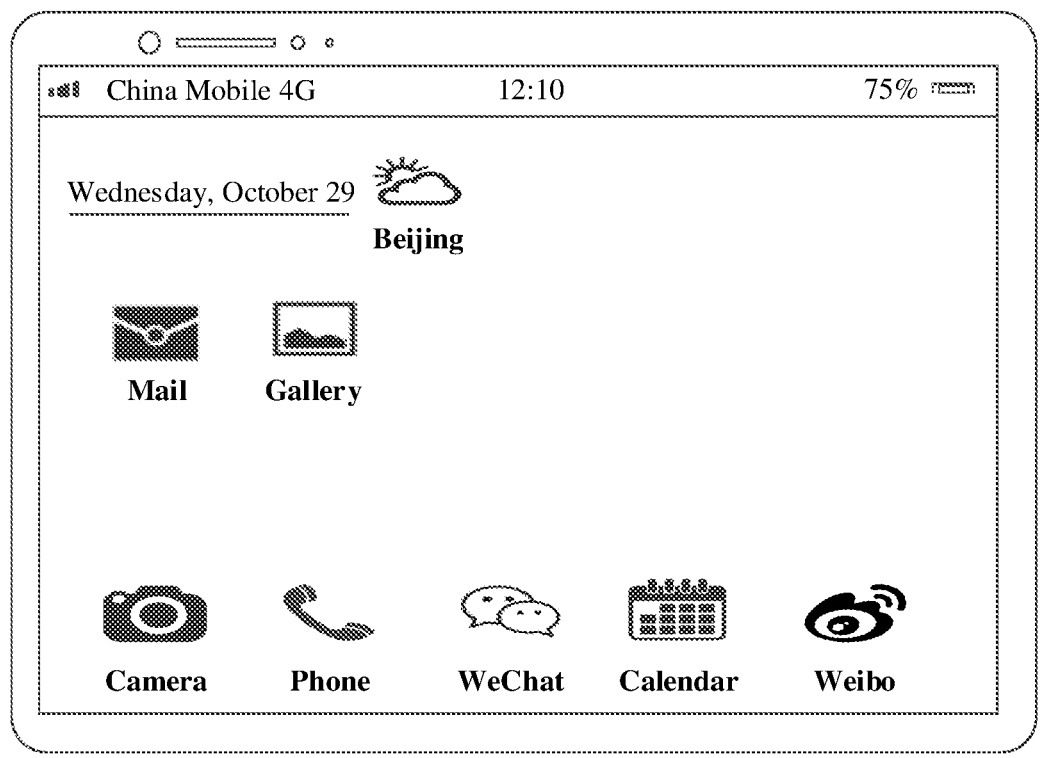

As shown in FIG. 12B(a), FIG. 12B(b), and FIG. 12B(c), when the application icon in the DOCK region of the mobile phone in the folded state is an icon of an application recently used by the user in the folded state, as shown in FIG. 12B(a), if it is detected that the mobile phone 100 is in the unfolded state, the application icon in the DOCK region of the mobile phone 100 may be an icon of an application recently used by the user in the folded state. In other words, the application icon in the DOCK region remains unchanged. As shown in FIG. 12B(b), the application icons in the DOCK region of the mobile phone 100 in the unfolded state may be application icons of Camera, Phone, and WeChat.

In a second case, the application icon in the DOCK region when the mobile phone 100 is in the folded state is an icon of an application recently used by the user in the screen folded state. When the mobile phone 100 is in the unfolded state, the application icon in the DOCK region may be an icon of an application recently used by the user in the folded state and an icon of an application recently used by the user in the screen unfolded state. It may be understood that in this case, a quantity of application icons stored in the queue is greater than a quantity of icons of applications recently used by the user in the screen folded state.

It is assumed that the application icons in the DOCK region of the mobile phone 100 in the folded state are shown in FIG. 12B(a). In other words, applications recently used by the user when the screen is in the folded state are Camera, Phone, and WeChat. It is assumed that a sequence in which the user taps APPs is Weibo and Calendar when the mobile phone 100 is in the unfolded state. When the mobile phone 100 is in the unfolded state, as shown in FIG. 12B(c), the application icons in the DOCK region may be application icons of Camera, Phone, WeChat, Weibo, and Calendar.

In a third case, the application icon in the DOCK region when the mobile phone 100 is in the folded state is an icon of an application recently used by the user when the screen is in the folded state. When the mobile phone 100 is in the unfolded state, the application icon in the DOCK region may be an icon of an application recently used by the user in the screen unfolded state.

Figure 13A:
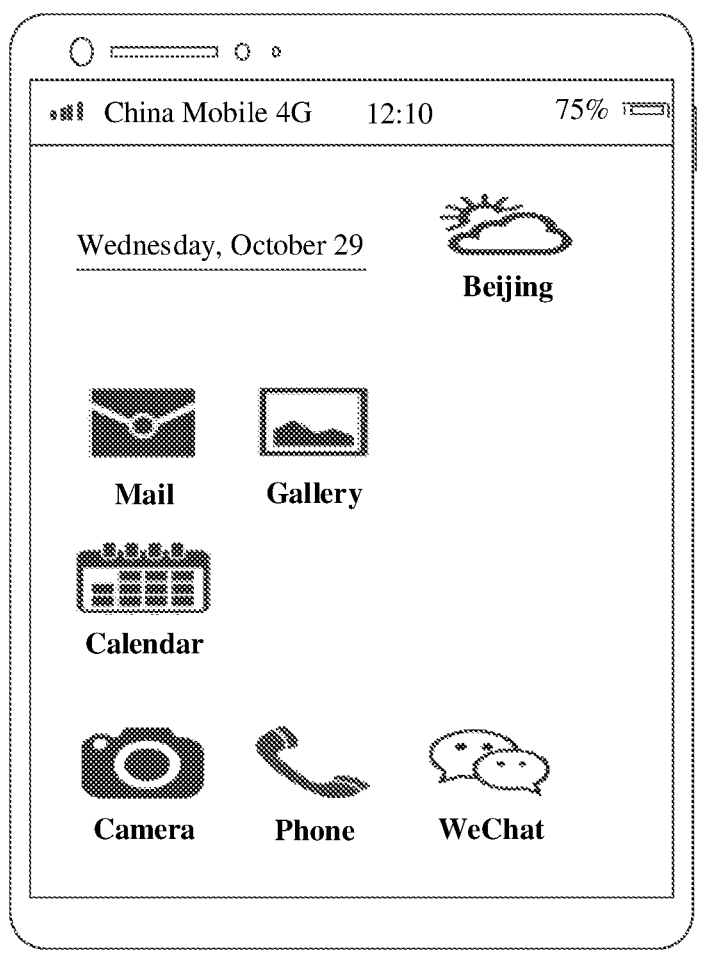
FIG. 13(a) and FIG. 13(b) are a schematic diagram of a group of graphical user interfaces according to an embodiment of this application.
Figure 13B:
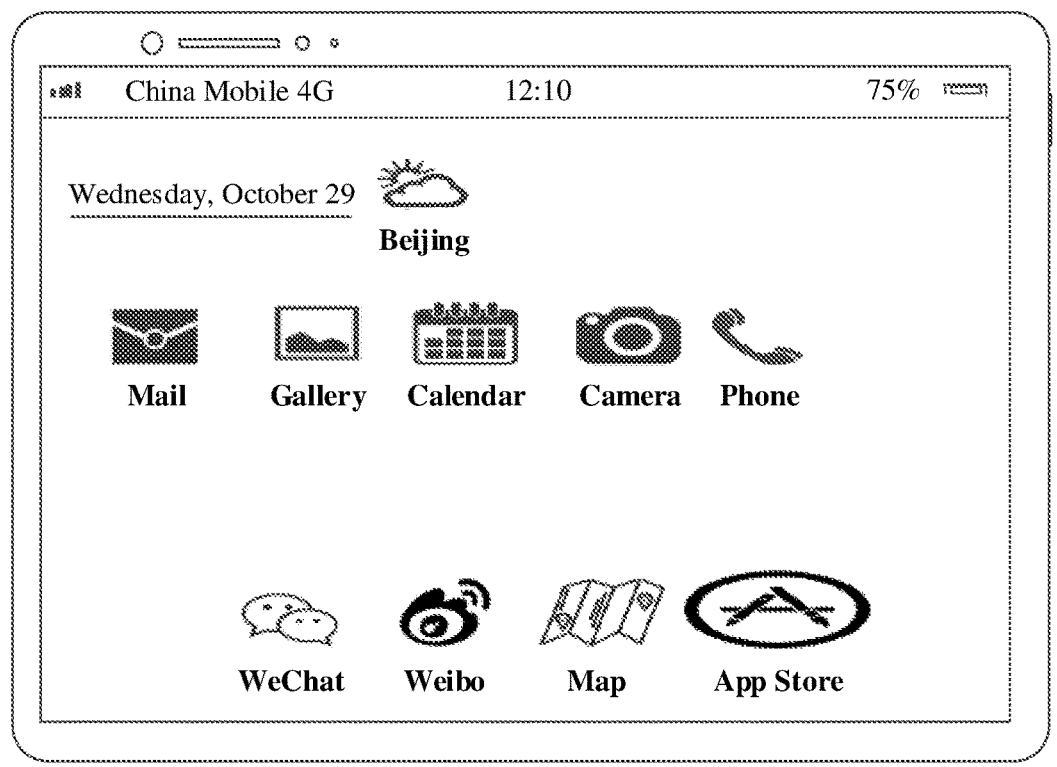

As shown in FIG. 13(a) and FIG. 13(b), the application icons in the DOCK region of the mobile phone 100 in the folded state is shown in FIG. 13(a). It is assumed that when the mobile phone 100 detects that the screen is in the unfolded state, APPs recently used by the user when the screen is in the unfolded state are sequentially WeChat, Weibo, Map, and APP Store. When the screen is in the unfolded state, the application icons in the DOCK region may be WeChat, Weibo, Map, and APP Store. For details, refer to FIG. 13(b).

It should be noted that when the electronic device is in the folded state, if the user does not use any APP, the DOCK region in the folded state may not display the application icon.

In a scenario 2, the mobile phone 100 may add, in the DOCK region, an icon of an application highly frequently used by the user in a preset time.

In a possible implementation, the mobile phone 100 may create an Account( )object in advance, collect statistics of a quantity of times of using each APP within a preset time in the object, and then sort the quantities of times of using the APPs. Finally, the mobile phone 100 may add and display, in the DOCK region based on a sorting result, an icon of at least one APP highly frequently used by the user.

In addition, in this application, a threshold may also be set for a quantity of newly added and displayed application icons. It should be understood that, in this application, the quantity of application icons in the DOCK region may be determined based on an actual size of a screen of an electronic device, screen resolution, and a minimum touch control recommendation size of a thumb of the user.

It should be noted that the Account( ) object created in this embodiment of this application is used to store the quantity of times of using each APP. This application is not limited thereto. For example, a table may be created in advance. The quantity of times of using the APP is recoded in the table. This is not limited in this application.

EXAMPLE 1

Figure 6A:
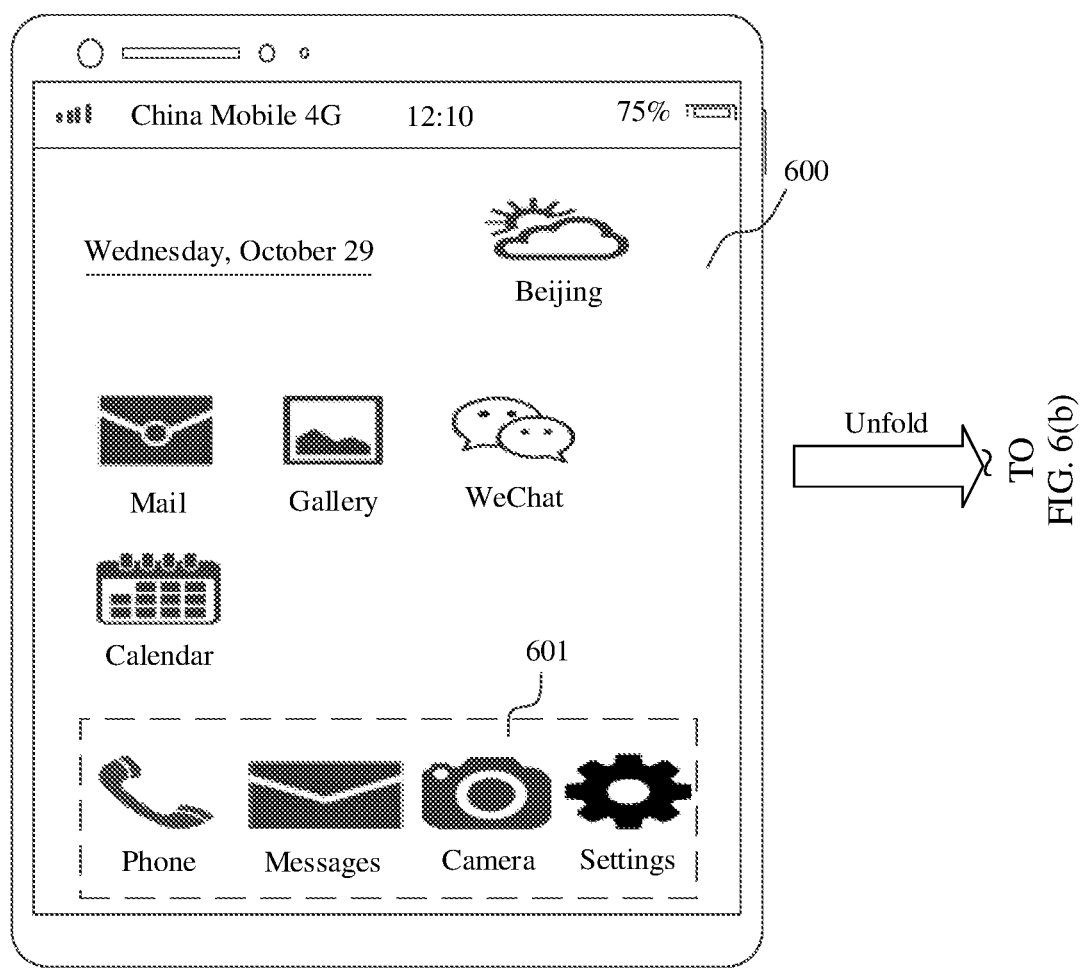
FIG. 6(a) and FIG. 6(b) are a schematic diagram of a group of graphical user interfaces according to an embodiment of this application.
Figure 6B:
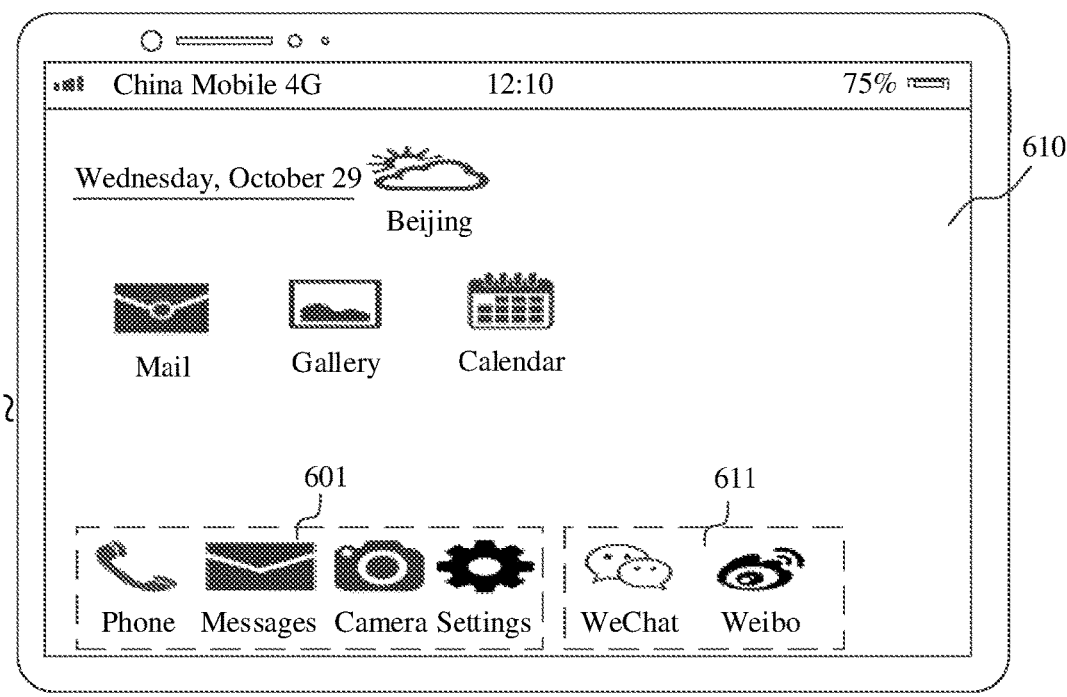

When the mobile phone 100 is in the folded state, and the DOCK region shows the fixed application icon, if it is detected that the mobile phone 100 is switched to the unfolded state, the APP highly frequently used by the user when the screen is in the folded state may be added and displayed in the DOCK region. FIG. 6(a) and FIG. 6(b) are used as an example for description. It is assumed that the fixed application icons in the DOCK region in the folded state are four applications icons of Phone, Messages, Camera, and Settings. If APPs whose quantities of use times rank top two for the user when the mobile phone 100 is in the folded state are WeChat and Weibo, the application icons in the DOCK region of the mobile phone 100 in the unfolded state may further include application icons of WeChat and Weibo in addition to the four fixed application icons. It may be understood that a quantity of times of using WeChat is greater than a quantity of times of using Weibo in the schematic diagram shown in FIG. 6(b).

EXAMPLE 2

Figure 8A:
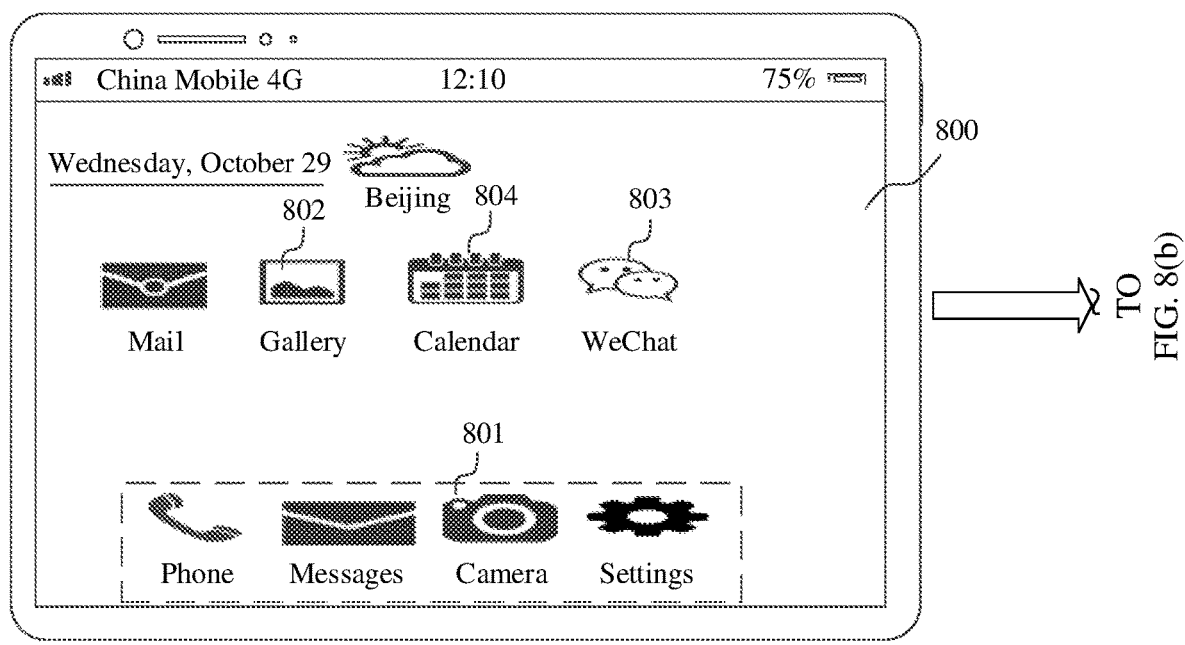
FIG. 8(a) and FIG. 8(b) are a schematic diagram of a group of graphical user interfaces according to an embodiment of this application.
Figure 8B:
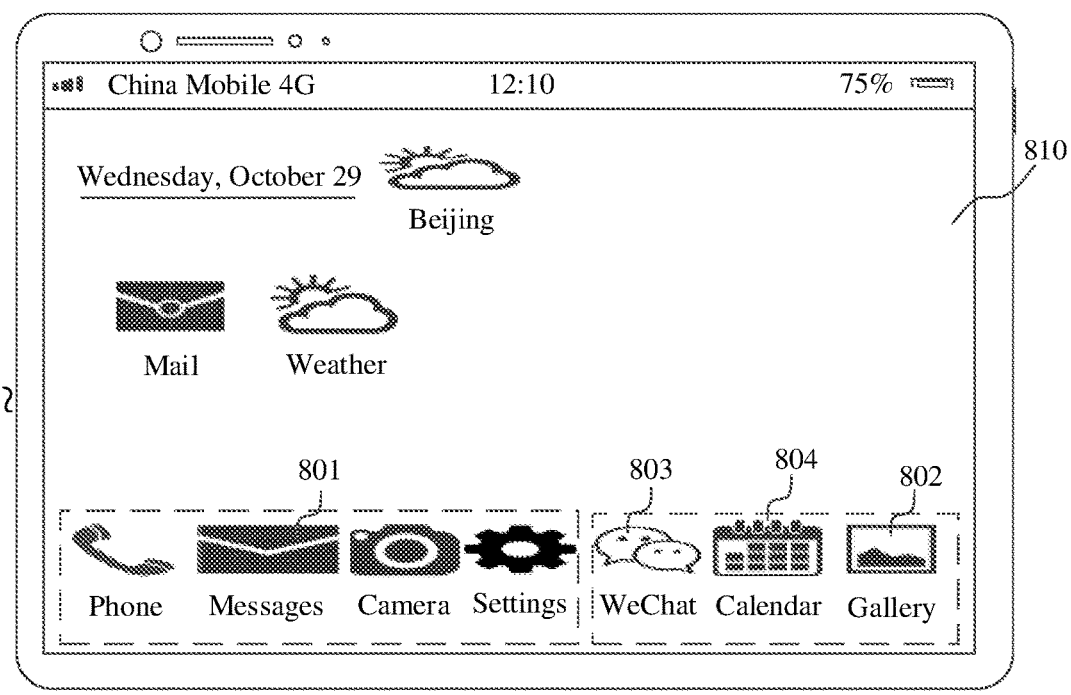

When the mobile phone 100 is in the folded state, and the DOCK region shows the fixed application icon, if it is detected that the mobile phone 100 is switched to the unfolded state, the APP highly frequently used by the user in the screen unfolded state may be added and displayed in the DOCK region. FIG. 8(a) and FIG. 8(b) are used as an example for description. It is assumed that quantities of times of using APPs by the user when the mobile phone 100 is in the unfolded state are sorted in a descending order, and APPs whose quantities of use times rank top three are sequentially WeChat, Calendar, and Gallery. In this case, as shown in FIG. 8(b), in the screen unfolded state, three application icons of WeChat, Calendar, and Gallery may be added and displayed in the DOCK region.

EXAMPLE 3

When the mobile phone 100 is in the folded state, and the DOCK region shows the fixed application icon, if it is detected that the mobile phone 100 is switched to the unfolded state, the APPs highly frequently used by the user when the screen is in the folded state and when the screen is in the unfolded state may be added and displayed in the DOCK region. It should be noted that in this example, a quantity of times of using an APP by the user when the screen is in the folded state may be different from a quantity of times of using the APP by the user when the screen is in the unfolded state. Therefore, in this application, the quantities of times of using the same APP by the user in the two states may be combined for statistics collection. For example, when the mobile phone 100 is in the folded state, a quantity of times of using WeChat by the user is two; and when the mobile phone 100 is in the unfolded state, a quantity of times of using WeChat by the user is three. The following may be obtained through statistic collection: The total quantity of times of using WeChat by the user is five. The quantity of times of using WeChat by the user may be recorded as five.

FIG. 9(*a*), FIG. 9(*b*), FIG. 9(*c*), and FIG. 9(*d*) are used as an example. It is assumed that quantities of times of using APPs by the user when the mobile phone 100 is in the folded state and when the mobile phone 100 is in the unfolded state are sorted in a descending order, and APPs with top three quantities are sequentially Phone, WeChat, and Camera. In the unfolded state, as shown in FIG. 9(*c*), three application icons of Phone, WeChat, and Camera may be added and displayed in the application icon in the DOCK region. It may be understood that if the user uses a relatively large quantity of applications within a preset time, the application icon in the DOCK region may be dynamically adjusted in real time based on the quantities of times of using the APPs by the user. For example, it is assumed that applications highly frequently used by the user are Phone, WeChat, Camera, Calendar, and Settings. The application icons in the DOCK region may also be updated to those shown in a schematic diagram of an interface shown in FIG. 9(*d*). In other words, for an application icon newly added in the DOCK region, a former APP may be moved out of the DOCK region based on an APP use status of the user, to implement real-time update of the application icon in the DOCK region.

EXAMPLE 4

When the mobile phone 100 is in the folded state, the DOCK region includes a fixed application icon. When the mobile phone 100 is in the unfolded state, the application icon in the DOCK region may be at least one APP highly frequently used by the user. FIG. 11(*a*) and FIG. 11(*b*) are used as an example for description. It is assumed that the application icons in the DOCK region of the mobile phone 100 in the folded state are Phone, Messages, and Camera. It is assumed that the APPs highly frequently used by the user include WeChat, Weibo, Settings, and Gallery. A quantity of times of using WeChat by the user is greater than a quantity of times of using Weibo. The quantity of times of using Weibo by the user is greater than a quantity of times of using Settings. The quantity of times of using Settings by the user is greater than a quantity of times of using Gallery. When the screen of the mobile phone 100 is unfolded, reference may be made to FIG. 11(*b*) for the application icon in the DOCK region.

It should be noted that in the embodiment shown in FIG. 11(*a*) and FIG. 11(*b*), the application highly frequently used by the user may be an application highly frequently used by the user when the screen is in the folded state, or may be an application highly frequently used by the user when the screen is in the unfolded state, or may be applications highly frequently used by the user when the screen is in the folded state and when the screen is in the unfolded state.

EXAMPLE 5

When the DOCK region does not include a fixed application icon, the mobile phone 100 is in the folded state. The application icon in the DOCK region may be at least one APP highly frequently used by the user in the folded state. FIG. 12A(a) and FIG. 12A(b) are used as an example. It is assumed that the APPs highly frequently used by the user when the mobile phone 100 is in the folded state include Camera, Phone, and WeChat. A quantity of times of using Camera by the user is greater than a quantity of times of using Phone. The quantity of times of using Phone by the user is greater than a quantity of times of using WeChat. In this case, when the mobile phone 100 is in the folded state, as shown in FIG. 12A(b), three application icons of Camera, Phone, and WeChat may be displayed in the DOCK region.

Further, after the mobile phone 100 is switched from the folded state to the unfolded state, the applications highly frequently used by the user when the mobile phone 100 is in the folded state may be displayed in the DOCK region, for example, as shown in a schematic diagram shown in FIG. 12B(b).

EXAMPLE 6

When the application icon in the DOCK region of the mobile phone 100 in the folded state is the application icon highly frequently used by the user when the mobile phone 100 is in the folded state, if the mobile phone 100 is switched from the folded state to the unfolded state, the user may tap an APP when the mobile phone 100 is in the unfolded state. The application icons in the DOCK region in the folded state may be application icons highly frequently used by the user when the mobile phone 100 is in the folded state and when the mobile phone 100 is in the unfolded state.

EXAMPLE 7

When the application icon in the DOCK region of the mobile phone 100 in the folded state is the application icon highly frequently used by the user in the folded state, if the mobile phone 100 is switched from the folded state to the unfolded state, the user may tap an APP when the mobile phone 100 is in the unfolded state. The application icon in the DOCK region in the unfolded state may be an application icon highly frequently used by the user when the mobile phone 100 is in the unfolded state. FIG. 13(*a*) and FIG. 13(*b*) are used as an example for description. It is assumed that the APPs highly frequently used by the user when the mobile phone 100 is in the folded state are application icons in the DOCK region shown in FIG. 13(*a*). After the electronic device is in the unfolded state, top four APPs highly frequently used by the user are sequentially WeChat, Weibo, Map, and APP Store. For display of the DOCK region of the mobile phone 100 in the unfolded state, refer to the application icons in the DOCK region shown in FIG. 13(*b*).

In a scenario 3, the mobile phone 100 may add, in the DOCK region, an icon of at least one application used by the user for a relatively long time in a preset time.

In this embodiment of this application, the mobile phone 100 may collect statistics duration of using each APP by the user in the preset time, then sort the duration of using the APPs, select at least one APP with relatively long use duration in a descending order of duration of using the APPs, and display the selected APP in the DOCK region.

In a first case, when the DOCK region includes a fixed application icon, the at least one APP with the relatively long use duration is added and displayed in the DOCK region.

When the mobile phone 100 is in the folded state, the DOCK region includes a fixed application icon. When the mobile phone 100 is switched to the unfolded state, the application icon in the DOCK region in the unfolded state may be displayed in the following several manners:

(1) The mobile phone 100 in the folded state adds and displays, in the DOCK region, an icon of the at least one APP used by the user for the relatively long duration in the preset time.

(2) The mobile phone 100 in the unfolded state adds and displays, in the DOCK region, an icon of the at least one APP used by the user for the relatively long duration in the preset time.

(3) The mobile phone 100 in the folded state or in the unfolded state adds and displays, in the DOCK region, an icon of the at least one APP used by the user for the relatively long duration in the preset time.

(4) The mobile phone 100 in the folded state and/or in the unfolded state displays, in the DOCK region, an icon of the at least one APP used by the user for the relatively long duration in the preset time.

In a second case, when the DOCK region does not include a fixed application icon, the at least one APP with the relatively long use duration is displayed in the DOCK region.

When the mobile phone 100 is in the folded state, the DOCK region does not include a fixed application icon. The application icon in the DOCK region may be displayed in the following several manners:

(1) The mobile phone 100 in the folded state displays, in the DOCK region in the folded state, an icon of the at least one APP used by the user for the relatively long duration.

(2) When the mobile phone 100 is in the folded state, and the APP in the DOCK region is at least one APP used by the user for relatively long duration when the mobile phone 100 is in the folded state, if the mobile phone 100 is switched to the unfolded state, the at least one APP used by the user for the relatively long duration when the mobile phone 100 is in the unfolded state may be displayed in the DOCK region in the unfolded state.

(3) When the mobile phone 100 is in the folded state, and the APP in the DOCK region is at least one APP used by the user for relatively long duration when the mobile phone 100 is in the folded state, if the mobile phone 100 is switched to the unfolded state, the at least one APP used by the user for the relatively long duration when the mobile phone 100 is in the unfolded state and when the mobile phone 100 is in the folded state may be displayed in the DOCK region in the unfolded state.

It should be noted that the method for displaying application icons in the DOCK region in this scenario is similar to the display manners in the foregoing two scenarios. The only difference is different selected APPs. The APPs selected in the foregoing two scenarios are the APPs recently used by the user and the APPs used by the user for a relatively large quantity of times. The APPs selected in this scenario are the APPs used by the user for relatively long duration. For a specific schematic diagram and description in this scenario, refer to the schematic diagrams and the description in the foregoing two scenarios.

In a scenario 4, the mobile phone 100 may add, in the DOCK region, an icon of a corresponding application based on a rule in which the user uses the APPs in a preset time.

In a possible implementation, the mobile phone 100 may dynamically adjust the application icon in the DOCK region based on a time rule in which the user uses the APPs in the preset time. For example, the preset time is one day. It is assumed that a rule in which the user uses the APPs in one day is: using Alarm, Weather, and WeChat in 7:00 to 12:00 in the morning, using Alarm in 12:00 to 14:00, using DingTalk and WeChat in 14:00 to 18:00, using WeChat, Tencent Video, and iQIYI in 18:00 to 22:00.

The mobile phone 100 may record a rule in which the user uses APPs in each time period, and automatically adjust the application icon in the DOCK region when a corresponding time is reached. For example, the mobile phone 100 may collect, in advance, statistics of a time rule in which the user uses the APPs in one month. For example, in this month, the user uses three applications: Alarm, Weather, and WeChat in 7:00 to 12:00, and uses Alarm in 12:00 to 14:00 every day. In this case, the mobile phone 100 may display icons of the three applications: Alarm, Weather, and WeChat in the DOCK region based on the recorded rule when time reaches 7:00, and may display the application icon of Alarm in the DOCK region when time reaches 12:00, to facilitate use of the user and improve user experience.

In another possible implementation, the mobile phone 100 may dynamically update the application icon in the DOCK region based on a location rule in which the user uses the APPs in the preset time.

In this embodiment of this application, the mobile phone 100 may record, in advance, a rule that the user uses the APPs at different locations in a preset time, and then adjust the application icon in the DOCK region based on location information of the user after the location information of the user is obtained. For example, the mobile phone 100 may obtain the location information of the user. For example, the mobile phone 100 determines based on the location information of the user that the user works in a company, and the mobile phone 100 may display, in the DOCK region, an APP (for example, DingTalk or WeChat) that may be used at work. If the mobile phone 100 determines that the location information of the user is home, the mobile phone 100 may display, in the DOCK region, an APP (WeChat, iQIYI, and the like) that may be used at home.

In still another possible implementation, the mobile phone 100 may dynamically update the application icon in the DOCK region based on a time rule and a location rule in which the user uses the APPs in the preset time. For example, when time is between 9:00 and 17:00, and the location is the company, the mobile phone 100 may display, in the DOCK region, an APP that may be used at work in this time period.

It should be noted that the method for displaying application icons in the DOCK region in the scenario 4 is similar to the display manners in the foregoing several scenarios. An only difference is different selected APPs. The APPs selected in the foregoing two scenarios are the APPs recently used by the user and the APPs used by the user for a relatively large quantity of times. The APPs selected in this scenario are the APPs determined based on the use rule of the user. For a specific schematic diagram and description in this scenario, refer to the schematic diagrams and the description in the foregoing several scenarios.

Figure 14A:
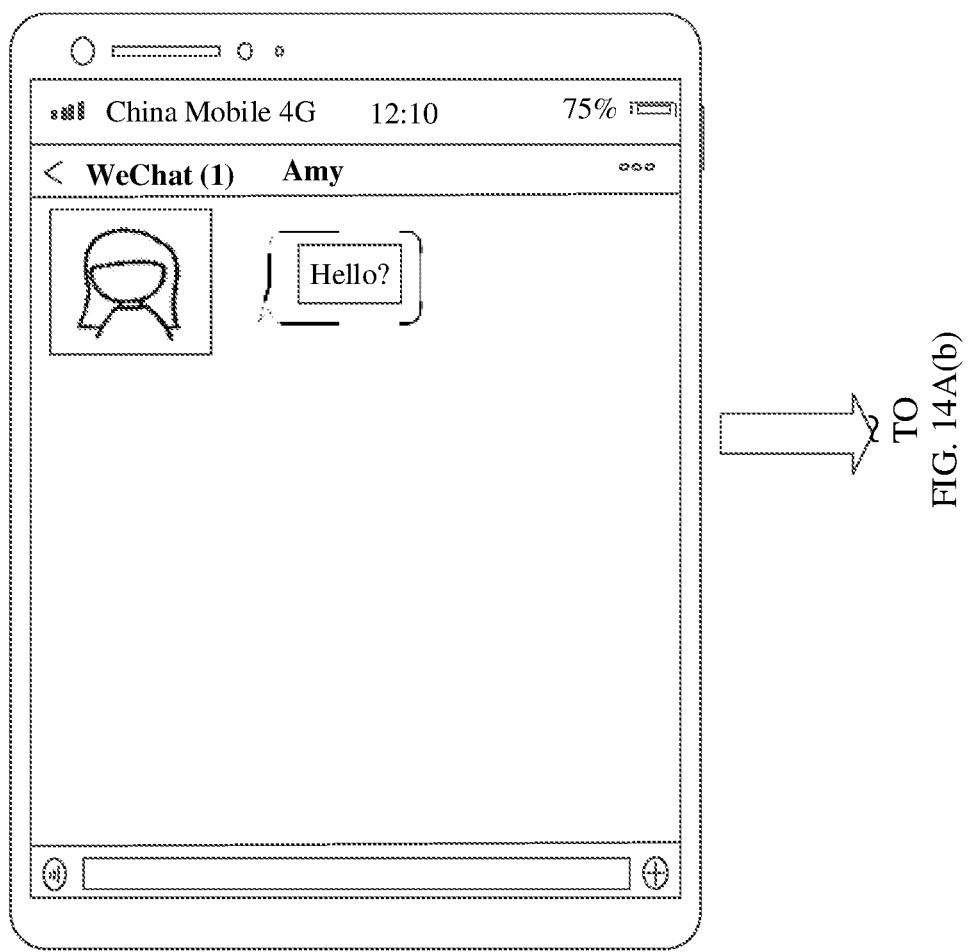
FIG. 14A(a), FIG. 14A(b), and FIG. 14A(c) are a schematic diagram of a group of graphical user interfaces according to an embodiment of this application.
Figure 14A:
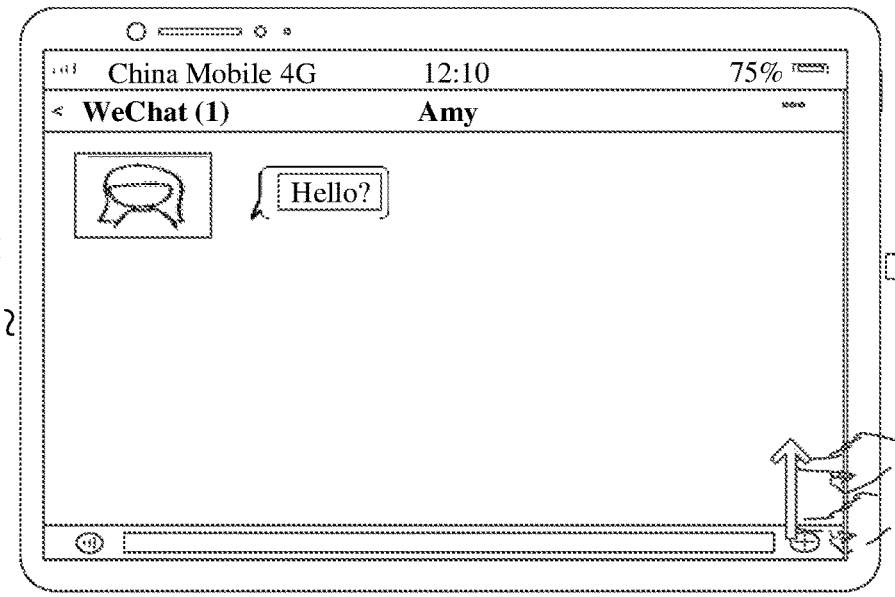
Figure 14A:
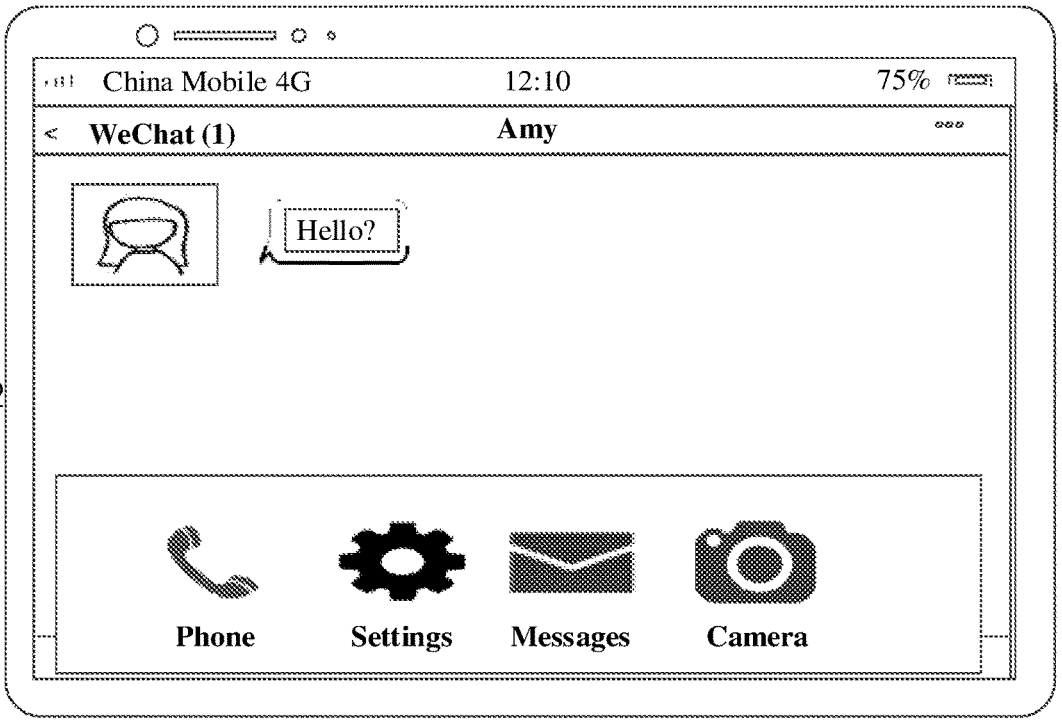

In this embodiment of this application, as shown in FIG. 14A(a), FIG. 14A(b), and FIG. 14A(c), when the display screen of the mobile phone 100 is in the folded state, it is assumed that the user is using the WeChat application. In this case, a user interface may be shown in FIG. 14A(a). After the display screen of the mobile phone 100 is switched from the folded state to the unfolded state, the interface shown in FIG. 14A(a) may be displayed in full screen. In this case, the DOCK region may be hidden. For example, as shown in FIG. 14A(b), the user may invoke the DOCK region in an upward sliding manner. After the DOCK region is invoked, for example, a display manner of the DOCK region is shown in FIG. 14A(c).

Figure 14B:
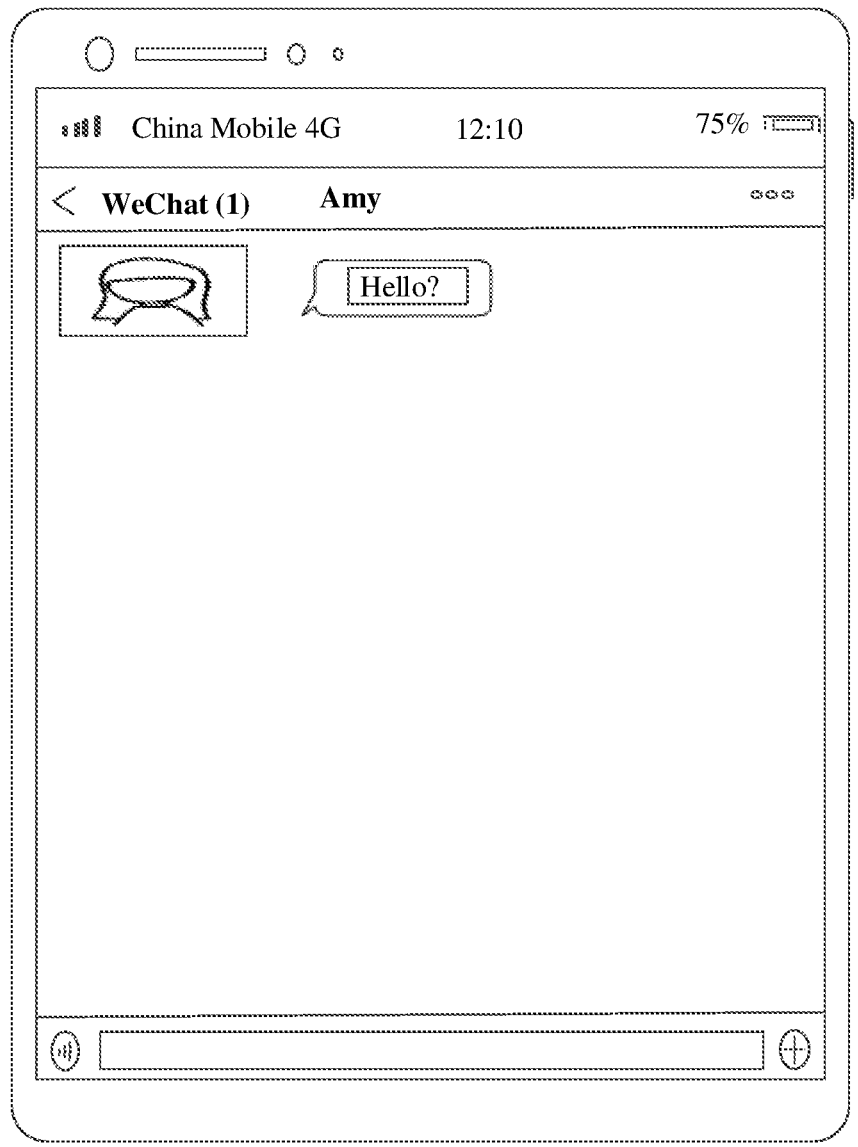
FIG. 14B(a) and FIG. 14B(b) are a schematic diagram of a group of graphical user interfaces according to an embodiment of this application.
Figure 14B:
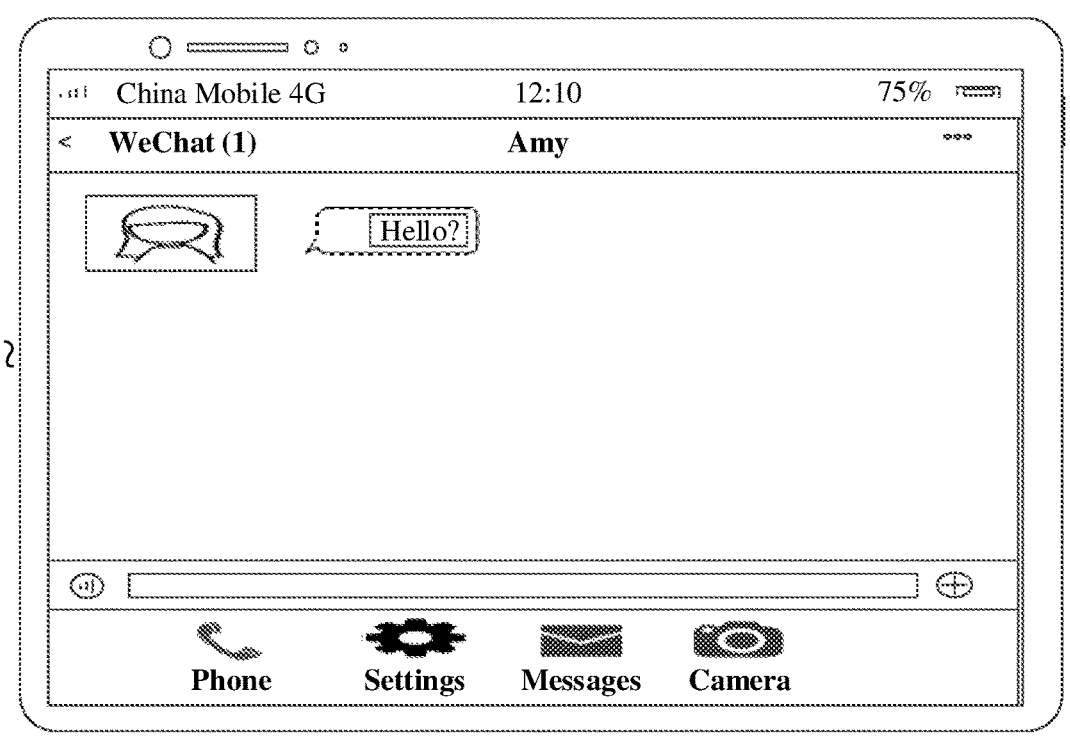

As shown in FIG. 14B(a) and FIG. 14B(b), when the display screen of the mobile phone 100 is in the folded state, it is assumed that the user is using the WeChat application in the folded state. In this case, for example, a user interface may be shown in FIG. 14B(a). When the display screen of the mobile phone 100 is switched from the folded state to the unfolded state, the DOCK region may also be fixed in a lower position of the screen, for example, as shown in FIG. 14B(b).

In some other embodiments of this application, the mobile phone 100 may also detect a size of an available area of the display screen, and adjust the application icon in the DOCK region based on the size of the available area of the display screen. The foregoing embodiments are described by using examples when the display screen is 0 degrees and when the display screen is 180 degrees, that is, when the display screen has a largest available area and when the display screen has a smallest available area.

It should be noted that the size of the available area of the display screen may be understood as an area size of the screen in a screen-on state. The following describes the method of displaying application icons in this application when the size of the available area of the display screen is between the largest area and the smallest area. In addition, the application icons displayed in the DOCK region in the following embodiment may be the applications recently used by the user, or may be the applications highly frequently used by the user in the preset time. For details of the method, refer to the description in the foregoing embodiments.

Figure 15A:
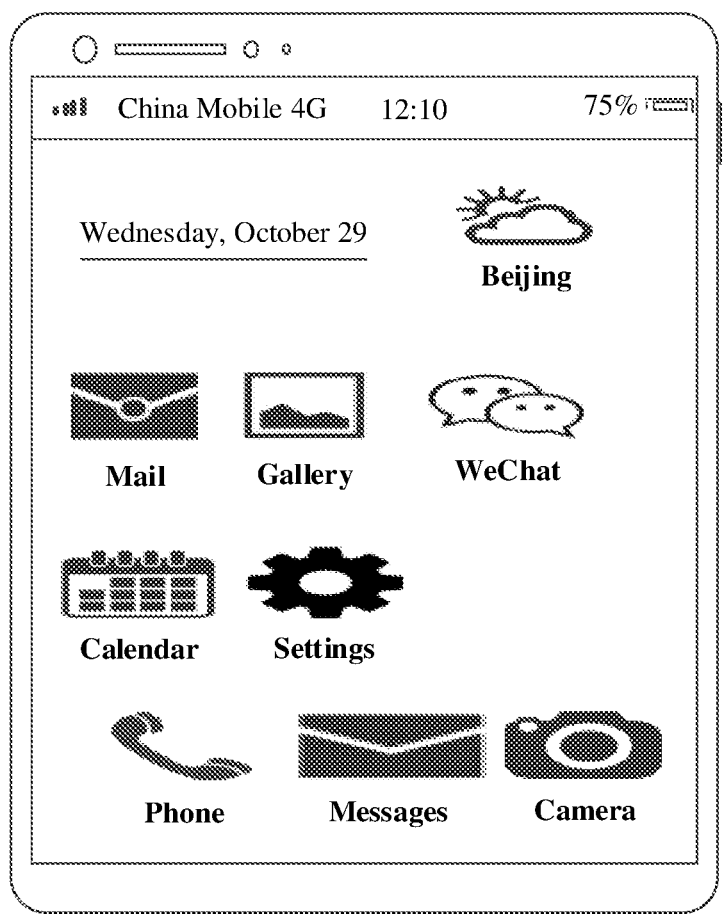
FIG. 15(a), FIG. 15(b), and FIG. 15(c) are a schematic diagram of a group of graphical user interfaces according to an embodiment of this application.
Figure 15A:
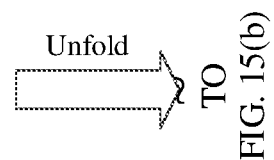
Figure 15B:
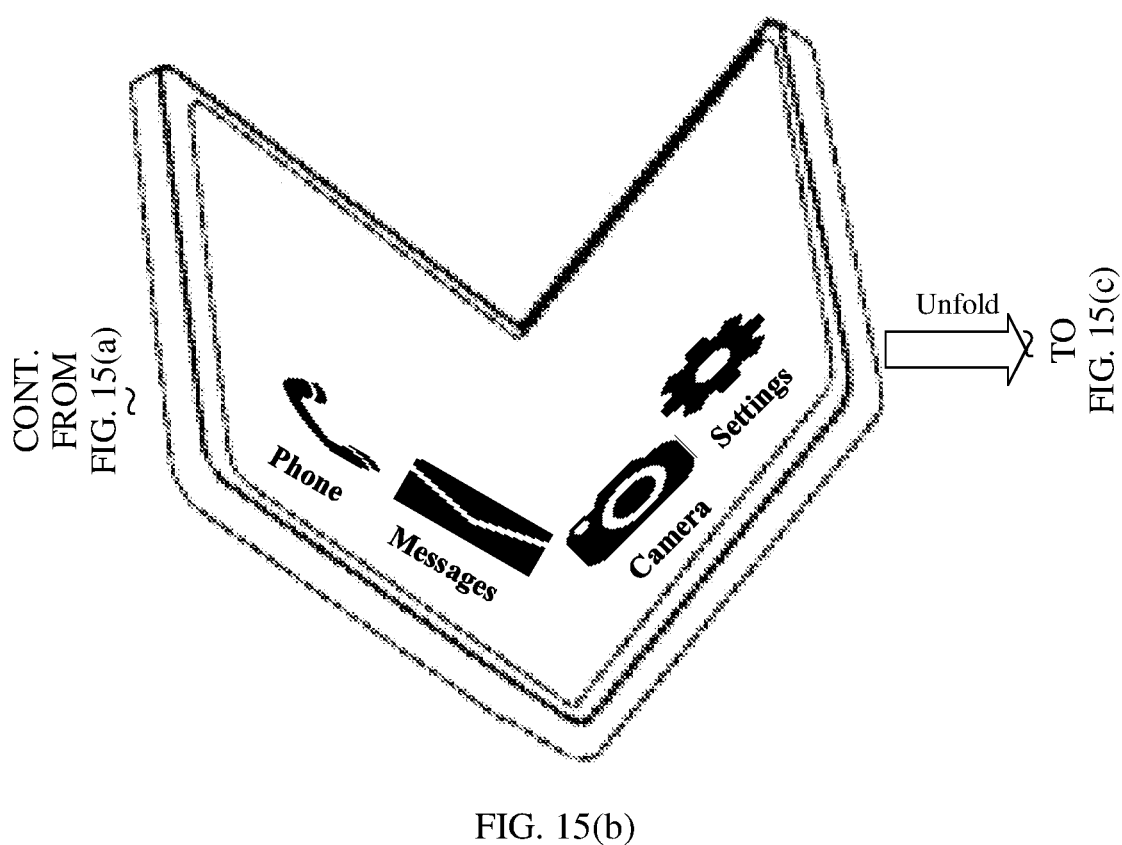
Figure 15C:
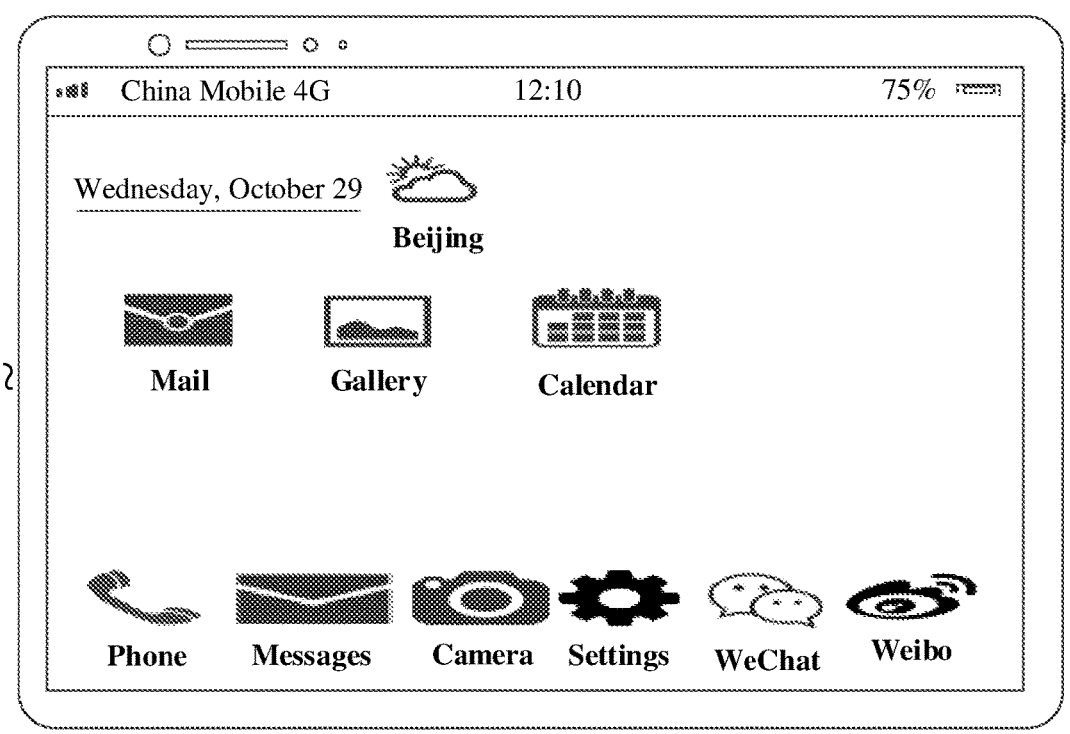

For example, a foldable mobile phone is used as an example. As shown in FIG. 15(a), FIG. 15(b), and FIG. 15(c), it is assumed that a user interface of the mobile phone 100 in the folded state is shown in FIG. 15(a). When the mobile phone 100 is in the half-folded state, a quantity of application icons in the DOCK region is greater than the quantity of application icons in the DOCK region in the folded state. With reference to FIG. 15(b), for example, as shown in FIG. 15(c), when the mobile phone 100 is in the unfolded state, a quantity of application icons in the DOCK region is greater than the quantity of application icons in the DOCK region in the half-folded state. Specifically, the application icon in the DOCK region may be the icon of the application recently used by the user, or may be the icon of the application highly frequently used by the user in the preset time, or may be the icon of the application used by the user for the relatively long duration in the preset time, or may be the icon of the application that meets the use rule of the user in the preset time. For details of the method, reference may be mad to the foregoing embodiments.

It may be understood that, if the display screen is a scroll screen, a quantity of application icons displayed in the DOCK region may also correspondingly increase as the scroll screen is expanded.

Figure 16A:
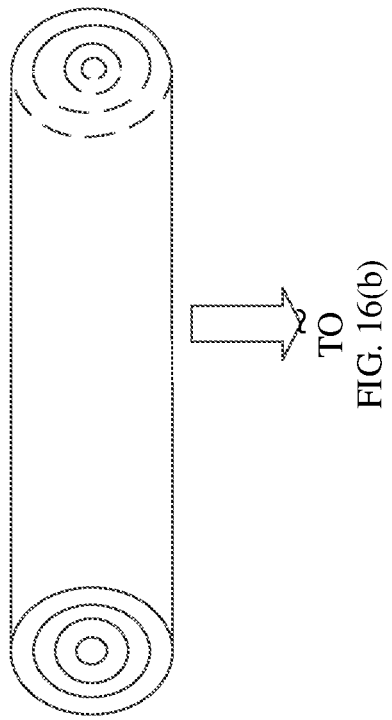
FIG. 16(a), FIG. 16(b), and FIG. 16(c) are a schematic diagram of a group of graphical user interfaces according to an embodiment of this application.
Figure 16B:
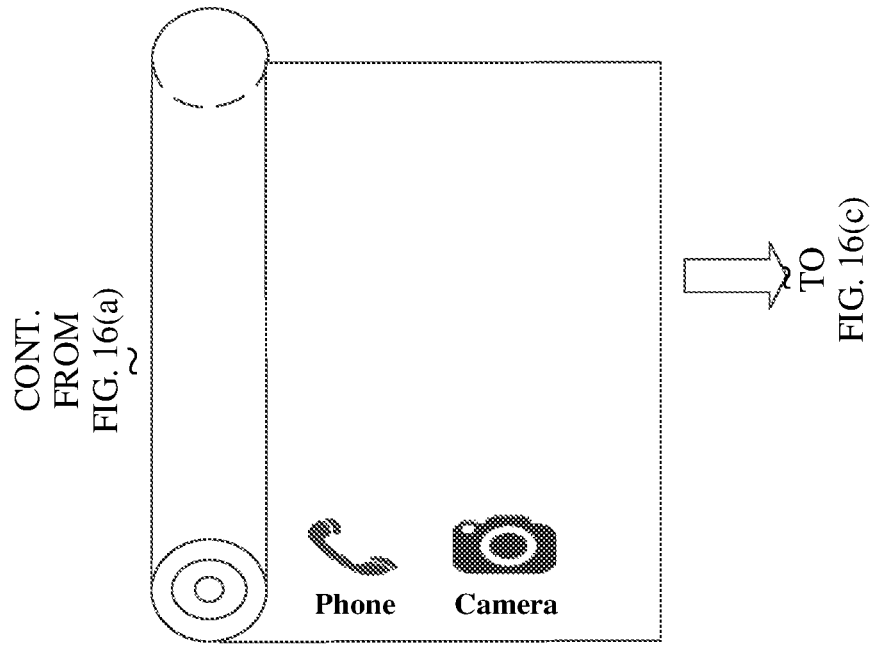
Figure 16C:
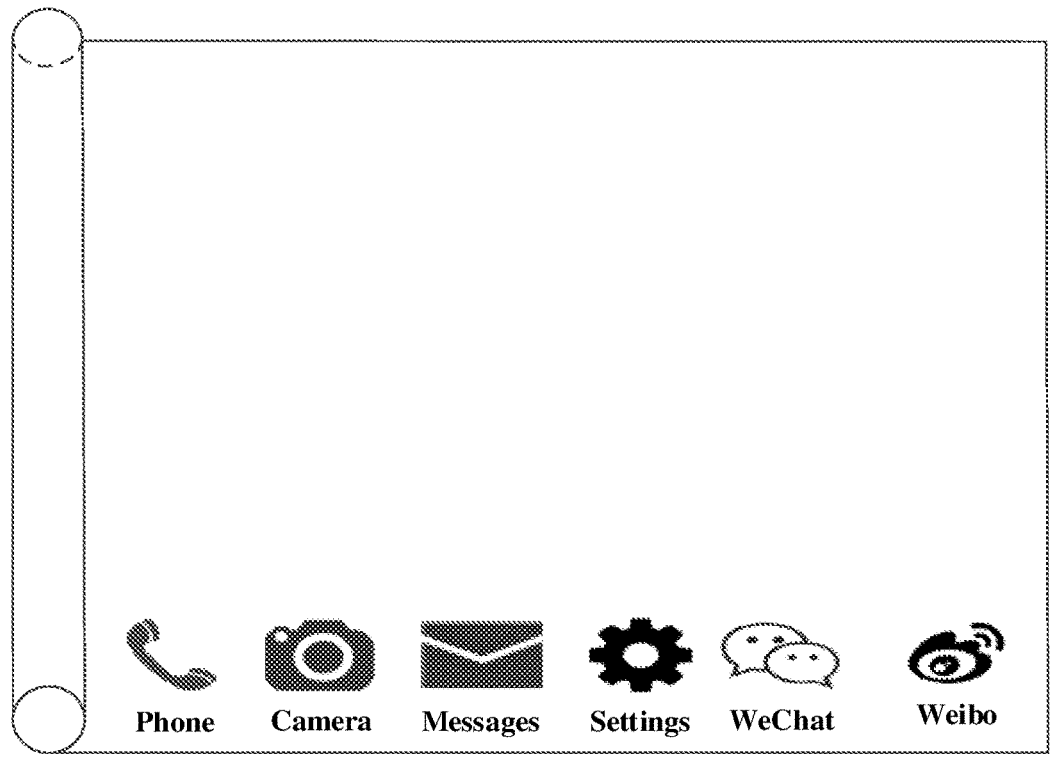

For another example, a mobile phone having a scroll screen is used as an example. A quantity of application icons in the DOCK region may change with a size of the screen as the screen is unfolded. As shown in FIG. 16(a), FIG. 16(b), and FIG. 16(c), FIG. 16(a) is a schematic diagram in which a screen of a mobile phone having a scroll screen is fully rolled up. In this embodiment of this application, when the mobile phone 100 is unfolded from FIG. 16(a) to, for example, FIG. 16(b), in this case, the application icons in the DOCK region may be, for example, application icons of two applications: "Phone" and "Camera". When the screen is further unfolded to, for example, a schematic diagram shown in FIG. 16(c), a quantity of the application icons in the DOCK region may increase with enlargement of the screen. For example, the application icons in the DOCK region include six application icons of applications: "Phone", "Camera", "Messages", "Settings", "WeChat", and "Weibo".

It may be understood that, when the mobile phone 100 is folded from the screen shown in FIG. 16(c) to the screen shown in FIG. 16(b), the quantity of application icons in the DOCK region decreases correspondingly.

It should be noted that the schematic diagrams are merely to describe a change of the quantity of application icons in the DOCK region in the case of the scroll screen. A structure of the scroll screen is not limited to the foregoing schematic diagrams. For example, a virtual key region may be set on a right side of the unfolded display screen, or a numeric key may be set on the screen in a scroll state shown in FIG. 16(a) to facilitate the user in making a call.

Figure 17C:
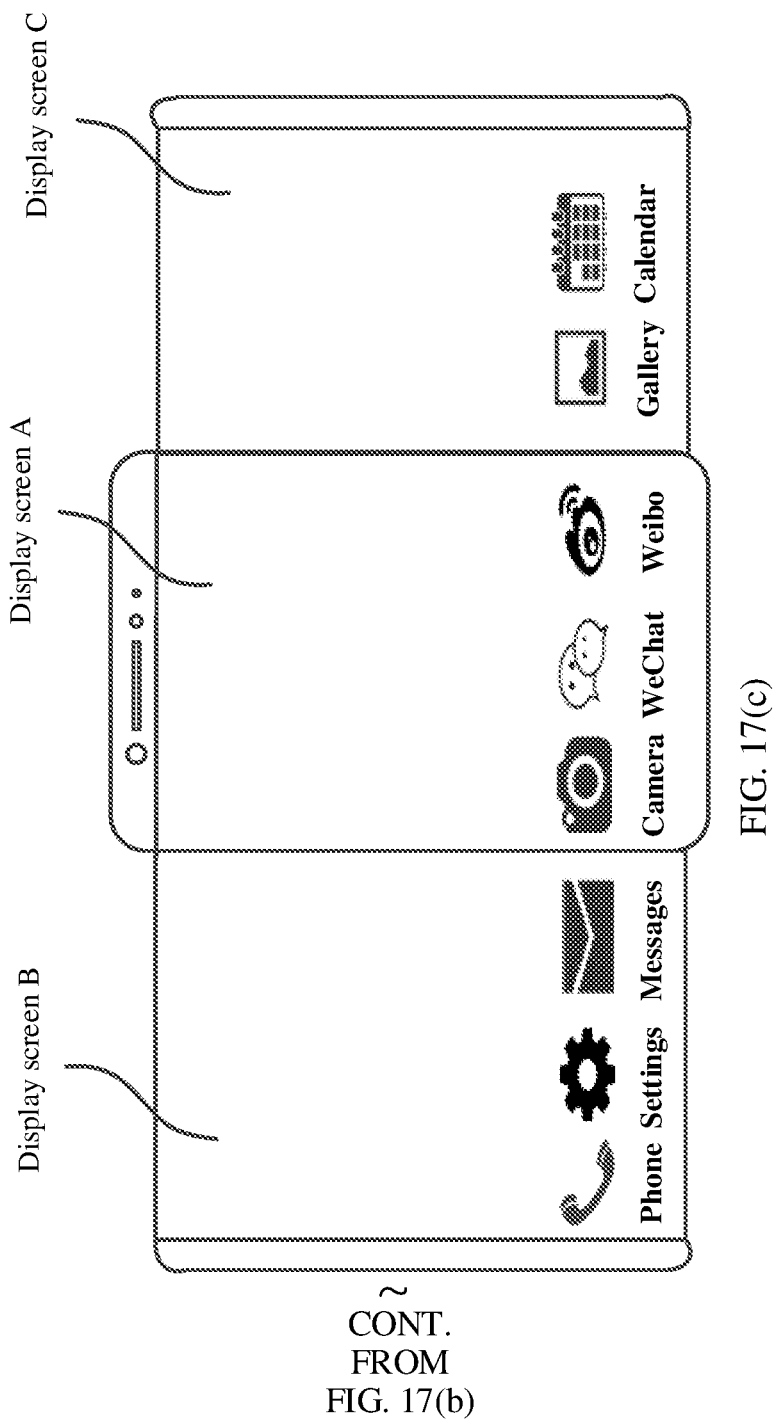

For still another example, another mobile phone having a scalable screen is used as an example to describe the method for displaying application icons in the DOCK region. As shown in FIG. 17(a), FIG. 17(b), and FIG. 17(c), FIG. 17(a) is a schematic diagram before a screen is expanded. Before the screen of the mobile phone 100 is expanded, the display screen is a fixed display screen A as a conventional mobile phone. Before the expansion, it is assumed that the application icons in the DOCK region are three application icons of "Phone", "Settings", and "Messages".

It is assumed that the screen of the mobile phone 100 may be expanded to three screens. The three display screens include the fixed display screen A before the expansion, and scalable display screens B and C. The display screens B and C may be respectively expanded to left and right sides of the fixed display screen A. It should be noted that the user may pull outward the two scalable display screens from the two sides of the mobile phone. As shown in FIG. 17(b), it is assumed that the user pulls leftward the display screen B from the left side of the mobile phone. In this case, the display screen of the mobile phone 100 includes the fixed display screen A and the scalable display screen B. A quantity of application icons in the DOCK region in this case is greater than a quantity of application icons in the DOCK region of the fixed display screen A. For example, the following six application icons may be sequentially included from left to right: "Phone", "Settings", "Messages", "Camera", "WeChat", and "Weibo". Then, the user pulls rightward the display screen C from the right side of the mobile phone 100. In this case, the display screen of the mobile phone 100 includes the fixed display screen A, the scalable display screen B, and the scalable display screen C. For example, as shown in FIG. 17(c), the application icons in the DOCK region of the mobile phone 100 may sequentially include the following eight application icons from left to right: "Phone", "Settings", "Messages", "Camera", "WeChat", "Weibo", "Gallery", and "Calendar".

It may be understood that the user may push back the display screen B and the display screen C respectively in reverse directions of pulling out the display screen B and the display screen C. When any display screen is pushed back, a quantity of application icons in the DOCK region is correspondingly reduced.

It should be noted that the foregoing schematic diagrams are merely described by using the three screens after the expansion as an example. A quantity of screens may be two or more than three, and a plurality sub-screens may have the same size or different sizes. This is not limited in this application.

Further, in this embodiment of this application, when the DOCK region includes the fixed application icon, to facilitate differentiation between the fixed application icon and the newly added application icon, the fixed application icon and the newly added icon may be differentiated in a manner of a division line, a size, a color, and the like. For example, a size of the fixed application icon may be greater than a size of the newly added application icon.

In addition, when the DOCK region includes a relatively large quantity of application icons, the mobile phone 100 may dynamically adjust sizes of the application icons based on the quantity of application icons. For example, the sizes of the application icons in the DOCK region are scaled down, so that the application icons in the DOCK region have a better display effect, to further improve user experience.

Figure 18:
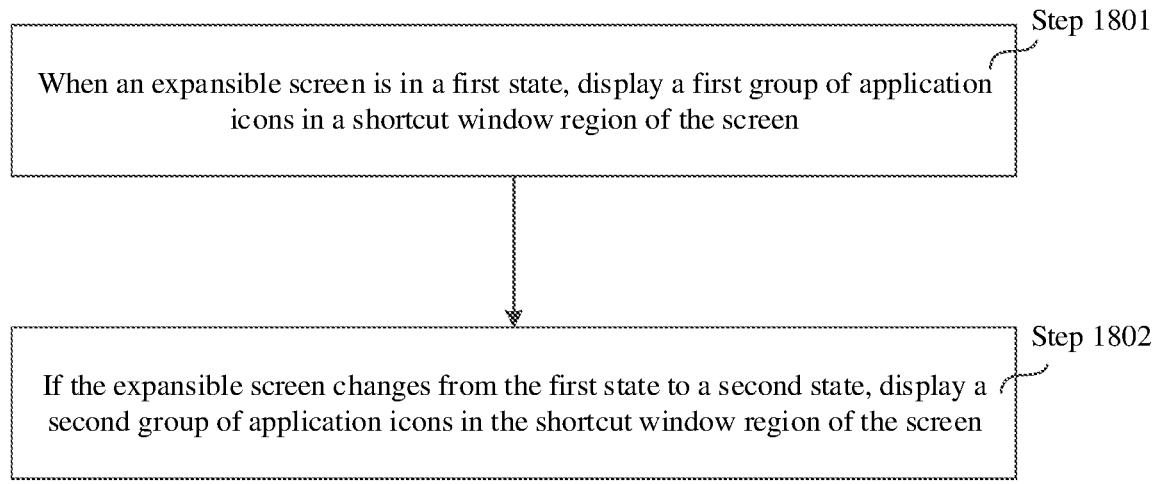
FIG. 18 is a flowchart of a method for displaying application icons according to an embodiment of this application.

Based on the foregoing embodiments, this application further provides a method for displaying application icons. The method may be applied to an electronic device having an expansible screen. A structure of the electronic device may be shown in the diagram of the structure of the electronic device 100 shown in FIG. 3. With reference to FIG. 18, the method includes the following steps:

Step 1801: When the expansible screen is in a first state, display a first group of application icons in a shortcut window region of the screen.

Step 1802: When the expansible screen changes from the first state to a second state, display a second group of application icons in the shortcut window region of the screen.

A quantity of the second group of application icons is greater than a quantity of the first group of application icons. The first state indicates a state in which the expansible screen is not expanded. The second state indicates a state in which the expansible screen is expanded.

In addition, a relationship between the second group of application icons and the first group of application icons may include the following three cases:

The second group of application icons include some icons in the first group of application icons, or the second group of application icons include all icons in the first group of application icons, or the second group of application icons do not include icons in the first group of application icons.

In this embodiment of this application, when the screen of the electronic device is in a folded state, the first group of application icons may be displayed in a DOCK region of the screen; and when the screen gradually changes from the folded state to an unfolded state, the second group of application icons may be displayed in the DOCK region of the screen. When the screen changes from the folded state to the unfolded state, a quantity of application icons in the DOCK region may increase with expansion of the screen. In this way, more application icons can be displayed in the DOCK region, to improve screen utilization and improve user experience.

It should be noted that in this embodiment of this application, that the expansible screen changes from the first state to the second state may include a time period of a process in which the expansible screen changes from the first state to the second state and a time period after the expansible screen changes from the first state to the second state.

For example, in the process in which the expansible screen changes from the first state to the second state, the second group of application icons may be displayed in the expansion process of the screen. FIG. 15(a), FIG. 15(b), and FIG. 15(c) are used as an example. It is assumed that the application icons in the DOCK region of the mobile phone with a foldable screen in the folded state include Phone, Messages, and Camera. In the process in which the mobile phone 100 is gradually unfolded from the folded state, it is assumed that when the mobile phone 100 is unfolded to 120 degrees, the application icons that may be displayed in the DOCK region of the screen of the mobile phone 100 include Phone, Messages, Camera, and Settings. In this example, the first group of application icons are application icons corresponding to three applications: Phone, Messages, and Camera, and the second group of application icons are application icons corresponding to four applications: Phone, Messages, Camera, and Settings.

For another example, after the expansible screen is unfolded from the first state to the second state, the second group of application icons may be displayed after the screen is fully unfolded. FIG. 6(a) and FIG. 6(b) are used as an example. It is assumed that a schematic diagram of an interface of the expansible screen in the first state (the folded state) is shown in FIG. 6(a). The application icons in the DOCK region include Phone, Messages, Camera, and Settings. After the screen is unfolded from the first state to the second state, with reference to FIG. 6(b), that is, after the screen is fully unfolded, the application icons in the DOCK region may include Phone, Messages, Camera, Settings, WeChat, and Weibo. In this example, the first group of application icons are application icons corresponding to four applications: Phone, Messages, Camera, and Settings, and the second group of application icons are application icons corresponding to six applications: Phone, Messages, Camera, Settings, WeChat, and Weibo.

In this embodiment of this application, for ease of description, when the second group of application icons include some icons in the first group of application icons, an icon other than the first group of application icons in the second group of application icons is used as a third group of application icons.

In a possible implementation, displaying the second group of application icons in the shortcut window region of the screen includes:

in the shortcut window region, replacing some application icons in the first group of application icons with some icons in the third group of application icons for display, and displaying some other application icons in the third group of application icons.

For example, it is assumed that the first group of application icons are A, B, and C, and the second group of application icons are B, C, D, E, and F. In other words, the second group of application icons include B and C in the first group of application icons, and D, E, and F may be denoted as the third group of application icons. In this application, any one of D, E, and F may be used to replace A. It is assumed that A is replaced with D for display. Then, B, C, D, E, and F are displayed in the DOCK region.

In this embodiment of this application, after the screen of the electronic device is expanded, more application icons may be displayed. If there is a relatively large quantity of application icons, some displayed application icons may be replaced. In other words, the application icon in the DOCK region may be updated in real time as a quantity of application icons increases, to facilitate a user operation and improve user experience.

In another possible implementation, when the second group of application icons include all the icons in the first group of application icons, displaying the second group of application icons in the shortcut window region of the screen includes:

displaying the first group of application icons in a first region in the shortcut window region of the screen, and displaying application icons in the second group of application icons except the first group of application icons in a second region.

For example, it is assumed that the first group of application icons are A, B, and C, and the second group of application icons are A, B, C, D, and E. In other words, the second group of application icons include A, B, and C in the first group of application icons, and include two more application icons: D and E than the first group of application icons. In other words, the first group of application icons: A, B, and C, and D and E in the second group of application icons except the first group of application icons are displayed in the DOCK region.

In this embodiment of this application, after the screen is expanded, the application icon in the DOCK region may further include the application icon before the screen is expanded. In other words, another application icon may be newly displayed in the DOCK region based on the original application icon. In this way, the user can search for an application icon before the screen is expanded. In addition, the application icon may be newly added, to improve screen utilization after the screen is expanded.

In still another possible implementation, when the second group of application icons do not include the icons in the first group of application icons, displaying the second group of application icons in the shortcut window region of the screen includes:

replacing all the icons in the first group of application icons with the second group of application icons in the shortcut window region of the screen for display.

For example, it is assumed that the first group of application icons are A and B, and the second group of application icons are C, D, and E. In other words, the second group of application icons do not include A and B in the first group of application icons. In this application, the second group of application icons: C, D, and E may be used to replace the first group of application icons: A and B. In this way, C, D, and E may be directly displayed.

In this embodiment of this application, after the screen is expanded, if a relatively large quantity of application icons are displayed in the DOCK region, the application icons displayed before the screen is expanded may be all replaced. In this way, after the screen is expanded, more application icons may be displayed in the DOCK region, to facilitate the user in searching for an application icon and improve user experience.

Further, before the second group of application icons are displayed in the shortcut window region of the screen, the method further includes:

recording use status information of at least one application used by the user within specified duration; and determining at least one target application in the at least one application based on the recorded use status information of the at least one application, where the second group of application icons include an application icon corresponding to the target application.

The use status information includes at least one of the following parameters: a use sequence, a use quantity, use duration, a use time, or a use location.

For example, in this application, a queue may be used to record a sequence of using the at least one application by the user. In this way, an application recently used by the user may be recorded, and the application icon in the DOCK region is adjusted based on the application recently used by the user, so that the application icon in the DOCK region better meets a use habit of the user.

For another example, in this application, a relatively large quantity of times of using an APP by the user within preset duration may be recorded; then quantities of times of using APPs are sorted; at least one APP that is used by the user for a relatively large quantity of times is selected, that is, at least one APP relatively frequently used by the user is selected; and an APP that is used by the user for a relatively large quantity of times is displayed in the DOCK region, to facilitate use of the user.

For still another example, in this application, a rule of using an APP by the user within preset duration may be further recorded, for example, a time rule and/or a location rule of using an APP by the user. For example, a time in which the user uses the iQIYI application is from 9:00 to 11:00 in the evening, and a location at which the user uses the iQIYI application is usually home. In this case, the electronic device may display an icon of the iQIYI application in the DOCK region between 9:00 p.m. and 11:00 p.m.; or may display an icon of the iQIYI application in the DOCK region when the electronic device detects that a geographical location of the user is home.

In this embodiment of this application, the electronic device records use status information of a plurality of APPs used by the user within the specified duration, and then selects, based on the use status information of the APPs used by the user, the application icon included in the DOCK region after the screen is expanded. In this way, the application icon displayed in the DOCK region may be associated with a use status of the user, and the application icon in the DOCK region may be dynamically adjusted based on the use status of the user, to facilitate the user in searching for a required APP.

In this embodiment of this application, the use status information of the at least one application used by the user within the specified duration may be recorded in any one of the following three cases:

In a first case, when the expansible screen is in the first state, the use status information of the at least one application used by the user within the specified duration is recorded.

In a second case, when the expansible screen is in the second state, the use status information of the at least one application used by the user within the specified duration is recorded.

In a third case, when the expansible screen is in the first state or the second state, the use status information of the at least one application used by the user within the specified duration is separately recorded.

In the foregoing three cases, the corresponding use status information of the APP used by the user when the screen of the electronic device is in the folded state and/or the unfolded state may be recorded, to dynamically adjust the application icon in the DOCK region based on the use status of the user.

In this application, the expansible screen may include a foldable screen, a scroll screen, or a scalable screen.

Further, the shortcut window region in this embodiment of this application is displayed in a home screen of the electronic device.

The method further includes:

when an application interface is displayed in the home screen, displaying the shortcut window region at an upper layer of the application interface in response to an instruction that is invoked by the user to display the shortcut window region.

In this embodiment of this application, it is assumed that the user is using an application, for example, WeChat, and the home screen displays, for example, a chat interface. In this case, the electronic device may display the DOCK region at an upper layer of the chat interface in response to an instruction by using which the user invokes the DOCK region.

It should be noted that the instruction by using which the user invokes the DOCK region may be an upward-sliding operation performed by the user on the screen, or may be a touch-and-hold operation performed by the user on the screen, or may be a double tap operation performed by the user on the screen. This is not limited in this application.

To implement functions in the method provided in embodiments of this application, a mobile terminal device may include a hardware structure and/or a software module, to implement the functions in a form of a hardware structure, a software module, or a hardware structure and a software module. Whether a function in the functions is performed in a form of a hardware structure, a software module, or a combination of a hardware structure and a software module depends on particular applications and design constraint conditions of the technical solutions.

In embodiments provided in this application, the method provided in embodiments of this application is described from a perspective of the electronic device as an execution body. To implement functions in the method provided in embodiments of this application, the terminal device may include a hardware structure and/or a software module, to implement the functions in a form of a hardware structure, a software module, or a hardware structure and a software module. Whether a function in the functions is performed in a form of a hardware structure, a software module, or a combination of a hardware structure and a software module depends on particular applications and design constraint conditions of the technical solutions.

Figure 19:
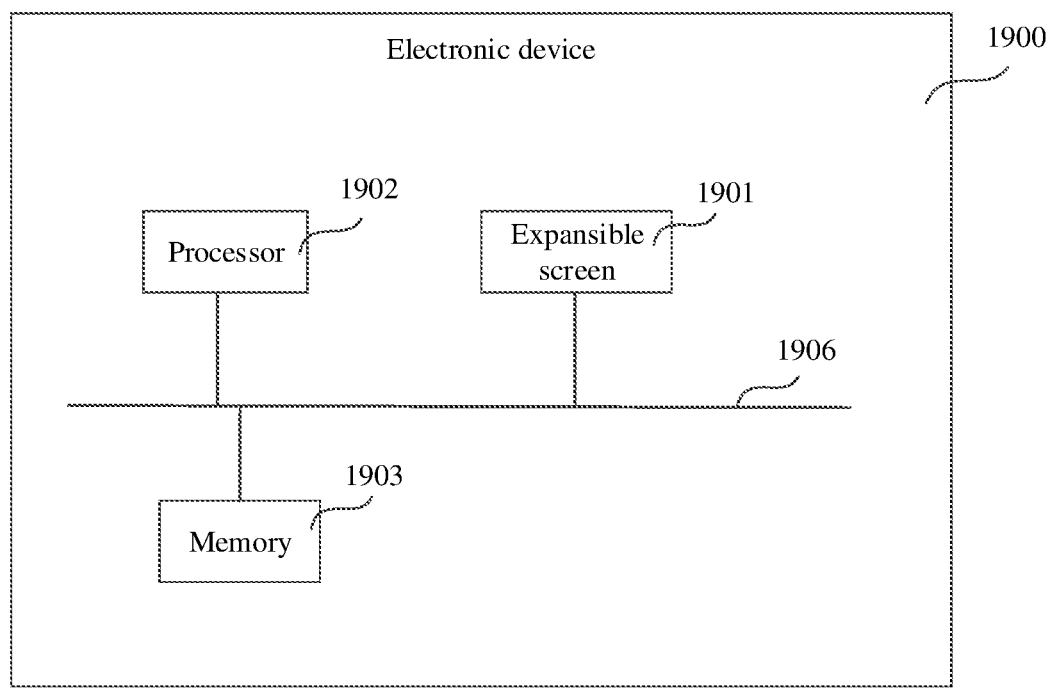
FIG. 19 is a schematic diagram of a structure of another electronic device according to an embodiment of this application.

As shown in FIG. 19, some other embodiments of this application disclose an electronic device. The electronic device may be an electronic device having an expansible screen. With reference to FIG. 19, an electronic device 1900 includes an expansible screen 1901, one or more processors 1902, a memory 1903, a plurality of applications 1904 (not shown in the figure), and one or more computer programs 1905 (not shown in the figure). The components may be connected by using one or more communications buses 1906.

The expansible screen 1901 is configured to display a home screen or a display interface of an application in the electronic device.

The memory 1903 stores one or more computer programs. The one or more computer programs include instructions. The processor 1902 invokes the instructions stored in the memory 1903, so that the electronic device 1900 performs the following steps:

when the expansible screen 1901 is in a first state, displaying a first group of application icons in a shortcut window region of the screen; and if the expansible screen 1901 changes from the first state to a second state, displaying a second group of application icons in the shortcut window region of the screen, where a quantity of the second group of application icons is greater than a quantity of the first group of application icons.

The first state indicates a state in which the expansible screen 1901 is not expanded. The second state indicates a state in which the expansible screen 1901 is expanded. The second group of application icons include some icons in the first group of application icons, or include all icons in the first group of application icons, or do not include icons in the first group of application icons.

In a possible implementation, when the second group of application icons include some icons in the first group of application icons, an icon other than the first group of application icons in the second group of application icons is used as a third group of application icons.

The displaying a second group of application icons in the shortcut window region of the screen includes:

in the shortcut window region, replacing some application icons in the first group of application icons with some icons in the third group of application icons for display, and displaying some other application icons in the third group of application icons by using the expansible screen 1901.

In a possible implementation, when the second group of application icons include all the icons in the first group of application icons, the displaying a second group of application icons in the shortcut window region of the screen includes that the processor 1902 controls the expansible screen 1901 to display the first group of application icons in a first region in the shortcut window region of the screen, and display an application icon in the second group of application icons except the first group of application icons in a second region.

In a possible implementation, when the second group of application icons do not include the icons in the first group of application icons, the displaying a second group of application icons in the shortcut window region of the screen includes:

replacing all the icons in the first group of application icons with the second group of application icons in the shortcut window region of the screen for display.

In a possible implementation, before the displaying a second group of application icons in the shortcut window region of the screen, when the instructions are invoked and executed by the one or more processors 1902, the electronic device 1900 is enabled to further perform the following steps:

The processor 1902 records use status information of at least one application used by a user within specified duration.

The processor 1902 determines at least one target application in the at least one application based on the recorded use status information of the at least one application. The second group of application icons include an application icon corresponding to the target application.

In a possible implementation, the use status information of the at least one application used by the user within the specified duration may be recorded in the following manner:

When the expansible screen is in the first state, the processor 1902 records the use status information of the at least one application used by the user within the specified duration.

Alternatively, when the expansible screen is in the second state, the processor 1902 records the use status information of the at least one application used by the user within the specified duration.

Alternatively, when the expansible screen is in the first state or the second state, the processor 1902 separately records the use status information of the at least one application used by the user within the specified duration.

In a possible implementation, the use status information includes at least one of the following parameters: a use sequence, a use quantity, use duration, a use time, or a use location.

In a possible implementation, the expansible screen includes a foldable screen, a scroll screen, or a scalable screen.

In a possible implementation, the shortcut window region is displayed in a home screen of the electronic device.

When the instructions are invoked and executed by the one or more processors 1902, the electronic device 1900 is enabled to further perform the following steps:

When an application interface is displayed in the home screen, the processor 1902 displays the shortcut window region at an upper layer of the application interface in response to an instruction that is invoked by the user to display the shortcut window region.

In this embodiment of this application, the processor 1902 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in embodiments of this application. The general purpose processor may be a microprocessor, any conventional processor, or the like. Steps in the methods disclosed with reference to embodiments of this application may be directly performed and completed by a hardware processor, or may be performed and completed by using a combination of hardware in a processor and a software module. The software module may be located in the memory 1903. The processor 1902 reads the program instructions from the memory 1903, and completes the steps in the foregoing methods in combination with the hardware of the processor 1902.

In this embodiment of this application, the memory 1903 may be a non-volatile memory such as a hard disk drive (HDD) or a solid-state drive (SSD), or may be a volatile memory such as a RAM. The memory may alternatively be any other medium that can be configured to carry or store expected program code in a form of an instruction or a data structure and that can be accessed by a computer. This is not limited thereto. The memory in this embodiment of this application may alternatively be a circuit or any other apparatus that can implement a storage function, and is configured to store instructions and/or data.

It may be clearly understood by a person skilled in the art that, for the purpose of convenient and brief description, for detailed working processes of the foregoing described apparatus and units, reference may be made to corresponding processes in the foregoing method embodiments.

Based on the foregoing embodiments, this application further provides a computer storage medium. The computer storage medium stores a computer program. When the computer program is executed by a computer, the computer is enabled to perform the method for displaying application icons provided in the foregoing embodiments.

An embodiment of this application further provides a computer program product including instructions. When the computer program product runs on a computer, the computer is enabled to perform the method for displaying application icons provided in the foregoing embodiments.

Embodiments of this application are described with reference to the flowcharts and/or block diagrams of the method, the device (system), and the computer program product according to embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method performed by an electronic device having an expansible screen, the method comprises:
   when the expansible screen is in a first state, displaying a first group of application icons in a shortcut window region of a first screen, wherein the first group of application icons does not comprise a first icon of a first application;
   after the first application is used on the first screen, displaying the first group of application icons in the shortcut window region of the first screen; and
   in response to the expansible screen changing from the first state to a second state, displaying a second group of application icons in the shortcut window region of a second screen, wherein the second group of application icons comprises all application icons of the first group of application icons and the first icon, the first icon being included in the second group of application icons based on recorded recent use status information of respective applications,
   wherein the first state indicates a state in which the expansible screen is not expanded, and the second state indicates a state in which the expansible screen is expanded.

2. The method according to claim 1, wherein the displaying a second group of application icons in the shortcut window region of a second screen comprises:
   displaying the first group of application icons in a first region in the shortcut window region of the second screen, and displaying, at least the first icon in a second region in a shortcut window region of the second screen.

3. The method according to claim 1, wherein the method further comprises, before the displaying a second group of application icons in the shortcut window region of the second screen:
  recording recent use status information of at least one application used by a user within a specified duration; and
  determining the first application in the at least one application based on the recorded recent use status information.

4. The method according to claim 3, wherein the recording recent use status information of at least one application used by a user within a specified duration comprises:
  based on whether the expansible screen is in the first state or the second state, separately recording the use status information of the at least one application used by the user within the specified duration.

5. The method according to claim 3, wherein the use status information comprises at least one of a use sequence, a use quantity, use duration, a use time, or a use location.

6. The method according to claim 1, wherein the expansible screen comprises a foldable screen, a scroll screen, or a scalable screen.

7. The method according to claim 1, wherein the shortcut window region is displayed in a home screen of the electronic device, and
  the method further comprises:
  when an application interface is displayed in the home screen, displaying the shortcut window region at an upper layer of the application interface in response to an instruction that is invoked by the user to display the shortcut window region.

8. An electronic device comprising an expansible screen, one or more processors, a memory, a plurality of applications, and one or more computer programs, wherein
  the one or more computer programs are stored in the memory, and the one or more computer programs comprise instructions that when executed by the one or more processors, cause the electronic device to perform operations comprising:
  when the expansible screen is in a first state, displaying a first group of application icons in a shortcut window region of a first screen, wherein the first group of application icons does not comprise a first icon of a first application;
  after the first application is used on the first screen, displaying the first group of application icons in the shortcut window region of the first screen; and
  in response to the expansible screen changing from the first state to a second state, displaying a second group of application icons in the shortcut window region of a second screen, wherein the second group of application icons comprises all application icons of the first group of application icons and the first icon, the first icon being included in the second group of application icons based on recorded recent use status information of respective applications,
  wherein the first state indicates a state in which the expansible screen is not expanded, and the second state indicates a state in which the expansible screen is expanded.

9. The electronic device according to claim 8, wherein the displaying a second group of application icons in the shortcut window region of a second screen comprises:
  displaying the first group of application icons in a first region in the shortcut window region of the second screen, and displaying, at least the first icon in a second region in a shortcut window region of the second screen.

10. The electronic device according to claim 8, wherein, when the instructions are executed by the one or more processors, the electronic device is further configured to perform, before the displaying a second group of application icons in the shortcut window region of the second screen, operations comprising:
  recording recent use status information of at least one application used by a user within the specified duration; and
  determining the first application in the at least one application based on the recorded recent use status information.

11. The electronic device according to claim 10, wherein the recording recent use status information of at least one application used by a user within the specified duration comprises:
  based on whether the expansible screen is in the first state or the second state, separately recording the use status information of the at least one application used by the user within the specified duration.

12. The electronic device according to claim 10, wherein the use status information comprises at least one of a use sequence, a use quantity, use duration, a use time, or a use location.

13. The electronic device according to claim 8, wherein the expansible screen comprises a foldable screen, a scroll screen, or a scalable screen.

14. The electronic device according to claim 8, wherein the shortcut window region is displayed in a home screen of the electronic device, and
  when the instructions are executed by the one or more processors, the instructions cause the electronic device to further perform operations comprising:
  when an application interface is displayed in the home screen, displaying the shortcut window region at an upper layer of the application interface in response to an instruction that is invoked by the user to display the shortcut window region.

15. A non-transitory computer readable storage medium comprising computer instructions that, when executed by one or more processors of an electronic device, causes the electronic device to perform operations comprising:
  when an expansible screen of the electronic device is in a first state, displaying a first group of application icons in a shortcut window region of a first screen, wherein the first group of application icons does not comprise a first icon of a first application;
  after the first application is used on the first screen, displaying the first group of application icons in the shortcut window region of the first screen; and
  in response to the expansible screen changing from the first state to a second state, displaying a second group of application icons in the shortcut window region of a second screen, wherein the second group of application icons comprises all application icons of the first group of application icons and the first icon, the first icon being included in the second group of application icons based on recorded recent use status information of respective applications, wherein the first state indicates a state in which the expansible screen is not expanded, and the second state indicates a state in which the expansible screen is expanded.

16. The non-transitory computer readable storage medium according to claim 15, wherein the displaying a second group of application icons in the shortcut window region of the expansible screen comprises:
displaying the first group of application icons in a first region in the shortcut window region of the second screen, and displaying at least the first icon in a second region in a shortcut window region of the second screen.

17. The non-transitory computer readable storage medium according to claim 15, wherein when the instructions are executed by the one or more processors, the electronic device is caused further to perform, before the displaying a second group of application icons in the shortcut window region of the second screen, operations comprising:
recording recent use status information of at least one application used by a user within specified duration; and
determining the first application in the at least one application based on the recorded recent use status information.

18. The non-transitory computer readable storage medium according to claim 17, wherein the recording recent use status information of at least one application used by a user within a specified duration comprises:
based on whether the expansible screen is in the first state or the second state, separately recording the use status information of the at least one application used by the user within the specified duration.

19. The non-transitory computer readable storage medium according to claim 17, wherein the use status information comprises at least one of a use sequence, a use quantity, use duration, a use time, or a use location.

20. The non-transitory computer readable storage medium according to claim 15, wherein the shortcut window region is displayed in a home screen of the electronic device, and
when the instructions are invoked and executed by the one or more processors, the electronic device is enabled to further perform the following steps:
when an application interface is displayed in the home screen, displaying the shortcut window region at an upper layer of the application interface in response to an instruction that is invoked by the user to display the shortcut window region.

* * * * *